United States Patent
Lim et al.

(10) Patent No.: US 9,451,560 B2
(45) Date of Patent: *Sep. 20, 2016

(54) METHOD FOR DETERMINING UPLINK TRANSMISSION POWER

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,308

(22) Filed: Dec. 21, 2015

(65) Prior Publication Data

US 2016/0112964 A1 Apr. 21, 2016

Related U.S. Application Data

(63) Continuation of application No. 14/495,660, filed on Sep. 24, 2014, now Pat. No. 9,258,158.

(60) Provisional application No. 61/899,307, filed on Nov. 4, 2013, provisional application No. 61/884,064, filed on Sep. 29, 2013, provisional application No. 61/882,002, filed on Sep. 25, 2013.

(30) Foreign Application Priority Data

Sep. 23, 2014 (KR) .......................... 10-2014-0127207

(51) Int. Cl.
*H04W 52/14* (2009.01)
*H04W 52/24* (2009.01)
(Continued)

(52) U.S. Cl.
CPC ............ *H04W 52/243* (2013.01); *H04L 5/001* (2013.01); *H04L 5/0066* (2013.01); *H04L 5/0073* (2013.01); *H04L 27/2601* (2013.01); *H04W 52/146* (2013.01); *H04W 52/367* (2013.01); *H04W 72/0453* (2013.01); *H04W 72/0473* (2013.01); *Y02B 60/50* (2013.01)

(58) Field of Classification Search
None
See application file for complete search history.

(56) References Cited

U.S. PATENT DOCUMENTS 8,842,542 B2* 9/2014 Zhang ................... H04W 52/12
370/236
9,094,917 B2* 7/2015 Charbit ................. H04W 52/34
(Continued)

FOREIGN PATENT DOCUMENTS

KR 10-2012-0010255 A 2/2012
KR 10-1249573 B1 4/2013
(Continued)

*Primary Examiner* — Bobbak Safaipour
(74) *Attorney, Agent, or Firm* — Birch, Stewart, Kolasch & Birch, LLP

(57) ABSTRACT

A method, performed by a user equipment (UE), is provided for determining uplink transmission power. A radio frequency (RF) unit is configured to use for an uplink transmission a frequency range of 1980 MHz through 2010 MHz or 1920 MHz through 2010 MHz. The UE receives a value of an additional maximum power reduction (A-MPR) from a serving base station (BS) adjacent to a neighboring BS for serving another UE using for an uplink transmission a frequency range of 2010 MHz through 2025 MHz. An uplink signal is transmitted at an uplink transmission power calculated by using the value of the A-MPR. The value of the A-MPR is 11 dB or 15 dB.

18 Claims, 62 Drawing Sheets

(51) Int. Cl.
*H04W 72/04* (2009.01)
*H04L 27/26* (2006.01)
*H04W 52/36* (2009.01)
*H04L 5/00* (2006.01)

(56) References Cited

U.S. PATENT DOCUMENTS

| | | | |
|---|---|---|---|
| 9,112,658 B2* | 8/2015 | Arai | H04L 5/0053 |
| 2012/0044898 A1* | 2/2012 | Ishii | H04W 52/146 |
| | | | 370/329 |
| 2013/0083767 A1* | 4/2013 | Goto | H04W 52/346 |
| | | | 370/329 |
| 2013/0148591 A1* | 6/2013 | Lim | H04W 72/0453 |
| | | | 370/329 |
| 2015/0111608 A1* | 4/2015 | Kazmi | H04W 52/18 |
| | | | 455/522 |

FOREIGN PATENT DOCUMENTS

WO  WO 2010/014353 A1  2/2010
WO  WO 2010/125969 A1  11/2010

* cited by examiner (b) MULTIPLE CCS (a) SINGLE CC (a)

(b)

METHOD FOR DETERMINING UPLINK TRANSMISSION POWER

CROSS-REFERENCE TO RELATED APPLICATIONS

This application is a continuation of U.S. patent application Ser. No. 14/495,660 filed on Sep. 24, 2014 (now U.S. Pat. No. 9,258,158 issued on Feb. 9, 2016), which claims priority under 35 U.S.C. §119(e) to U.S. Provisional Application No. 61/899,307, filed on Nov. 4, 2013, 61/884,064 filed on Sep. 29, 2013 and 61/882,002 filed on Sep. 25, 2013, respectively and under 35 U.S.C. §119(a) to Patent Application No. 10-2014-0127207, filed in the Republic of Korea on Sep. 23, 2014, all of which are hereby expressly incorporated by reference as fully set forth in their entirety.

BACKGROUND OF THE INVENTION

The present invention relates to a method for determining uplink transmission power.

3GPP (3rd Generation Partnership Project) LTE (Long Term Evolution) that is an advancement of UMTS (Universal Mobile Telecommunication System) is being introduced with 3GPP release 8.

In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

FIG. 1 illustrates a 3GPP LTE wireless communication system.

As can be seen from FIG. 1, the wireless communication system includes at least one base station (BS) 20. Each base station 20 offers a communication service in a specific geographical area (generally denoted cell) 20a, 20b, and 20c.

At this time, communication from the base station to a terminal is denoted downlink (DL), and communication from the terminal to the base station is denoted uplink (UL).

If the BSs 20 provided from a plurality of service providers is located at respective geographical regions 15a, 15b, and 15c, the BSs 20 may interfere with each other.

In order to prevent the interference, the respective service providers may provide a service with different frequency bands.

However, when the frequency bands of the respective service providers are close to each other, the interference problem remains.

SUMMARY OF THE INVENTION

Accordingly, the disclosures of the present specification are to solve the problems described above.

To achieve these and other advantages and in accordance with the purpose of the present disclosure, as embodied and broadly described herein, there is provided a method for determining uplink transmission power. The method may performed by a user equipment (UE) and comprise: receiving, by the UE, a value of additional maximum power reduction (A-MPR) from a base station (BS), if the UE is configured to use for uplink transmission a frequency range of 1980 MHz through 2010 MHz or 1920 MHz through 2010 MHz and if another UE which is located in an adjacent BS and is to be protected uses for an uplink transmission a frequency range of 2010 MHz through 2025 MHz; and determining an uplink transmission power by applying the value of A-MPR. if the UE is applied with −40 dBm/MHz as a maximum limit of spurious emission for coexistence requirement with the adjacent another UE, and if a transmission bandwidth allocated for the uplink transmission of the UE is 5 MHz, the value of A-MPR may be 15 dB. And, if the UE is applied with −30 dBm/MHz as a maximum limit of spurious emission for coexistence requirement with the adjacent another UE, and if a transmission bandwidth allocated for the uplink transmission of the UE is 10 MHz, the value of A-MPR may be 11 dB.

The value of A-MPR may be applied if a guard band does not exist between frequency range of 1980 MHz through 2010 MHz or 1920 MHz through 2010 MHz for the uplink transmission.

The frequency range of 1980 MHz to 2010 MHz a band that is available to be used for LTE or LTE-A system as well as satellite communication. The frequency range of 2010 MHz through 2025 MHz that the adjacent UE uses is E-UTRA band 34 based on 3GPP standard.

To achieve these and other advantages and in accordance with the purpose of the present disclosure, as embodied and broadly described herein, there is also provided a method for limiting uplink transmission power of a first user equipment (UE). The method may be performed by a base station (BS) and comprise: allocating, by the BS, uplink resource in frequency range 1980 MHz through 2010 MHz or 1920 MHz through 2010 MHz to the first UE if a second UE, which is located in an adjacent BS and is to be protected, uses for an uplink transmission a frequency range of 2010 MHz through 2025 MHz; transmitting, from the BS to the first UE, a value of additional maximum power reduction (A-MPR) to protect the second UE. If the first UE is applied with −40 dBm/MHz as a maximum limit of spurious emission for coexistence requirement with the adjacent another UE, and if a transmission bandwidth allocated for the uplink transmission of the UE is 5 MHz, the value of A-MPR may be 15 dB. And, if the first UE is applied with −30 dBm/MHz as a maximum limit of spurious emission for coexistence requirement with the adjacent another UE, and if a transmission bandwidth allocated for the uplink transmission of the UE is 10 MHz, the value of A-MPR may be 11 dB.

To achieve these and other advantages and in accordance with the purpose of the present disclosure, as embodied and broadly described herein, there is also provided a user equipment for transmitting uplink signals in a wireless communication system. The user equipment may comprise: a radio frequency (RF) unit; and a processor configured to decide an uplink transmission power by applying a value of additional maximum power reduction (A-MPR) received from a base station (BS) to protect another UE, which is located in an adjacent BS and uses for an uplink transmission a frequency range of 2010 MHz through 2025 MHz, if the RF unit of the UE is configured to use for an uplink transmission a frequency range of 1980 MHz through 2010 MHz or 1920 MHz through 2010 MHz. If the UE is applied with −40 dBm/MHz as a maximum limit of spurious emission for coexistence requirement with the adjacent another UE, and if a transmission bandwidth allocated for the uplink transmission of the UE is 5 MHz, the value of A-MPR is 15 dB. And if the UE is applied with −30 dBm/MHz as a maximum limit of spurious emission for coexistence requirement with the adjacent another UE, and if a transmission bandwidth allocated for the uplink transmission of the UE is 10 MHz, the value of A-MPR is 11 dB.

To achieve these and other advantages and in accordance with the purpose of the present disclosure, as embodied and broadly described herein, there is also provided a base station for limiting uplink transmission power of a first user equipment (UE). The base station may comprise: a RF unit; and a processor configure to allocate uplink resource in frequency range 1980 MHz through 2010 MHz or 1920 MHz through 2010 MHz to the first UE if a second UE in an adjacent base station and to be protected uses for an uplink transmission a frequency range of 2010 MHz through 2025 MHz, and to transmit a value of additional maximum power reduction (A-MPR) for protecting the second UE to the first UE. If the first UE is applied with −40 dBm/MHz as a maximum limit of spurious emission for coexistence requirement with the adjacent another UE, and if a transmission bandwidth allocated for the uplink transmission of the UE is 5 MHz, the value of A-MPR is 15 dB. And, if the first UE is applied with −30 dBm/MHz as a maximum limit of spurious emission for coexistence requirement with the adjacent another UE, and if a transmission bandwidth allocated for the uplink transmission of the UE is 10 MHz, the value of A-MPR is 11 dB.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION OF THE INVENTION

Figure 1:
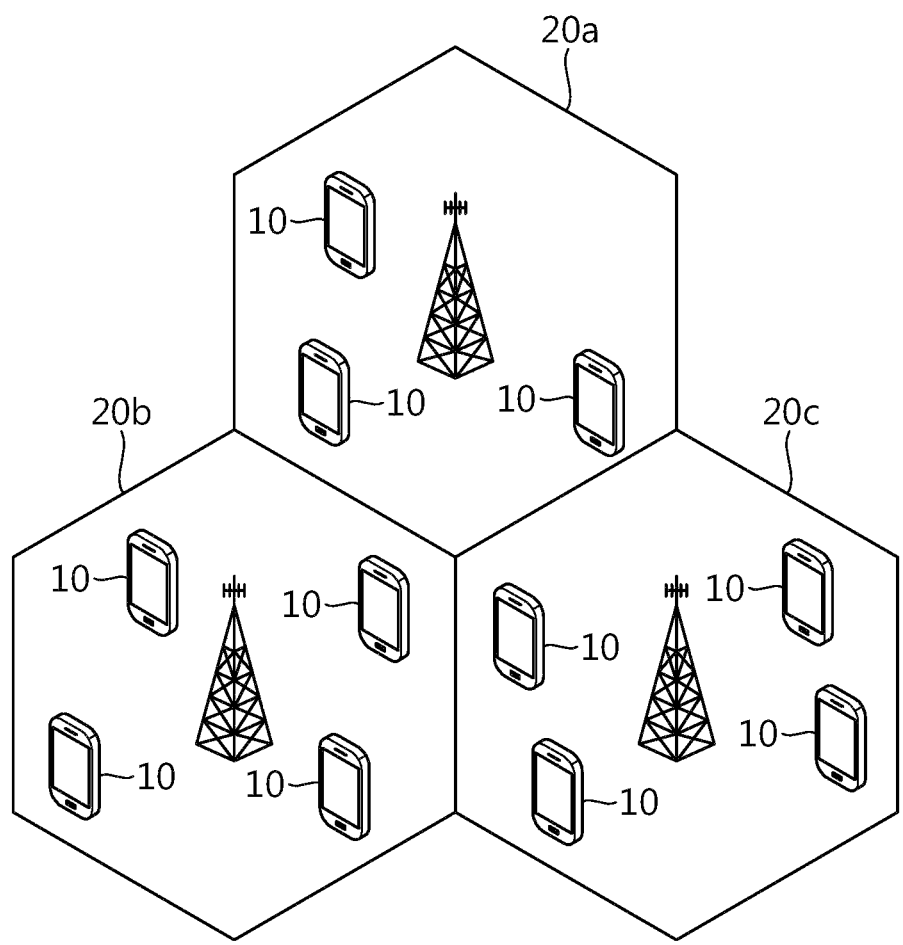
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Meanwhile, the LTE system defined by the 3GPP adopted such MIMO. Hereinafter, the LTE system is described in further detail.

Figure 2:
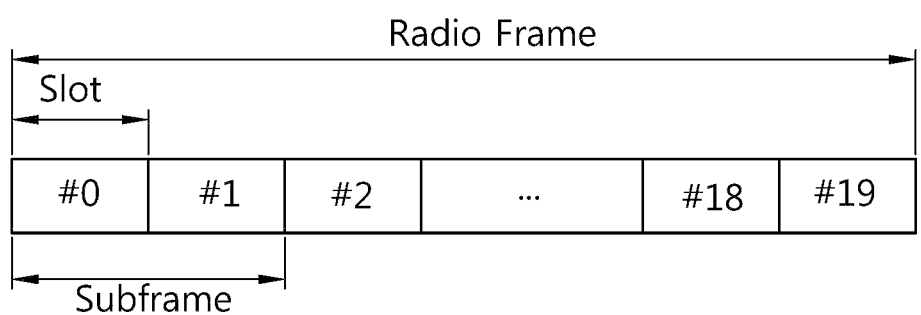
FIG. 2 illustrates the architecture of a radio frame according to FDD in 3GPP LTE.

FIG. 2 illustrates the architecture of a radio frame according to FDD in 3GPP LTE.

For the radio frame shown in FIG. 2, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, the radio frame consists of 10 sub-frames, and each sub-frame includes two slots. The slots in the radio frame are numbered with slot numbers 0 to 19. The time taken for one sub-frame to be transmitted is denoted TTI (transmission time interval). The TTI may be a scheduling unit for data transmission. For example, the length of one radio frame is 10 ms, the length of one sub-frame is 1 ms, and the length of one slot may be 0.5 ms.

The architecture of radio frame is merely an example, and the number of sub-frames in the radio frame or the number of slots in each sub-frame may be changed variously.

Meanwhile, one slot may include a plurality of OFDM symbols. How many OFDM symbols are included in one slot may vary depending on cyclic prefix (CP).

Figure 3:
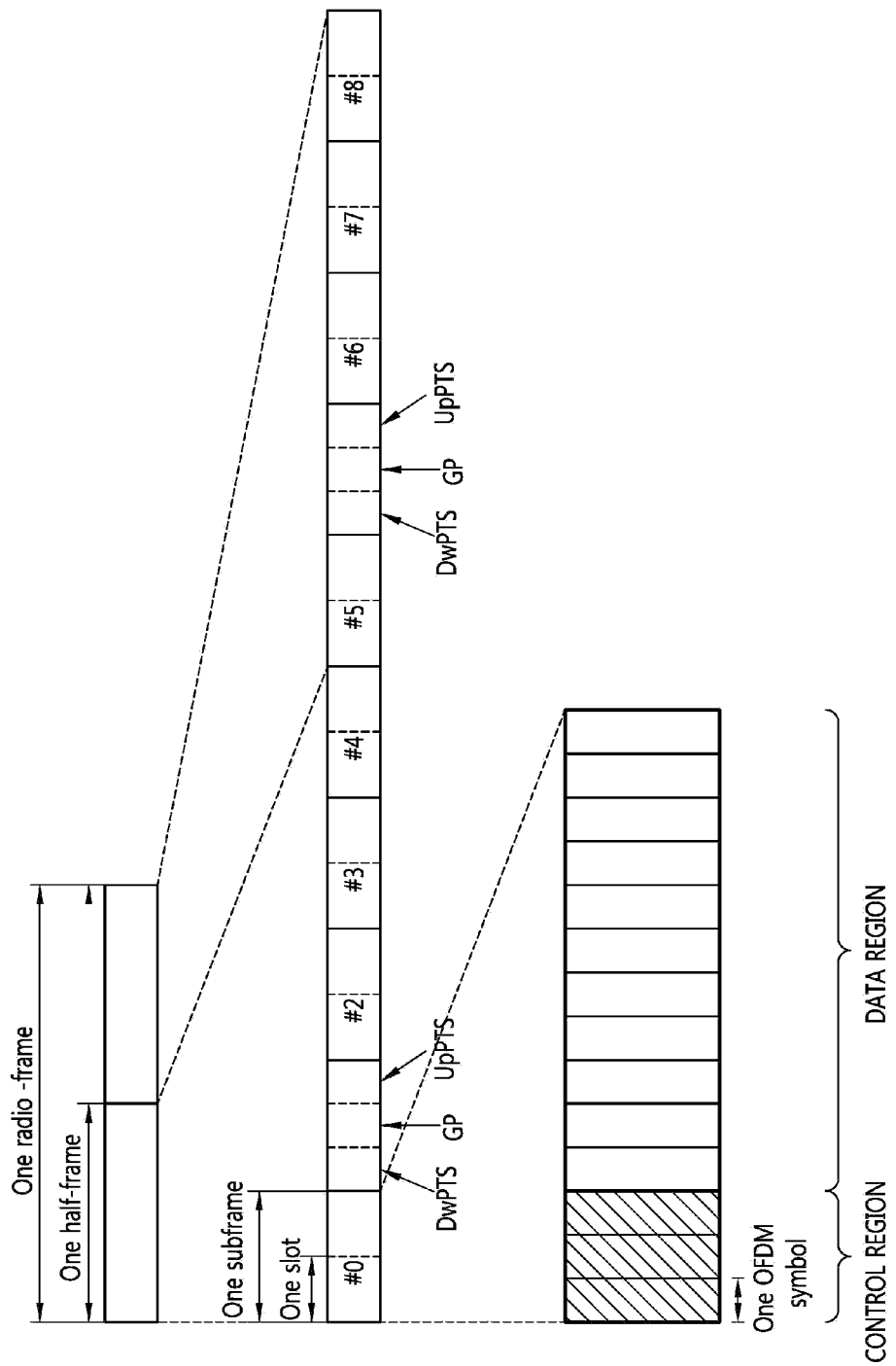
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
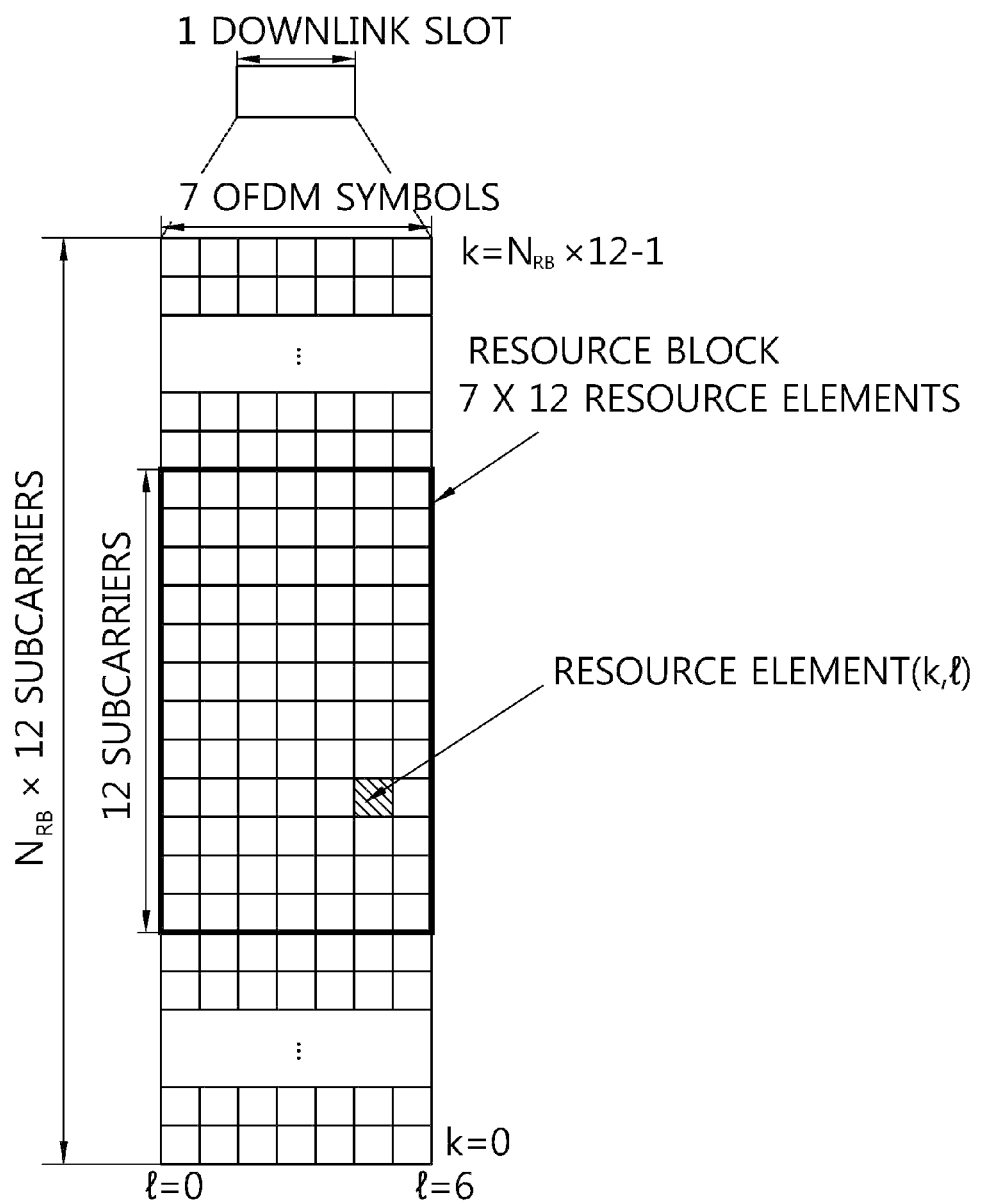
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period.

The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
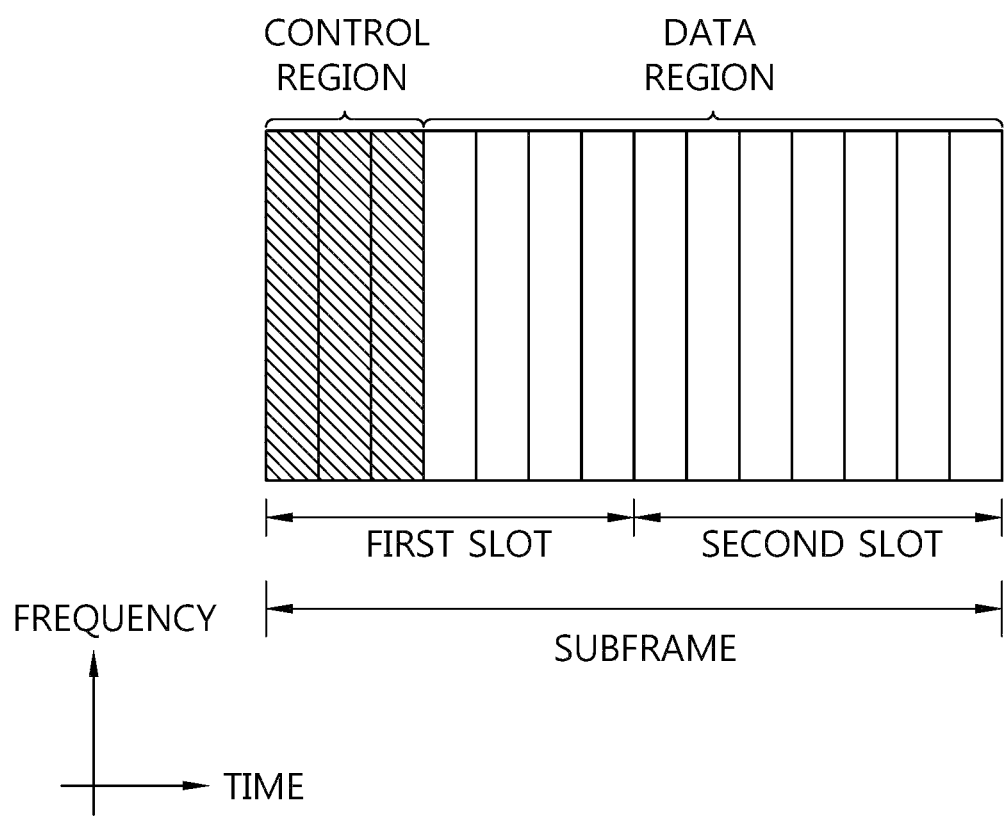
FIG. 5 illustrates the architecture of a downlink sub-frame.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
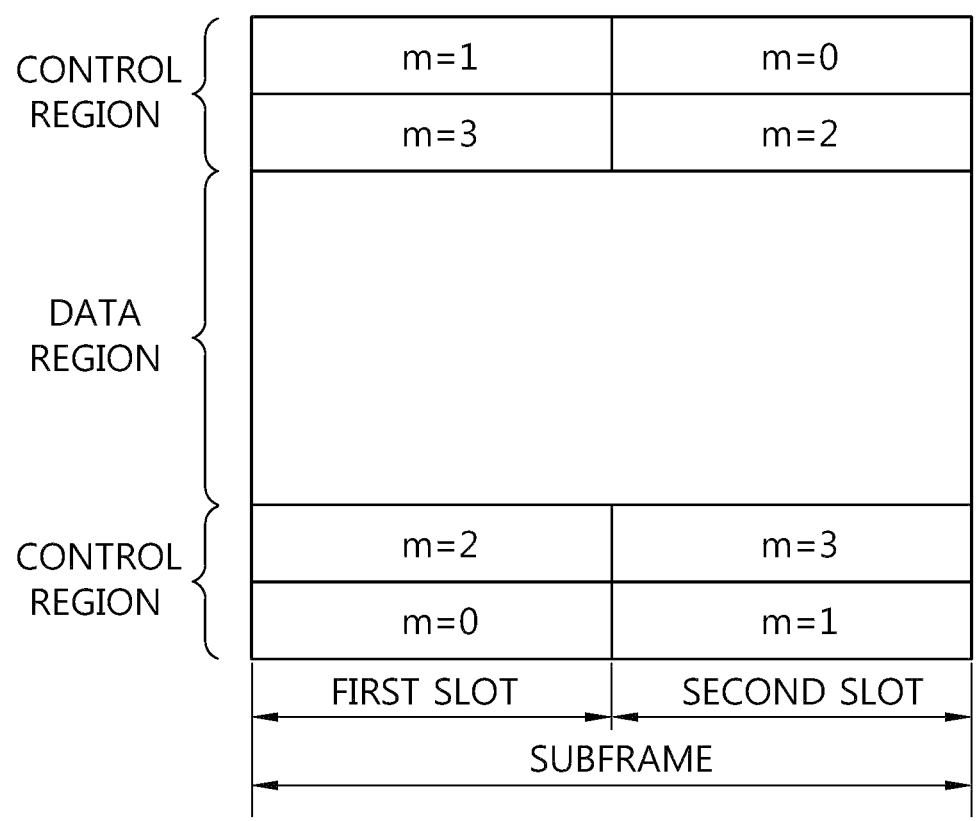
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Meanwhile, an SC-FDMA transmission scheme is now described.

LTE (Long-Term Evolution) adopts, for uplink, SC (Single-Carrier) FDMA that is similar to OFDM (Orthogonal Frequency Division Multiplexing).

SC-FDMA may also be referred to as DFT-s OFDM (DFT-spread OFDM). In case the SC-FDMA transmission scheme is used, a non-linear distortion section of a power amplifier may be avoided, so that transmission power efficiency may be increased in a terminal with limited power consumption. Accordingly, user throughput may be increased.

SC-FDMA is similar to OFDM in that a signal is carried over split sub-carriers using FFT (Fast Fourier Transform) and IFFT (Inverse-FFT). However, an issue with the existing OFDM transmitter lies in that signals conveyed on respective sub-carriers on frequency axis are transformed into time-axis signals by IFFT. That is, in IFFT, the same operation is operated in parallel, resulting in an increase in PAPR (Peak to Average Power Ratio). In order to prevent such PAPR increase, SC-FDMA performs IFFT after DFT spreading unlike OFDM. That is, such transmission scheme that, after DFT spreading, IFFT is conducted is referred to as SC-FDMA. Accordingly, SC-FDMA is also referred to as DFT spread OFDM (DFT-s-OFDM) in the same meaning.

As such, advantages of SC-FDMA include providing robustness over a multi-path channel that comes from the fact that it has a similar structure to OFDM while fundamentally resolving the problem of OFDM that PAPR is increased by IFFT operation, thereby enabling effective use of a power amplifier.

Meanwhile, the 3GPP is devoting its energy to standardizing LTE-Advanced that is an evolutional version of LTE, and the clustered DFT-s-OFDM scheme has been adopted which permits non-contiguous resource allocation.

The clustered DFT-s OFDM transmission scheme is a variation of the existing SC-FDMA transmission scheme, and in this scheme, data symbols that have undergone a precoder are split into a plurality of sub-blocks that are mapped, separated from each other in the frequency domain.

Meanwhile, the LTE-A system is described in further detail.

A major feature of the clustered DFT-s-OFDM scheme is to enable frequency-selective resource allocation so as to flexibly deal with a frequency selective fading environment.

At this time, in the clustered DFT-s-OFDM scheme adopted as uplink access scheme in LTE-Advanced, unlike SC-FDMA that is a conventional LTE uplink access scheme, non-contiguous resource allocation is allowed, so that uplink data transmitted may be split into several cluster units.

That is, while the LTE system is configured to maintain the single carrier characteristic in the case of uplink, the LTE-A system permits DFT_precoded data to be assigned along the frequency axis in a non-contiguous way or both a PUSCH and a PUCCH to be transmitted at the same time. In such case, it is difficult to maintain the single carrier characteristic.

A carrier aggregation system is now described.

Figure 7:
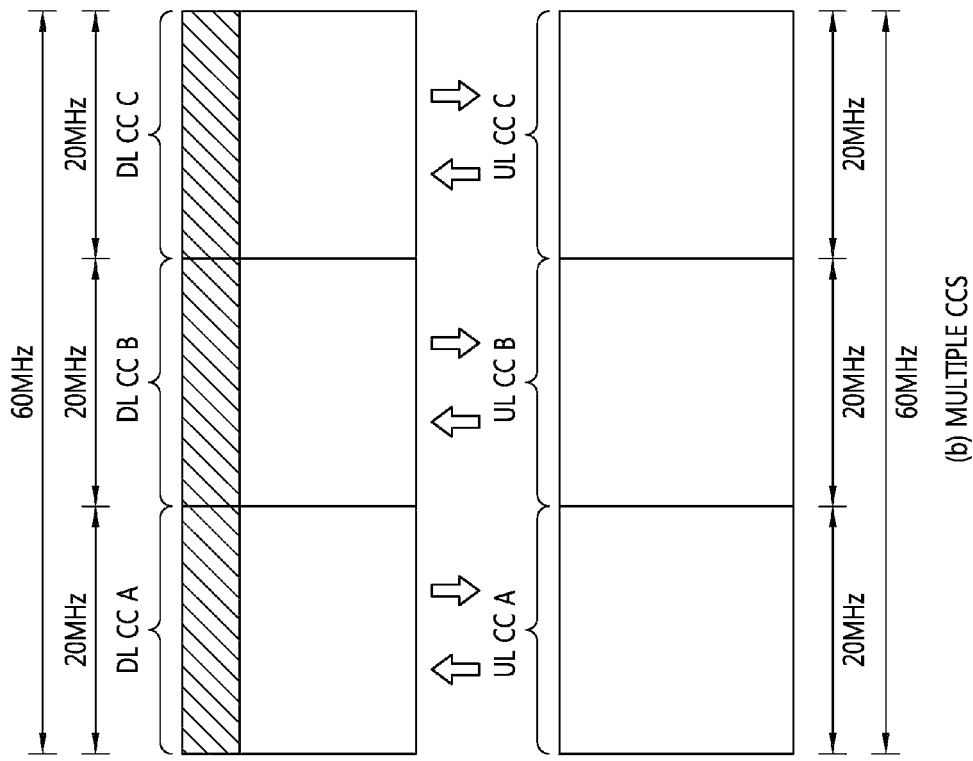
FIG. 7, including (a) and (b), illustrates an example of comparison between a single carrier system and a carrier aggregation system.
Figure 7:
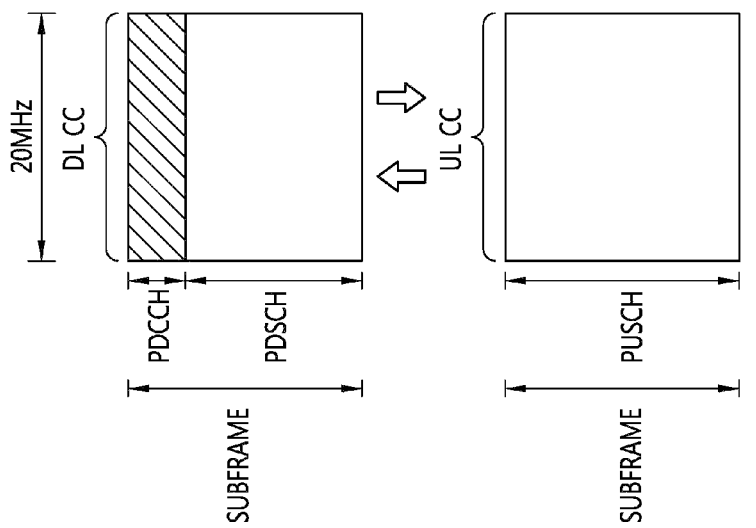

FIG. 7, including (a) and (b), illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PDSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
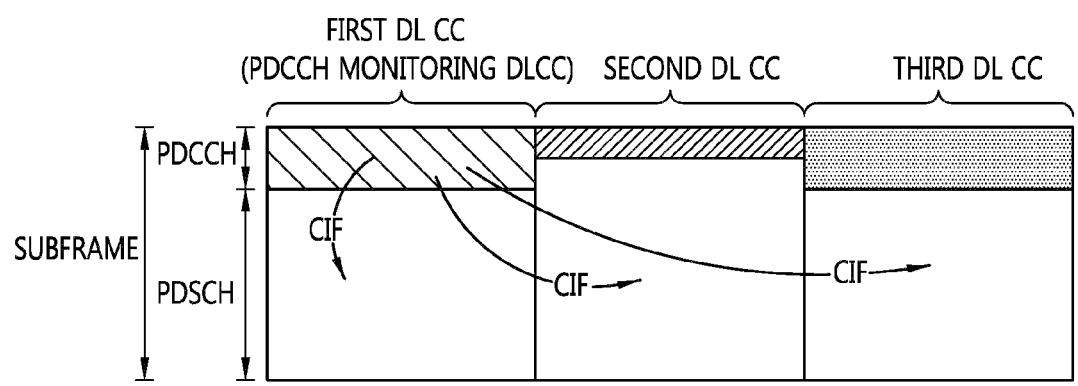
FIG. 8 illustrates an example of cross-carrier scheduling in a carrier aggregation system.

FIG. 8 illustrates an example of cross-carrier scheduling in a carrier aggregation system.

Referring to FIG. 8, the base station may configure a PDCCH monitoring DL CC (monitoring CC) set. The PDCCH monitoring DL CC set consists of some of all the aggregated DL CCs. If cross-carrier scheduling is configured, the terminal conducts PDCCH monitoring/decoding only on the DL CCs included in the PDCCH monitoring DL CC set. In other words, the base station transmits a PDCCH for PDSCH/PUSCH to be scheduled only through the DL CCs included in the PDCCH monitoring DL CC set. The PDCCH monitoring DL CC set may be configured terminal-specifically, terminal group-specifically, or cell-specifically.

In FIG. 8, three DL CCs (DL CC A, DL CC B, and DL CC C) are aggregated, and by way of example, DL CC A is set as the PDCCH monitoring DL CC set. The terminal may receive a DL grant for the PDSCH of DL CC A, DL CC B, and DL CC C through the PDCCH of DL CC A. The DCI transmitted through the PDCCH of DL CC A includes a CIF which allows it to be known which DL CC the DCI is for.

The CIF value is the same as the serving cell index value. The serving cell index is transmitted to the UE through an RRC signal. The serving cell index includes a value for identifying a serving cell, i.e., a first cell (primary cell) or a second cell (secondary cell). For example, 0 may represent a first cell (primary cell).

Figure 9:
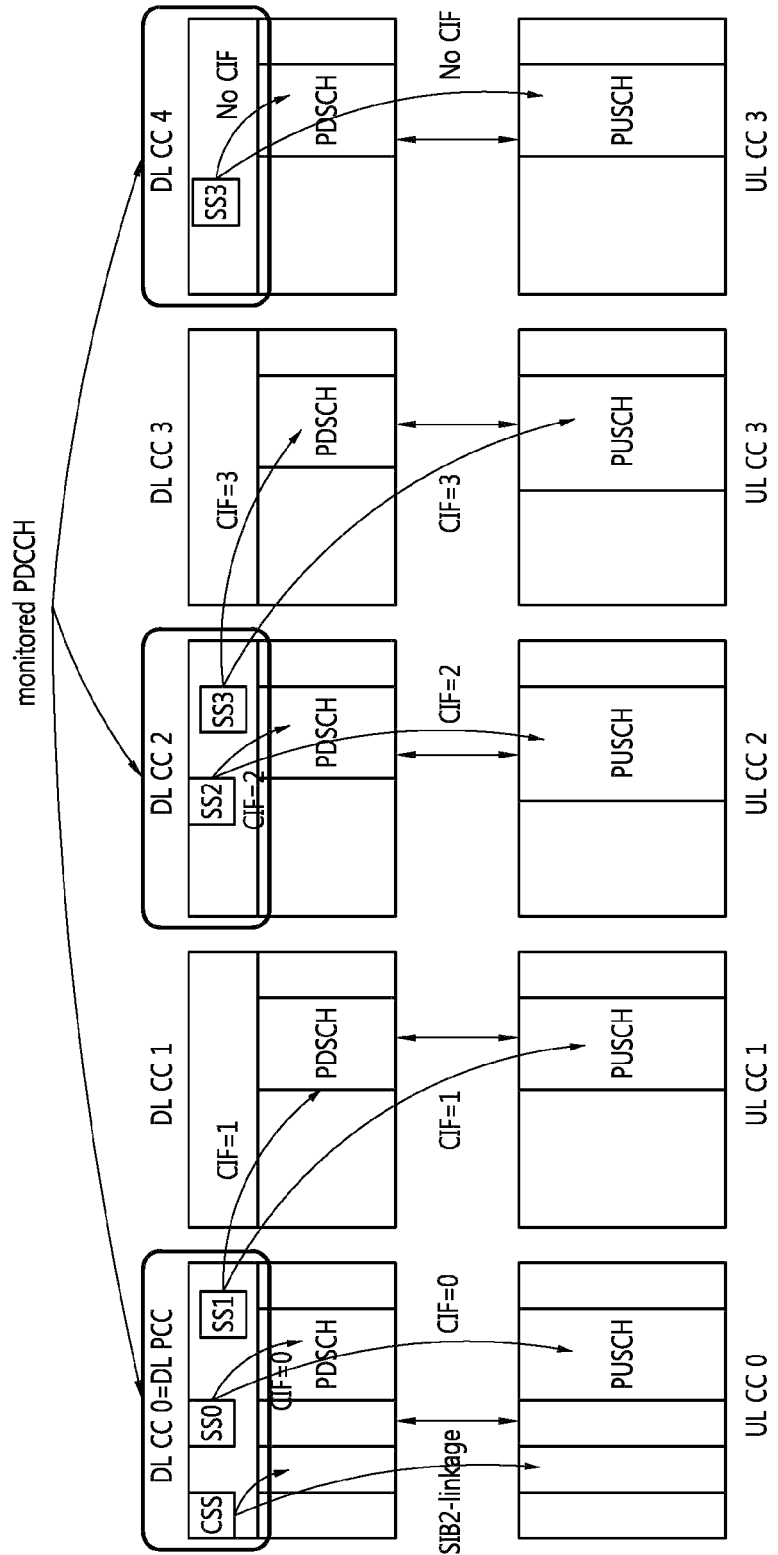
FIG. 9 illustrates example scheduling when cross-carrier scheduling is configured in a carrier aggregation system.

FIG. 9 illustrates example scheduling when cross-carrier scheduling is configured in a carrier aggregation system.

Referring to FIG. 9, DL CC 0, DL CC 2, and DL CC 4 are a PDCCH monitoring DL CC set. The terminal searches a DL grant/UL grant for DL CC 0, UL CC 0 (UL CC linked via SIB2 with DL CC 0) in the CSS of DL CC 0. In SS 1 of DL CC 0, a DL grant/UL grant for DL CC 1, UL CC 1 is searched. SS 1 is an example of the USS. That is, SS 1 of DL CC 0 is a search space for searching a DL grant/UL grant performing cross-carrier scheduling.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 10:
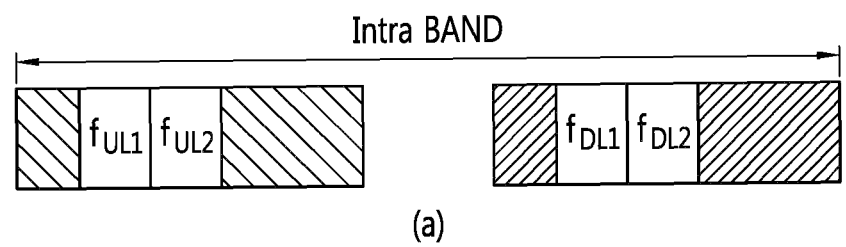
FIG. 10, including (a) and (b), is a concept view illustrating intra-band carrier aggregation (CA).
Figure 10:
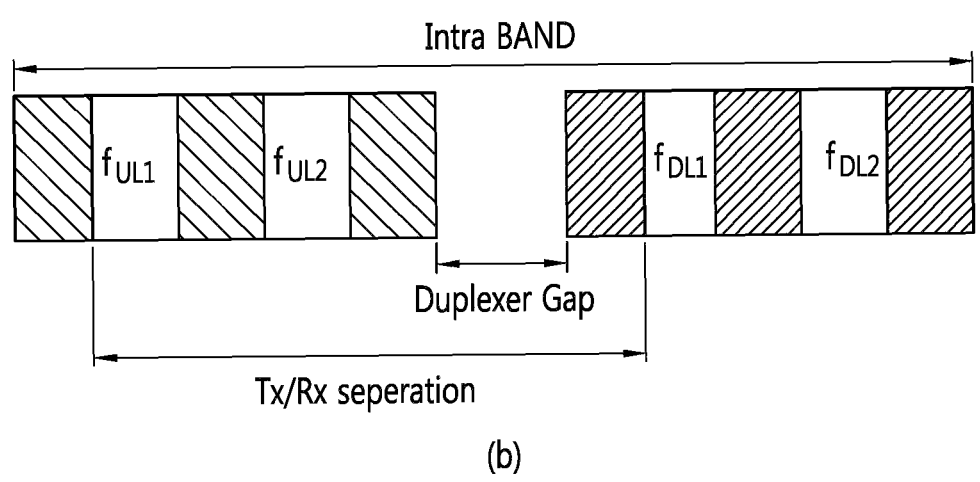

FIG. 10, including (a) and (b), is a concept view illustrating intra-band carrier aggregation (CA).

FIG. 10(a) illustrates intra-band contiguous CA, and FIG. 10(b) illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 10(a) and the intra-band non-contiguous CA shown in FIG. 10(b).

Figure 11:
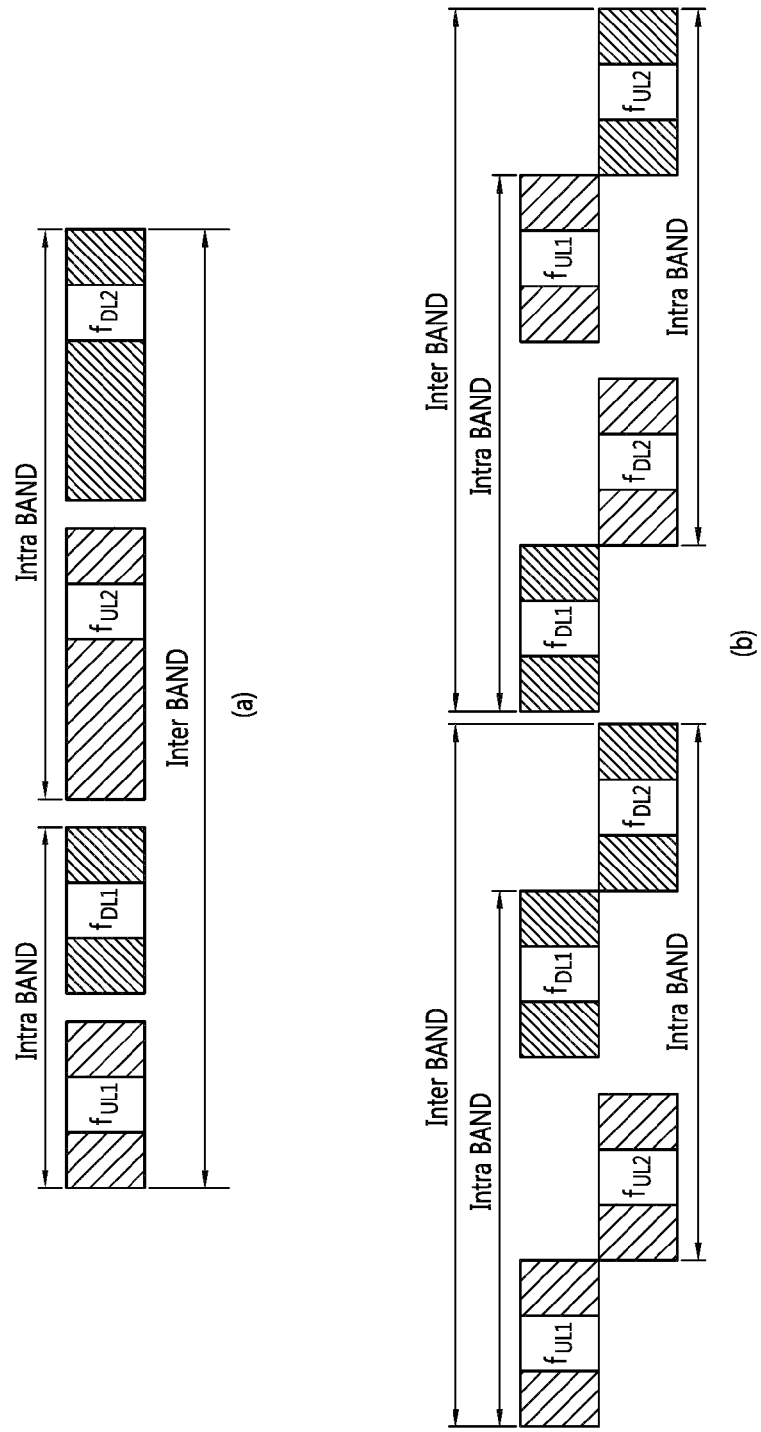
FIG. 11, including (a) and (b), is a concept view illustrating inter-band carrier aggregation.

FIG. 11, including (a) and (b), is a concept view illustrating inter-band carrier aggregation.

FIG. 11(a) illustrates a combination of a lower band and a higher band for inter-band CA, and FIG. 11(b) illustrates a combination of similar frequency bands for inter-band CA.

In other words, the inter-band carrier aggregation may be separated into inter-band CA between carriers of a low band and a high band having different RF characteristics of inter-band CA as shown in FIG. 11(a) and inter-band CA of similar frequencies that may use a common RF terminal per component carrier due to similar RF (radio frequency) characteristics as shown in FIG. 11(b).

TABLE 2

| Operating Band | Uplink (UL) operating band $F_{UL\ low}$-$F_{UL\ high}$ | Downlink (DL) operating band $F_{DL\ low}$-$F_{DL\ high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |

TABLE 2-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 11 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, intra-band contiguous CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
|---|---|---|---|
| A | $N_{RB,\ agg} \leq 100$ | 1 | a1$BW_{Channel(1)}$ − 0.5Δf1 (NOTE2) |
| B | $N_{RB,\ agg} \leq 100$ | 2 | 0.05 max($BW_{Channel(1)}$, $BW_{Channel(2)}$) − 0.5Δf1 |
| C | 100 < $N_{RB,\ agg}$ ≤ 200 | 2 | 0.05 max($BW_{Channel(1)}$, $BW_{Channel(2)}$) − 0.5Δf1 |
| D | 200 < $N_{RB,\ agg}$ ≤ [300] | FFS | 0.05 max($BW_{Channel(1)}$, $BW_{Channel(2)}$) − 0.5Δf1 |
| E | [300] < $N_{RB,\ agg}$ ≤ [400] | FFS | FFS |
| F | [400] < $N_{RB,\ agg}$ ≤ [500] | FFS | FFS |

NOTE1:
$BW_{Channel(j)}$, j = 1, 2, 3 is the channel bandwidth of the E-UTRA component carriers defined in TS36.101 table 5.6-1, Δf1 represents subcarrier spacing of Δf when downlink, and Δf1 = 0 in downlink.

(NOTE2):
In case that the channel frequency bandwidth is 1.4 MHz, a1 = 0.16/1.4, and in the remainder frequency band, a1 = 0.05

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to intra-band contiguous CA configurations.

TABLE 4

E-UTRA CA configuration/Bandwidth combination set

| E-UTRA CA config- uration | Channel frequency bandwidth permitted by each carrier | Channel frequency bandwidth permitted by each carrier | Channel frequency bandwidth permitted by each carrier | Maximum aggregated bandwidth [MHz] | Bandwidth Combination Set |
|---|---|---|---|---|---|
| CA_1C | 15 | 15 | | 40 | 0 |
| | 20 | 20 | | | |
| CA_3C | 5, 10, 15 | 20 | | 40 | 0 |
| | 20 | 5, 10, 15, 20 | | | |
| CA_7C | 15 | 15 | | 40 | 0 |
| | 20 | 20 | | | |
| | 10 | 20 | | 40 | 1 |
| | 15 | 15, 20 | | | |
| | 20 | 10, 15, 20 | | | |
| CA_23B | 10 | 10 | | 20 | 0 |
| | 5 | 15 | | | |
| CA_27B | 1.4, 3, 5 | 5 | | 13 | 0 |
| | 1.4, 3 | 10 | | | |
| CA_38C | 15 | 15 | | 40 | 0 |
| | 20 | 20 | | | |
| CA_39C | 5, 10, 15 | 20 | | 35 | 0 |
| | 20 | 5, 10, 15 | | | |
| CA_40C | 10 | 20 | | 40 | 0 |
| | 15 | 15 | | | |
| | 20 | 10, 20 | | | |
| CA_41C | 10 | 20 | | 40 | 0 |
| | 15 | 15, 20 | | | |
| | 20 | 10, 15, 20 | | | |
| | 5, 10 | 20 | | 40 | 1 |
| | 15 | 15, 20 | | | |
| | 20 | 5, 10, 15, 20 | | | |
| CA_40D | 10, 20 | 20 | 20 | 60 | 0 |
| | 20 | 10 | 20 | | |
| | 20 | 20 | 10 | | |
| CA_41D | 10 | 20 | 15 | 60 | 0 |
| | 10 | 15, 20 | 20 | | |
| | 15 | 20 | 10, 15 | | |
| | 15 | 10, 15, 20 | 20 | | |
| | 20 | 15, 20 | 10 | | |
| | 20 | 10, 15, 20 | 15, 20 | | |
| CA_42C | 5, 10, 15, 20 | 20 | 5, 10, 15, 20 | 40 | 0 |
| | 20 | 5, 10, 15 | 20 | | |

In the above table, CA configuration represents an operating bandwidth and CA bandwidth class. For example, CA_1C means operating band 2 in Table 2 and CA band class C in Table 3. All of the CA operating classes may apply to bands that are not shown in the above table. In addition, class D is added in Rel-12 as represented in the above table, through this, maximum 3 carriers can be transmitted from the intra-band continuous CA at the same time.

Figure 12:
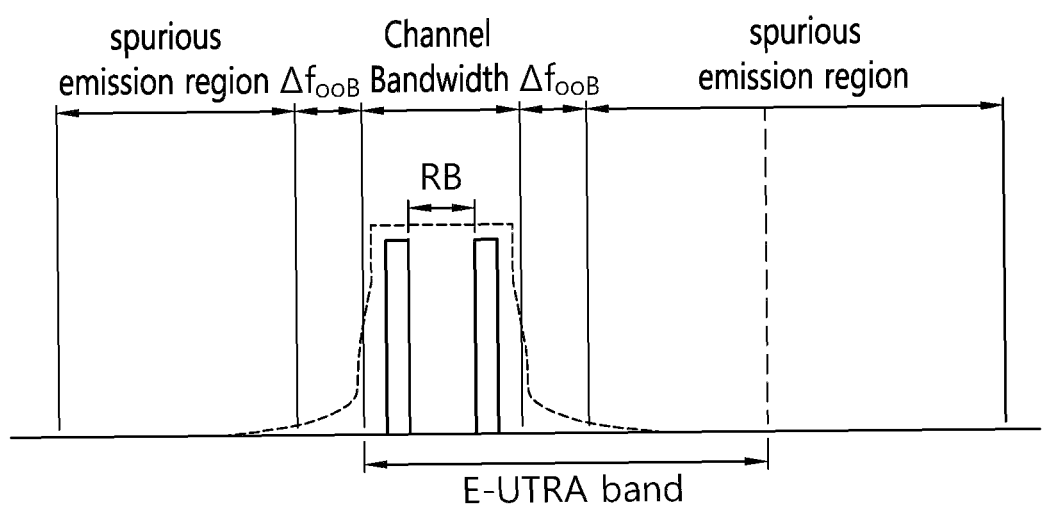
FIG. 12 illustrates the concept of unwanted emission.
Figure 13:
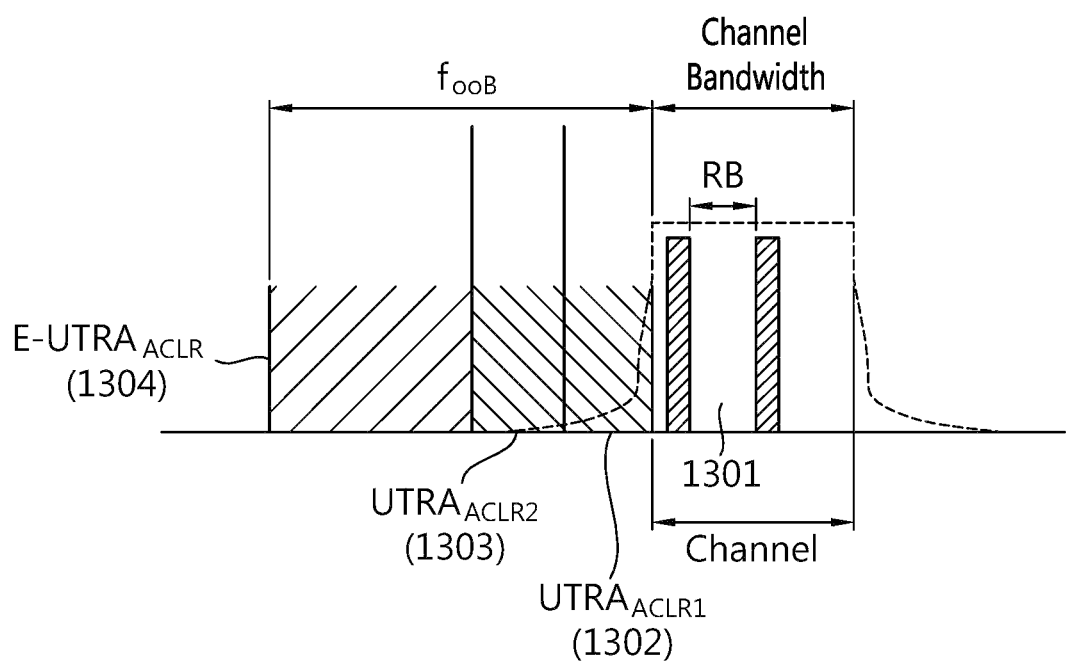
FIG. 13 specifically illustrates out-of-band emission of the unwanted emission shown in FIG. 12.
Figure 14:
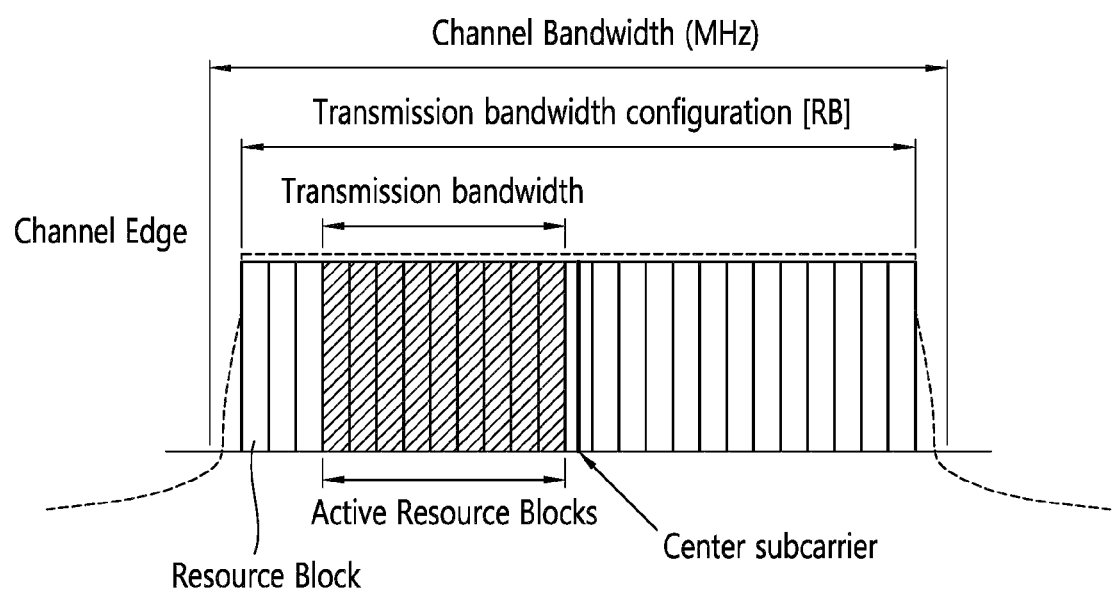
FIG. 14 illustrates a relationship between the resource block RB and channel band (MHz) shown in FIG. 12.

FIG. 12 illustrates the concept of unwanted emission. FIG. 13 specifically illustrates out-of-band emission of the unwanted emission shown in FIG. 12. FIG. 14 illustrates a relationship between the resource block RB and channel band (MHz) shown in FIG. 12.

As can be seen from FIG. 12, a transmission modem sends a signal over a channel bandwidth assigned in an E-UTRA band.

Here, the channel bandwidth is defined as can be seen from FIG. 14. That is, a transmission bandwidth is set to be smaller than the channel bandwidth ($BW_{channel}$). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 5

| | Channel bandwidth $BW_{Channel}$ [MHz] | | | | | |
|---|---|---|---|---|---|---|
| | 1.4 | 3 | 5 | 10 | 15 | 20 |
| Transmission bandwidth settings NRB | 6 | 15 | 25 | 50 | 75 | 100 |

Turning back to FIG. 12, unwanted emission arises in the band of $\Delta f_{OOB}$, and as shown, unwanted emission also occurs on the spurious area. Here, $\Delta f_{OOB}$ means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

In the meantime, as illustrated in FIG. 13, if transmission is conducted in the E-UTRA channel band 1301, leakage, i.e., unwanted emission, occurs to out-of-bands (1302, 1303, and 1304 in the shown $f_{ooB}$ area).

Here, $UTRA_{ACLT1}$ denotes a ratio of leakage to a channel 1302 to an E-UTRA channel 1301, i.e., an adjacent channel leakage ratio, in case the adjacent channel 1302 is the one for UTRA when a terminal conducts transmission on the E-UTRA channel 1301. $UTRA_{ACLR2}$ is a ratio of leakage to a channel 1303 (a UTRA channel) located to the adjacent channel 1302, i.e., an adjacent channel leakage ratio, in case the channel 1303 is the one for UTRA, as shown in FIG. 13. $E\text{-}UTRA_{ACLR}$ is a ratio of leakage to an adjacent channel 1304 (i.e., an E-UTRA channel) when the terminal conducts transmission through the E-UTRA channel 1301, i.e., an adjacent channel leakage ratio.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device.

Accordingly, the terminal's transmission power needs to be limited.

In the LTE system, a maximum power Pcmax in the UE is simply expressed as follows.

$$P\text{cmax} = \text{Min}(P\text{emax}, P\text{umax}) \quad \text{[Equation 1]}$$

Where, the Pcmax represents maximum power (actual maximum transmission power) where the UE may transmit in a corresponding cell, and the Pemax represents usable maximum power in a corresponding cell to which the BS signals. Further, the Pumax represents maximum power of the UE on which Maximum Power Reduction (hereinafter referred to as "MPR") and Additional-MPR (hereinafter referred to as "A-MPR") are considered.

The maximum power $P_{PowerClass}$ of the UE is listed in a following table 6.

TABLE 6

| Operating band | Power class 1 (dBm) | Power class 3 (dBm) |
|---|---|---|
| 1, 2, 3, 4, 5, 6, 7, 8, 9, 10, 11, 12, 13, 14, 17, 18, 18, 19, 20, 21, 22, 23, 24, 25, 26, 27, 28, 30, 31, 33, 34, 35, 36, 37, 38, 39, 40, 41, 42, 43, 44 | | 23 dBm |
| 14 | 31 dBm | |

Meanwhile, in a case of intra-band continuous CA. maximum power $P_{PowerClass}$ of the UE is listed in a following table 7.

TABLE 7

| Operating Band | Power class 3 (dBm) |
|---|---|
| CA_1C | 23 dBm |
| CA_3C | 23 dBm |
| CA_7C | 23 dBm |
| CA_38C | 23 dBm |
| CA_39C | 23 dBm |
| CA_40C | 23 dBm |
| CA_41C | 23 dBm |
| CA_42C | 23 dBm |

Figure 15:
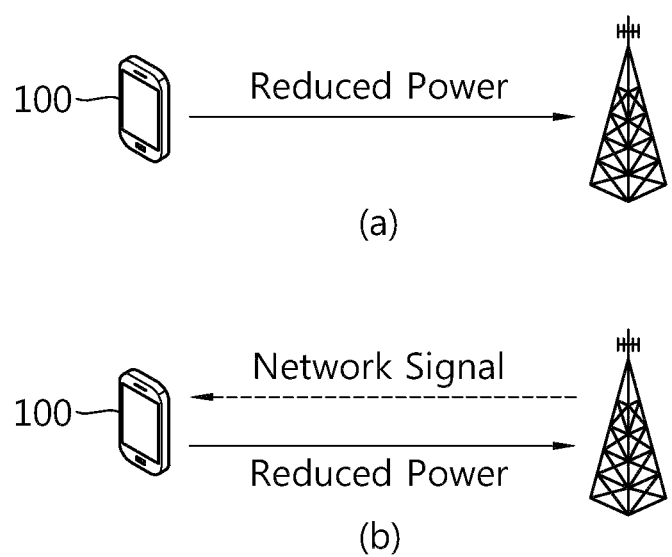
FIG. 15, including (a) and (b), illustrates an example of a method of limiting transmission power of a terminal.

FIG. 15, including (a) and (b), illustrates an example of a method of limiting transmission power of a terminal.

As can be seen from FIG. 15(a), the terminal 100 conducts transmission with transmission power limited.

In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity. This is shown in the following table.

TABLE 8

| | Channel bandwidth/Transmission bandwidth (NRB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

Table 6 above represents MPR values for power classes 1 and 3.

<MPR According to 3GPP Release 11>

Meanwhile, according to 3GPP release 11, the terminal adopts multi-cluster transmission in a single CC (component carrier) and may simultaneously transmit a PUSCH and a PUCCH. As such, if the PUSCH and the PUCCH are transmitted at the same time, the size of the IM3 component (which means a distortion signal generated by intermodulation) that occurs at an out-of-band area may be increased as compared with the existing size, and this may serve as larger interference to an adjacent band. Thus, the following MPR value may be set so as to meet general spurious emission, ACLR (adjacent channel leakage ratio) and general SEM (spectrum emission mask) that are the terminal's emission requirements that should be observed by the terminal upon uplink transmission.

$$MPR = CEIL\{M_A, 0.5\}$$ [Equation 2]

Here, $M_A$ is as follows.

$M_A = [8.0] - [10.12]A;\ 0 < A \leq f0.33]$ $[5.67] - [3.07]A;\ f0.33] < A \leq f0.77]$ $[3.31];\ [0.77] < A \leq f1.0]$ Here, A is as follows.

$A = N_{RB\_alloc}/N_{RB}$.

$N_{RB\_agg}$ is the number of RBs in the channel band, and $N_{RB\_alloc}$ is the total number of RBs that are transmitted at the same time.

$CEIL\{M_A, 0.5\}$ is a function that rounds off on a per-0.5 dB basis. That is, MPR∈[3.0, 3.5 4.0 4.5 5.0 5.5 6.0 6.5 7.0 7.5 8.0].

The MPR value shown in Equation 2 above is the one that applies when a general PA (power amplifier) is used. If a high efficiency power amplifier (HEPA) that is recently being researched is used, an MPR value of a higher level may be needed. However, despite its advantage that it may reduce power consumption and heat radiation by 30% or more, the HEPA suffers from reduced cell coverage that comes from demand of a larger MPR value. Further, since linearity is guaranteed only up to 20 MHz to date, linearity is not insured considering carrier aggregation (CA).

<General MPR>

Taking the CA into account, the channel bandwidth of uplink, meanwhile, may be increased up to 40 MHz (20 MH+20 MHz), and accordingly, a larger MPR value is needed.

TABLE 9

| | CA bandwidth Class C | | | | |
|---|---|---|---|---|---|
| Modulation | 50 RB + 100 RB | 75 RB + 75 RB | 75 RB + 100 RB | 100 RB + 100 RB | MPR (dB) |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤18 | ≤1 |
| 16 QAM | >12 and ≤50 | >16 and ≤75 | >16 and ≤75 | >18 and ≤100 | ≤2 |
| 16 QAM | >50 | >75 | >75 | >100 | ≤3 |

Table 9 above represents MPR values for power class 3.

As in Table 9, in the case of class C of intra contiguous CA, an MPR value up to 3 dB may apply depending on modulation schemes. Meanwhile, under the environment of CA class C, the MPR value as follows should be met considering multi-cluster transmission.

$$MPR = CEIL\{M_A, 0.5\}$$ [Equation 3]

Here, $M_A$ is as follows.

$MA = 8.2;\ 0 \leq A < 0.025$ $9.2 - 40A;\ 0.025 \leq A < 0.05$ $8 - 16A;\ 0.05 \leq A < 0.25$ $4.83 - 3.33A;\ 0.25 \leq A \leq 0.4,$ $3.83 - 0.83A;\ 0.4 \leq A \leq 1,$

<A-MPR>

As can be seen from FIG. 15(b), the base station may apply A-MPR (additional maximum power reduction) by transmitting a network signal (NS) to the terminal 100. The A-MPR, unlike the above-mentioned MPR, is that the base station transmits the network signal (NS) to the terminal 100 operating at a specific operating band so that the terminal 100 conducts additional power reduction in order not to affect adjacent bands, for example, not to give interference to the adjacent bands. That is, if a terminal applied with MPR receives a network signal (NS), A-MPR is additionally applied to determine transmission power.

The following table represents A-MPR values per network signal.

TABLE 10

| Network Signaling value | Channel bandwidth (MHz) | Resources Blocks (NRB) | A-MPR (dB) |
| --- | --- | --- | --- |
| NS_01 | 1.4, 3, 5, 10, 15, 20 | | Not defined |
| NS_03 | 3 | >5 | ≤1 |
| | 5 | >6 | ≤1 |
| | 10 | >6 | ≤1 |
| | 15 | >8 | ≤1 |
| | 20 | >10 | ≤1 |
| NS_04 | 5 | >6 | ≤1 |
| NS_05 | 10, 15, 20 | ≥50 | ≤1 |
| NS_06 | 1.4, 3, 5, 10 | — | Not defined |
| NS_07 | 10 | Shown in Table 9 | |
| NS_08 | 10, 15 | >44 | ≤3 |
| NS_09 | 10, 15 | >40 | ≤1 |
| | | >55 | ≤2 |
| NS_18 | 5 | ≥2 | ≤1 |
| | 10, 15, 20 | ≥1 | ≤4 |

The following table represents A-MPR values when the network signal is NS_07.

TABLE 11

| Parameter | | Region A | Region B | Region C |
| --- | --- | --- | --- | --- |
| $RB_{start}$ | | 0-12 | 13-18 | 19-42 | 43-49 |
| $L_{CRB}$ [RBs] | 6-8 | 1-5, 9-50 | ≥8 | ≥18 | ≤2 |
| A-MPR [dB] | ≤8 | ≤12 | ≤12 | ≤6 | ≤3 |

In the above table, $RB_{start}$ indicates the lowest RB index of a transmission RB. $L_{CRB}$ indicates the length of consecutive RB allocations.

For example, in case the terminal provided with a service using a 10 MHz channel bandwidth receives NS_07 as a network signal, the terminal determines transmission power according to the above table and transmits the determined transmission power. In other words, in case the terminal instructs 5 RBs to be continuously sent from the $10^{th}$ RB that is a start point of the RBs when decoding a received uplink grant, the terminal may send the A-MPR value with up to 12 dB applied. Accordingly, the terminal's transmission power may apply alongside the equation for obtaining $P_{cmax}$ below. $P_{cmax}$ should satisfy the following conditions.

$$P_{CMAX\_L} \le P_{CMAX} \le P_{CMAX\_H} \quad \text{[Equation 4]}$$

Here, $P_{CMAX\_L}$ is obtained as follows.

$$P_{CMAX\_L} = \text{MIN}\{P_{EMAX} - \Delta T_C, P_{PowerClass} - \text{MAX}(\text{MPR}+A\text{-MPR}, P\text{-MPR}) - \Delta T_C\} \quad \text{[Equation 5]}$$

$P_{CMAX\_H}$ is obtained as follows.

$$P_{CMAX\_H} = \text{MIN}\{P_{EMAX}, P_{PowerClass}\} \quad \text{[Equation 6]}$$

$P_{EMAX}$ is given as P-Max through an RRC signal. $P_{PowerClass}$ represents the maximum UE power considering an allowable value. P-MPR is an allowable maximum power reduction. P-MPR may be obtained from the equation for yielding $P_{CMAX}$. $T_C$ may be 0 dB or 1.5 dB.

<A-MPR According to CA>

On the other hands, taking CA into consideration, the channel bandwidth of uplink may be increased up to 40 MHz (20 MHz+20 MHz), and accordingly, a larger MPR value is needed. Thus, in case the base station transmits a network signal to the terminal to protect a specific band in the CA environment, additional power reduction is conducted in the teiminal operating at the specific band, thereby protecting adjacent bands.

The following table represents CA configurations corresponding to network signals.

TABLE 12

| Network signal | CA configuration |
| --- | --- |
| CA_NS_01 | CA_1C |
| CA_NS_02 | CA_1C |
| CA_NS_03 | CA_1C |
| CA_NS_04 | CA_41C |
| CA_NS_05 | CA_38C |
| CA_NS_06 | CA_7C |
| CA_NS_07 | CA_39C |
| CA_NS_08 | CA_42C |
| CA_NS_07 | CA_39C |
| CA_NS_08 | CA_42C |

A-MPR for CS_NS_01 is summarized in detail in the following table.

TABLE 13

| Guard band | Frequency range (MHz) | Maximum level (dBm) | MBW (MHz) |
| --- | --- | --- | --- |
| E-UTRA band 34 | $F_{DL\_low}$-$F_{DL\_high}$ | −50 | 1 |
| Frequency range | 1884.5-1915.7 | −41 | 0.3 |

A-MPR for CS_NS_02 is summarized in detail in the following table.

TABLE 14

| Guard band | Frequency range (MHz) | Maximum level (dBm) | MBW (MHz) |
| --- | --- | --- | --- |
| E-UTRA band 34 | $F_{DL\_low}$-$F_{DL\_high}$ | −50 | 1 |
| Frequency range | 1900-1915 | −15.5 | 5 |
| Frequency range | 1915-1920 | +1.6 | 5 |

A-MPR for CS_NS_03 is summarized in detail in the following table.

TABLE 15

| Guard band | Frequency range (MHz) | Maximum level (dBm) | MBW (MHz) |
| --- | --- | --- | --- |
| E-UTRA band 34 | $F_{DL\_low}$-$F_{DL\_high}$ | −50 | 1 |
| Frequency range | 1880-1895 | −40 | 1 |
| Frequency range | 1895-1915 | −15.5 | 5 |
| Frequency range | 1915-1920 | +1.6 | 5 |

<Disclosure of the Present Specification>

Figure 16:
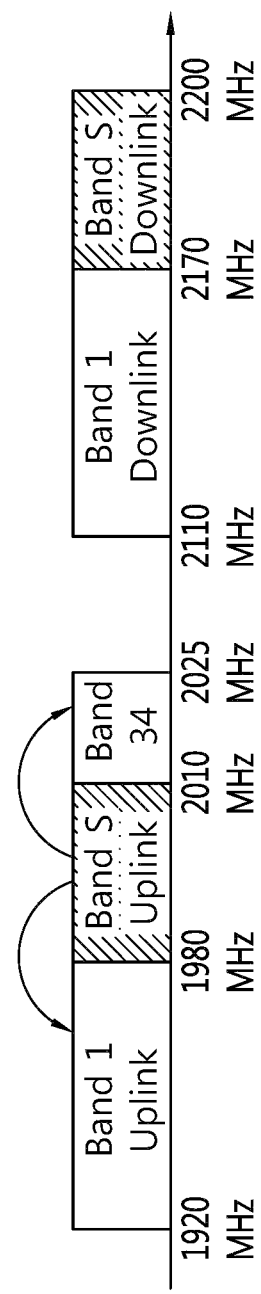
FIG. 16 illustrates an example of a specific band which has been discussed to be used recently interferes the band for existing LTE/LTE-A.

FIG. 16 illustrates an example of a specific band which has been discussed to be used recently interferes the band for existing LTE/LTE-A.

Referring to FIG. 16, band 1 and band 34 of Table 2 are shown on the frequency axis. And the band S depicted in FIG. 16 includes 1980 MHz to 2010 MHz as uplink and 2170 MHz to 2200 MHz as downlink. Such a band S is the band that has been used for satellite communication originally.

However, recently, it has been discussed that such a band S is to be used for the mobile communication based on LTE/LTE-A. In this time, notable is that the band S are completely adjoined with band 1 and band 34 since there is no guard bands. According to this, as shown in drawing, when a UE performs transmission in uplink band, it influences interference to the adjacent band 1 and band 34.

Accordingly, the SE requirement is necessary for coexistence between the UE that operates in the band S and the UE that operates in the adjacent band.

Therefore, the disclosure in this specification is objected to present the requirements for coexistence among UEs.

Particularly, a disclosure in this specification suggests A-MPR value that provides −50 dBm/MHz to protect, which is the existing general UE coexistence requirements, to UEs through network signaling. In this time, in order to prevent the cell coverage from being reduced due to excessively big A-MPR value, it is required to relax the coexistence requirements among UEs to some extent. Also, a disclosure in this specification suggests a scheme to restrict the location of RB and the number of RB allocated to UEs in order to minimize interference.

The requirements in relation to SE among the existing UE coexistence requirements between FDD and TDD are represented the table below.

TABLE 16

| | | Spurious emission | | |
|---|---|---|---|---|
| E-UTRA band | Guard band | Frequency range (MHz) | Maximum level (dBm) | MBW (MHz) |
| 1 | E-UTRA band 1, 5, 7, 8, 11, 18, 19, 20, 21, 22, 26, 27, 28, 31, 32, 38, 40, 41, 42, 43, 44 | $F_{DL\_low}$- $F_{DL\_high}$ | −50 | 1 |
| | E-UTRA Band 3, 34 | $F_{DL\_low}$- $F_{DL\_high}$ | −50 | 1 |
| | Frequency range | 1880 1895 | −40 | 1 |
| | Frequency range | 1895 1915 | −15.5 | 5 |
| | Frequency range | 1915 1920 | +1.6 | 5 |
| | Frequency range | 1884.5-1915.7 | −41 | 0.3 |
| | Frequency range | 1839.9-1879.9 | −50 | 1 |
| 7 | E-UTRA Band 1, 2, 3, 4, 5, 7, 8, 10, 12, 13, 14, 17, 20, 22, 27, 28, 29, 30, 31, 32, 33, 34, 40, 42, 43 | $F_{DL\_low}$- $F_{DL\_high}$ | −50 | 1 |
| | Frequency range | 2570-2575 | +1.6 | 5 |

TABLE 16-continued

| | | Spurious emission | | |
|---|---|---|---|---|
| E-UTRA band | Guard band | Frequency range (MHz) | Maximum level (dBm) | MBW (MHz) |
| | Frequency range | 2575-2595 | −15.5 | 5 |
| | Frequency range | 2595-2620 | −40 | 1 |

That is, in the table above, when the UE that uses band 7 is a source that causes interference, the SE requirement +1.5 dBm/5 MHz is applied for coexistence among UEs regarding the band of 2570 to 2575 MHz that adjoins the outside of band 7 among the adjacent frequency band. Also, regarding the frequency band of 2575 to 2595 MHz separated by 5 to 25 MHz or less, the SE requirement −15.5 dBm/5 MHz is applied, and lastly, regarding the frequency band separated by 25 MHz or more, the requirement −40 dBm/MHz is applied.

Of course, the matter of coexistence between the current band S and band 34 may be approached as the same as the matter of coexistence between the UE that operates in FDD and the UE that operates in TDD. This case may be represented by the table below.

TABLE 17

| | | Spurious emission | | |
|---|---|---|---|---|
| E-UTRA band | Guard band | Frequency range (MHz) | Level (dBm) | Band (MHz) |
| XX | E-UTRA band 1, 3, 5, 8, 26, XX, 40 | $F_{DL\_low}$- $F_{DL\_high}$ | −50 | 1 |
| | Frequency range | 2010-2015 | +1.6 | 5 |
| | Frequency range | 2015-2025 | −15.5 | 5 |

Meanwhile, in order to protect the UE that operates in the existing band 1 from the UE that operates in the band S or to protect the UE that operates in band 34, when applying −50 dBm/MHz which is the existing coexistence requirement among UEs, in case of not making a guard band between band 34 and the band S, how many A-MPR values are required is analyzed through simulations.

The assumptions and requirements for the simulations will be described below.

The modulator impairments are as follows.
I/Q imbalance: 25 dBc
Carrier leakage: 25 dBc
Counter IM3: 60 dBc
PA model:
$ACLR_{UTRA1}$: 33 dBc having 1 dB MPR for 20 MHz LTE UE
ACLR requirements: Same as Table 18 and Table 19 below
General SEM requirements: Same as Table 20 below
General SE requirements: Same as Table 21 below
Additional UE-to-UE SE requirements: −50 dBm/MHz, in order to protect band 34 from the UE performing transmission at uplink of the band S

TABLE 18

| | Channel bandwidth/E-UTRA$_{ACLR1}$/Measurement bandwidth | | | | | |
|---|---|---|---|---|---|---|
| | 1.4 MHz | 3.0 MHz | 5 MHz | 10 MHz | 15 MHz | 20 MHz |
| E-UTRA$_{ACLR1}$ | 30 dB | 30 dB | 30 dB | 30 dB | 30 dB | 30 dB |
| E-UTRA Channel measurement bandwidth | 1.08 MHz | 2.7 MHz | 4.5 MHz | 9.0 MHz | 13.5 MHz | 18 MHz |

TABLE 18-continued

| | Channel bandwidth/E-UTRA$_{ACLR1}$/Measurement bandwidth | | | | | |
|---|---|---|---|---|---|---|
| | 1.4 MHz | 3.0 MHz | 5 MHz | 10 MHz | 15 MHz | 20 MHz |
| Central frequency offset of adjacent channel [MHz] | +1.4/−1.4 | +3.0/−3.0 | +5/−5 | +10/−10 | +15/−15 | +20/−20 |

TABLE 19

| | Channel bandwidth/UTRA$_{ACLR1/2}$/Measurement bandwidth | | | | | |
|---|---|---|---|---|---|---|
| | 1.4 MHz | 3.0 MHz | 5 MHz | 10 MHz | 15 MHz | 20 MHz |
| UTRA$_{ACLR1}$ | 33 dB | 33 dB | 33 dB | 33 dB | 33 dB | 33 dB |
| Central frequency offset of adjacent channel [MHz] | 0.7 + BW$_{UTRA/2}$/ −0.7 − BW$_{UTRA/2}$ | 1.5 + BW$_{UTRA/2}$/ −1.5 − BW$_{UTRA/2}$ | +2.5 + BW$_{UTRA/2}$/ −2.5 − BW$_{UTRA/2}$ | +5 + BW$_{UTRA/2}$/ −5 − BW$_{UTRA/2}$ | +7.5 + BW$_{UTRA/2}$/ −7.5 − BW$_{UTRA/2}$ | +10 + BW$_{UTRA/2}$/ −10 − BW$_{UTRA/2}$ |
| UTRA$_{ACLR2}$ | — | — | 36 dB | 36 dB | 36 dB | 36 dB |
| Central frequency offset of adjacent channel [MHz] | — | — | +2.5 + 3*BW$_{UTRA/2}$/ −2.5 − 3*BW$_{UTRA/2}$ | +5 + 3*BW$_{UTRA/2}$/ −5 − 3*BW$_{UTRA/2}$ | +7.5 + 3*BW$_{UTRA/2}$/ −7.5 − 3*BW$_{UTRA/2}$ | +10 + 3*BW$_{UTRA/2}$/ −10 − 3*BW$_{UTRA/2}$ |
| E-UTRA Channel measurement bandwidth | 1.08 MHz | 2.7 MHz | 4.5 MHz | 9.0 MHz | 13.5 MHz | 18 MHz |
| UTRA 5 MHz Channel measurement bandwidth | 3.84 MHz | 3.84 MHz | 3.84 MHz | 3.84 MHz | 3.84 MHz | 3.84 MHz |
| UTRA 1.6 MHz Channel measurement bandwidth | 1.28 MHz | 1.28 MHz | 1.28 MHz | 1.28 MHz | 1.28 MHz | 1.28 MHz |

TABLE 20

Spectrum emission limit (dBm)/Channel bandwidth

| Δf$_{OOB}$ (MHz) | 1.4 MHz | 3.0 MHz | 5 MHz | 10 MHz | 15 MHz | 20 MHz | Measurement bandwidth |
|---|---|---|---|---|---|---|---|
| ±0-1 | −10 | −13 | −15 | −18 | −20 | −21 | 30 kHz |
| ±1-2.5 | −10 | −10 | −10 | −10 | −10 | −10 | 1 MHz |
| ±2.5-2.8 | −25 | −10 | −10 | −10 | −10 | −10 | 1 MHz |
| ±2.8-5 | | −10 | −10 | −10 | −10 | −10 | 1 MHz |
| ±5-6 | | −25 | −13 | −13 | −13 | −13 | 1 MHz |
| ±6-10 | | | −25 | −13 | −13 | −13 | 1 MHz |
| ±10-15 | | | | −25 | −13 | −13 | 1 MHz |
| ±15-20 | | | | | −25 | −13 | 1 MHz |
| ±20-25 | | | | | | −25 | 1 MHz |

TABLE 21

| Frequency range | Maximum level | Measurement bandwidth |
|---|---|---|
| 9 kHz ≤ f < 150 kHz | −36 dBm | 1 kHz |
| 150 kHz ≤ f < 30 MHz | −36 dBm | 10 kHz |
| 30 MHz ≤ f < 1000 MHz | −36 dBm | 100 kHz |
| 1 GHz ≤ f < 12.75 GHz | −30 dBm | 1 MHz |

In order to satisfy the requirements mentioned above, the RF simulations are performed several times. The simulation results in case that the starting position of the RB allocated to the UE that operates in the band S is zero are represented by FIGS. 17a to 17k. Also, The simulation results in case that the starting position of the RB allocated to the UE that operates in the band S is non zero are represented by FIGS. 18a to 18q. Hereinafter, the simulation results will be described below with reference to drawings.

FIGS. 17a to 17k are graphs illustrating the simulation results in case that the starting position of the RB allocated to the UE that operates in the band S is zero.

Figure 17A:
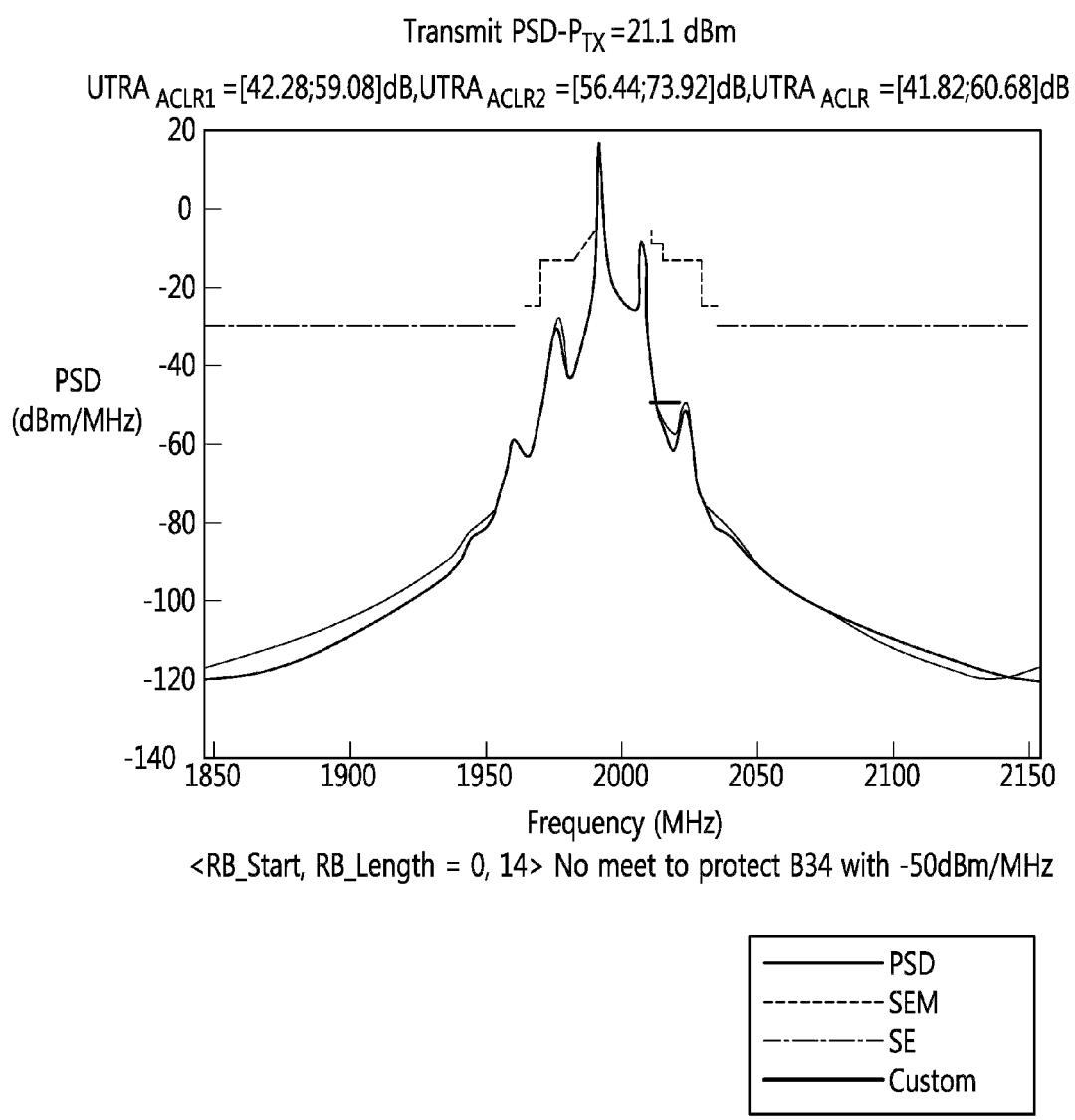
FIGS. 17a to 17k are graphs illustrating the simulation results in case that the starting position of the RB allocated to the UE that operates in the band S is zero.
Figure 17B:
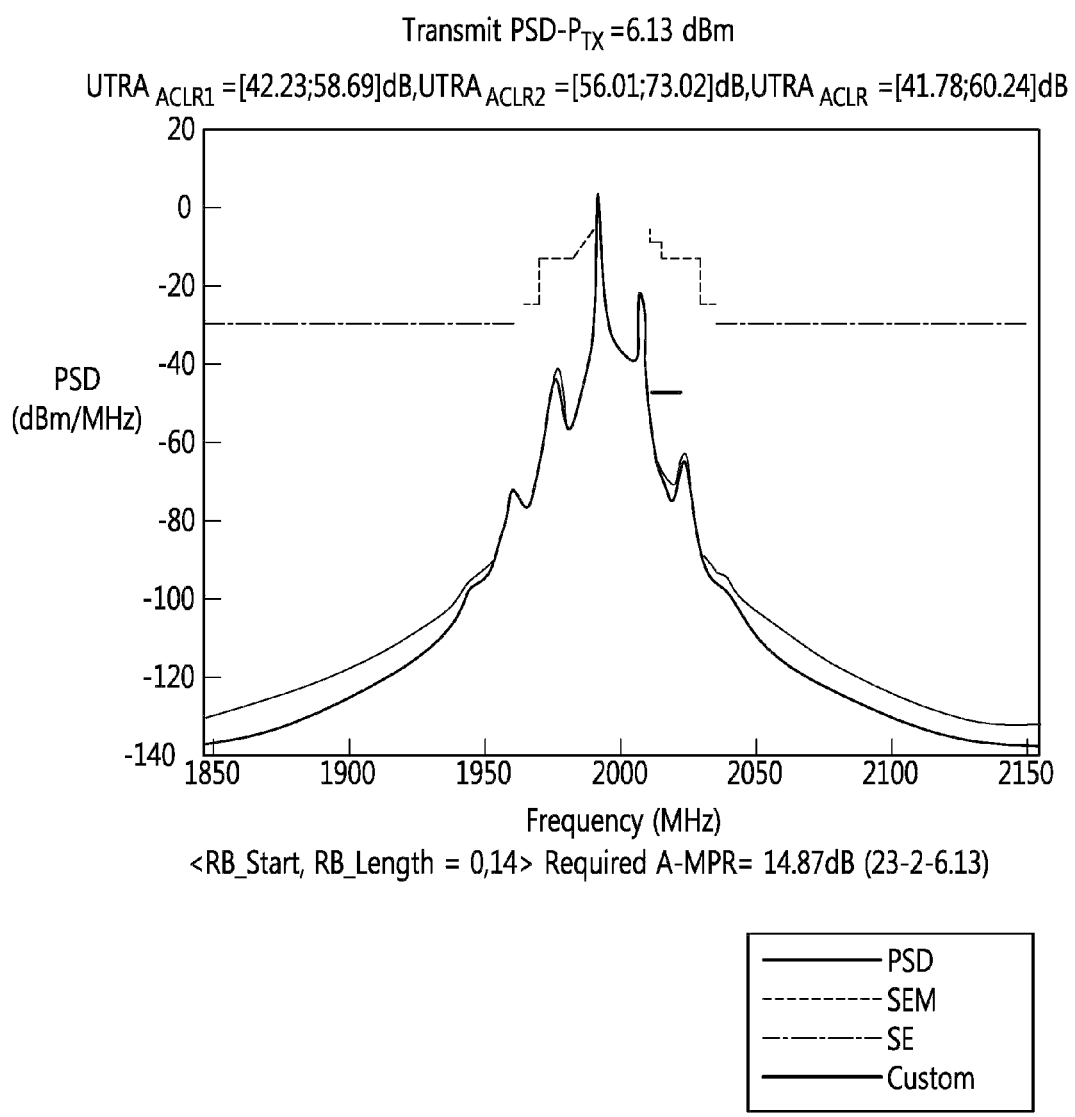
Figure 17C:
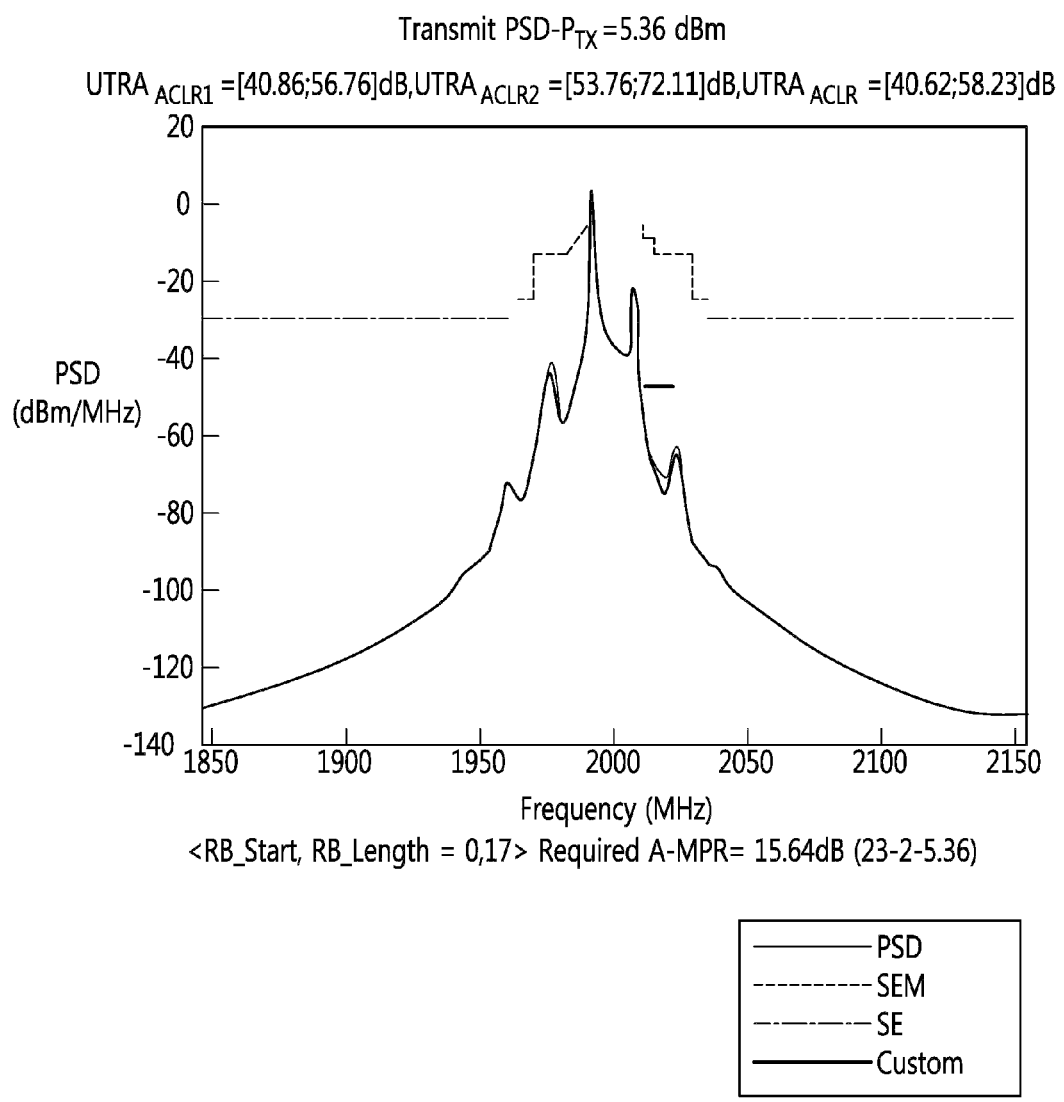
Figure 17D:
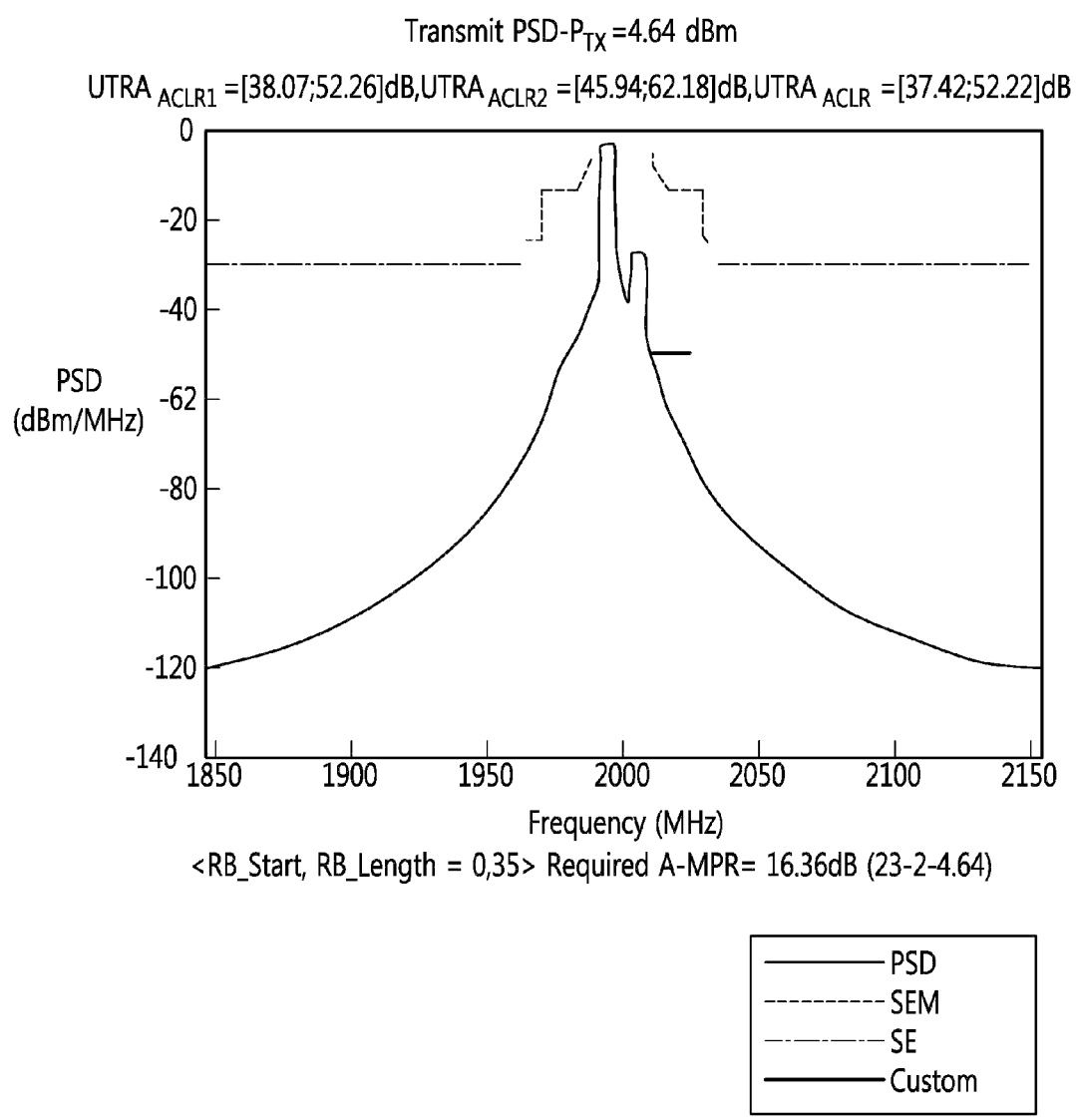
Figure 17E:
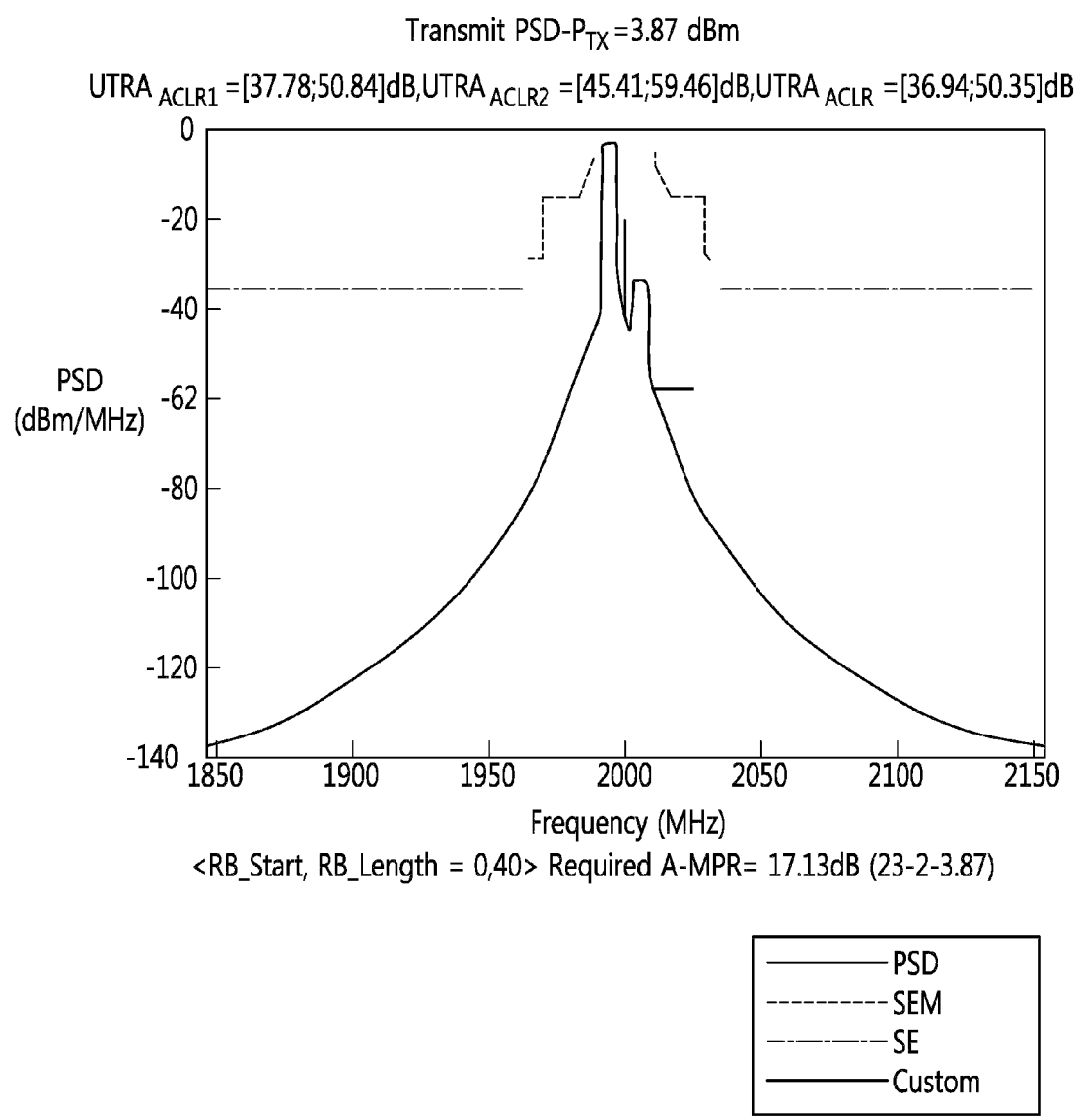
Figure 17F:
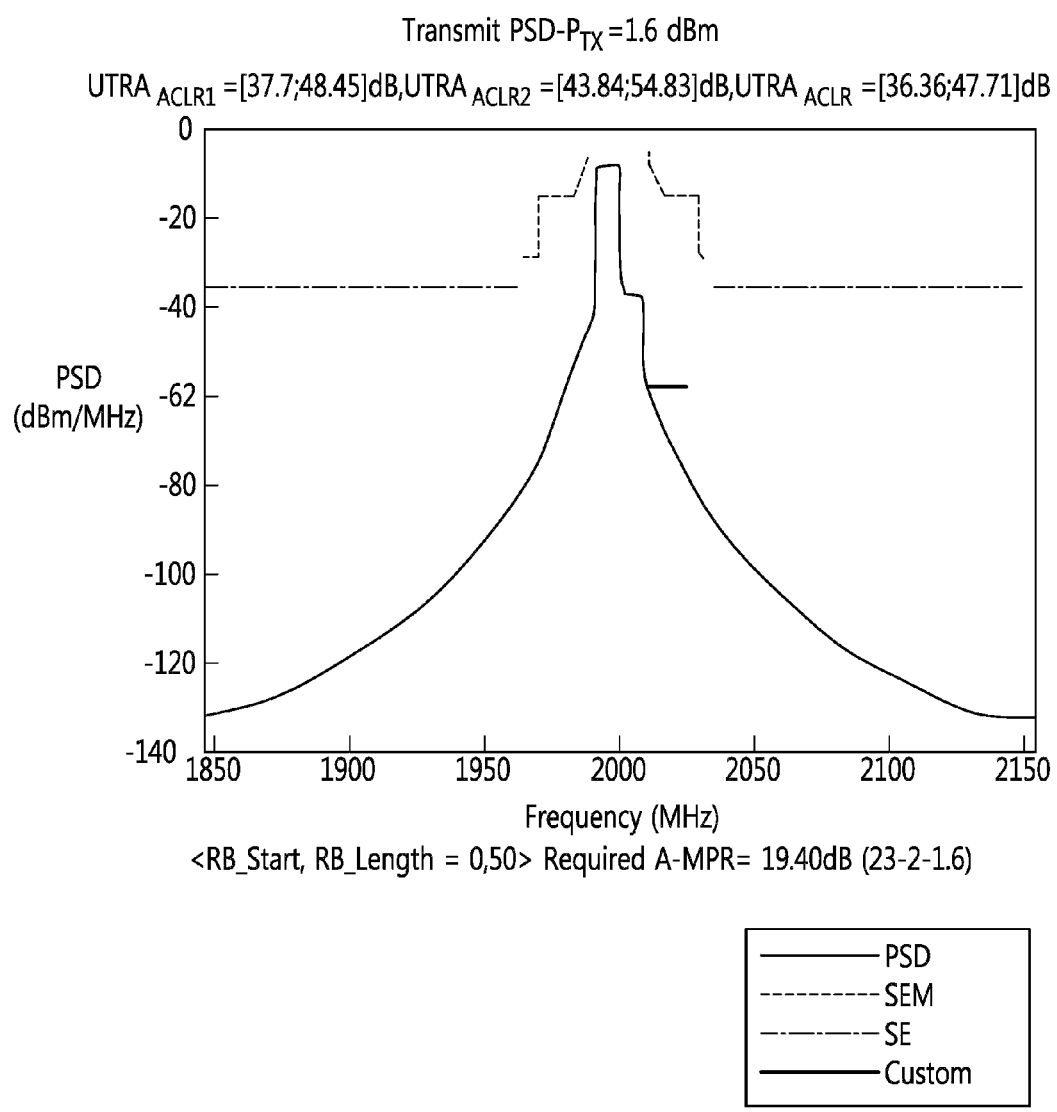
Figure 17G:
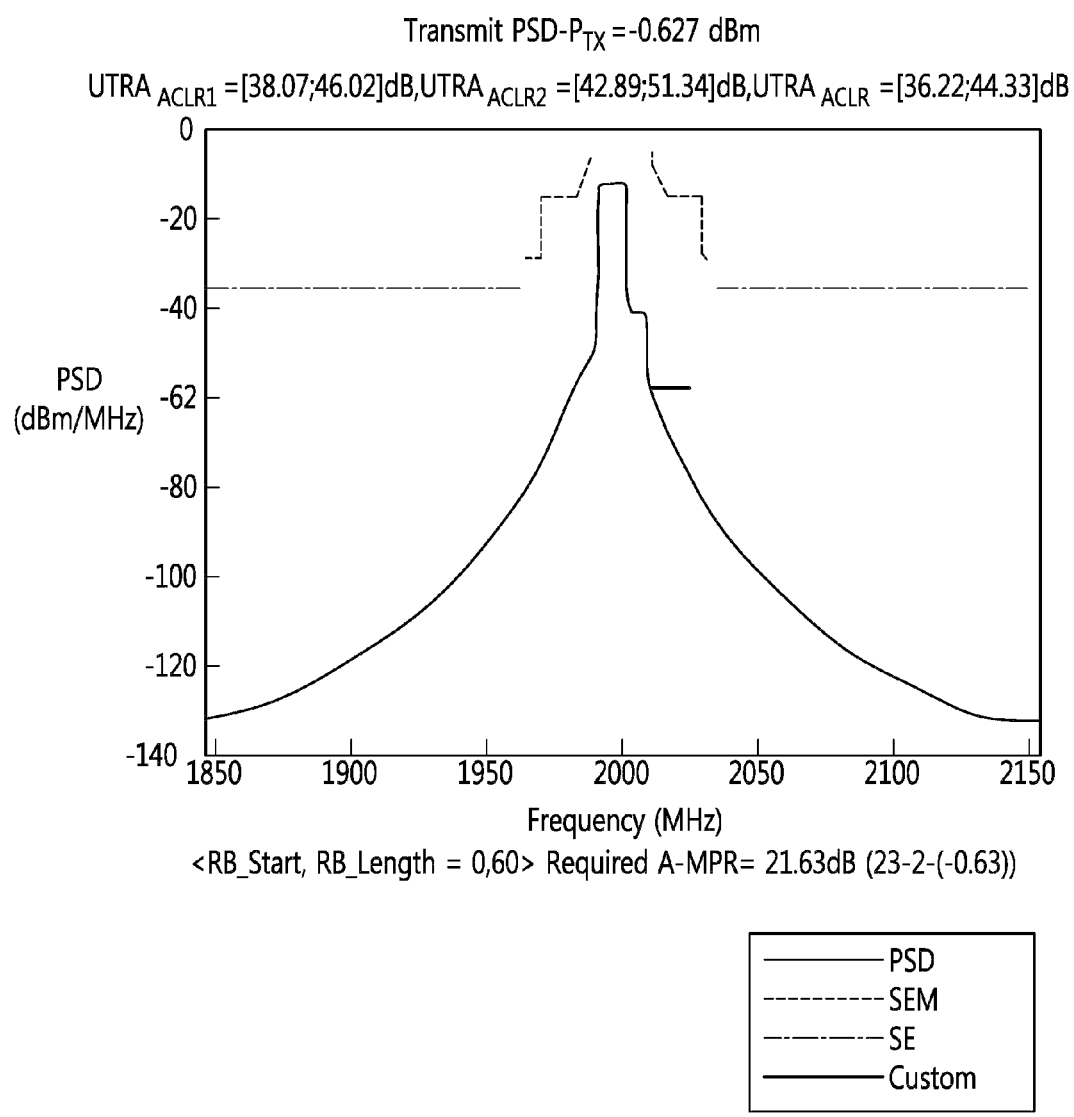
Figure 17H:
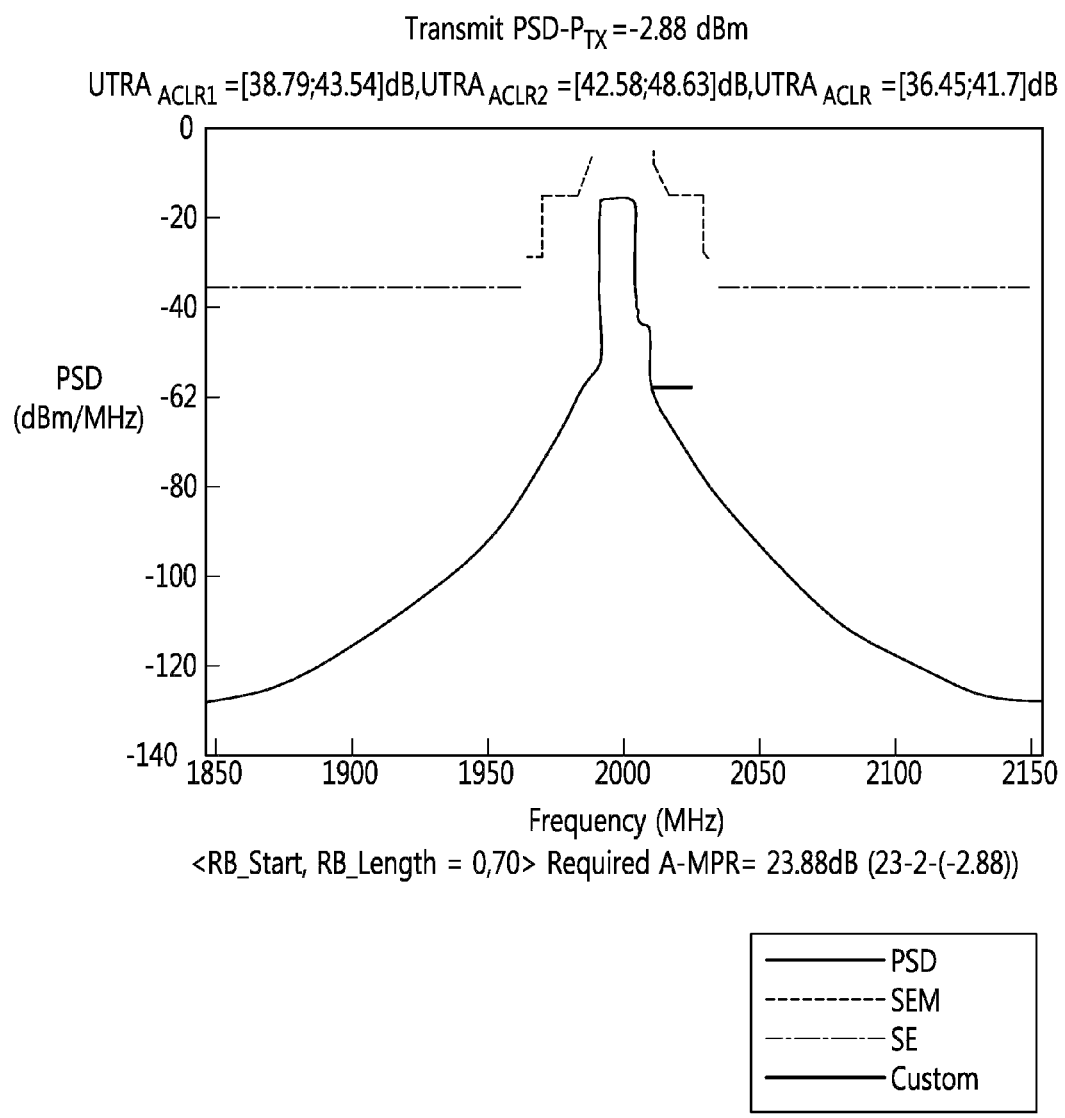
Figure 17I:
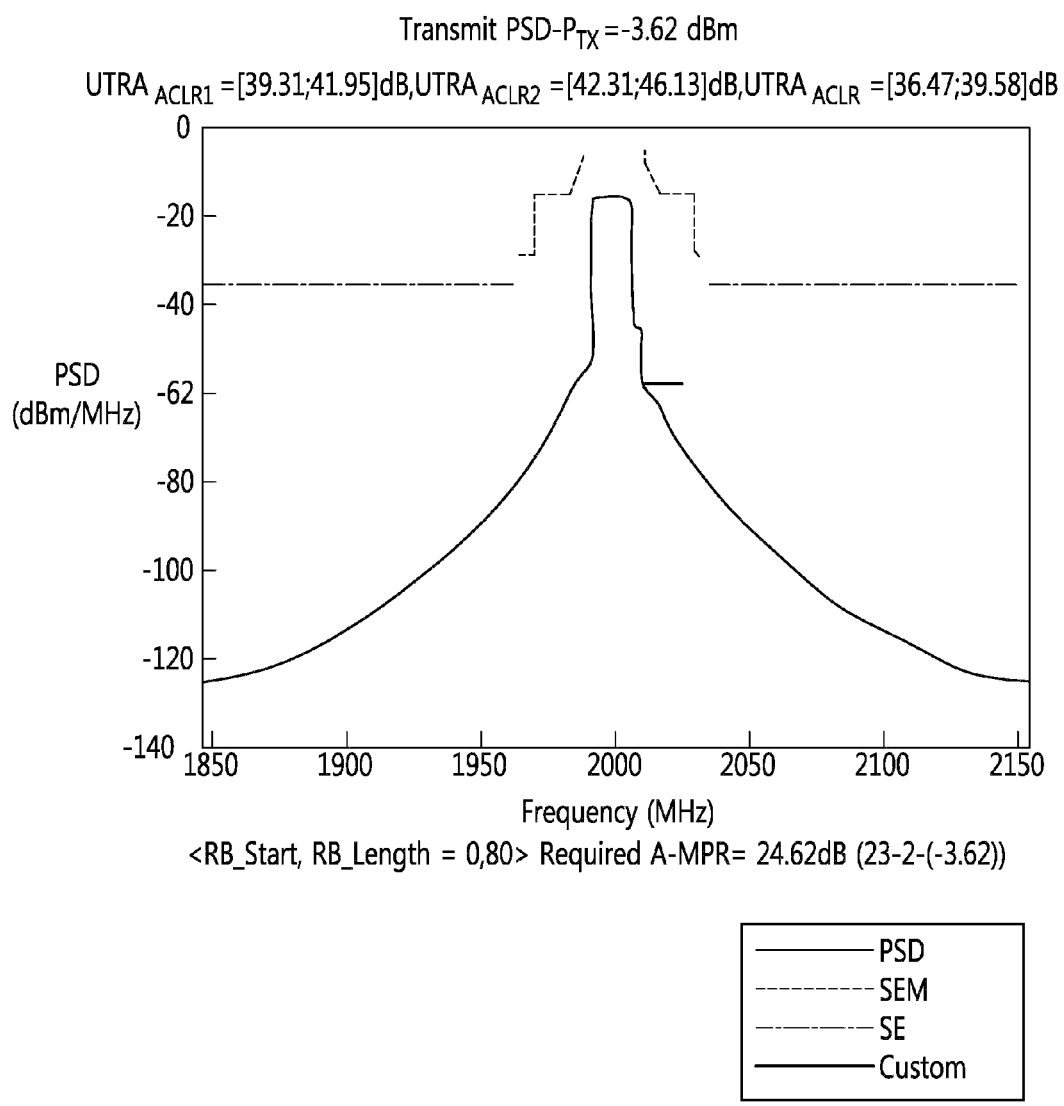
Figure 17J:
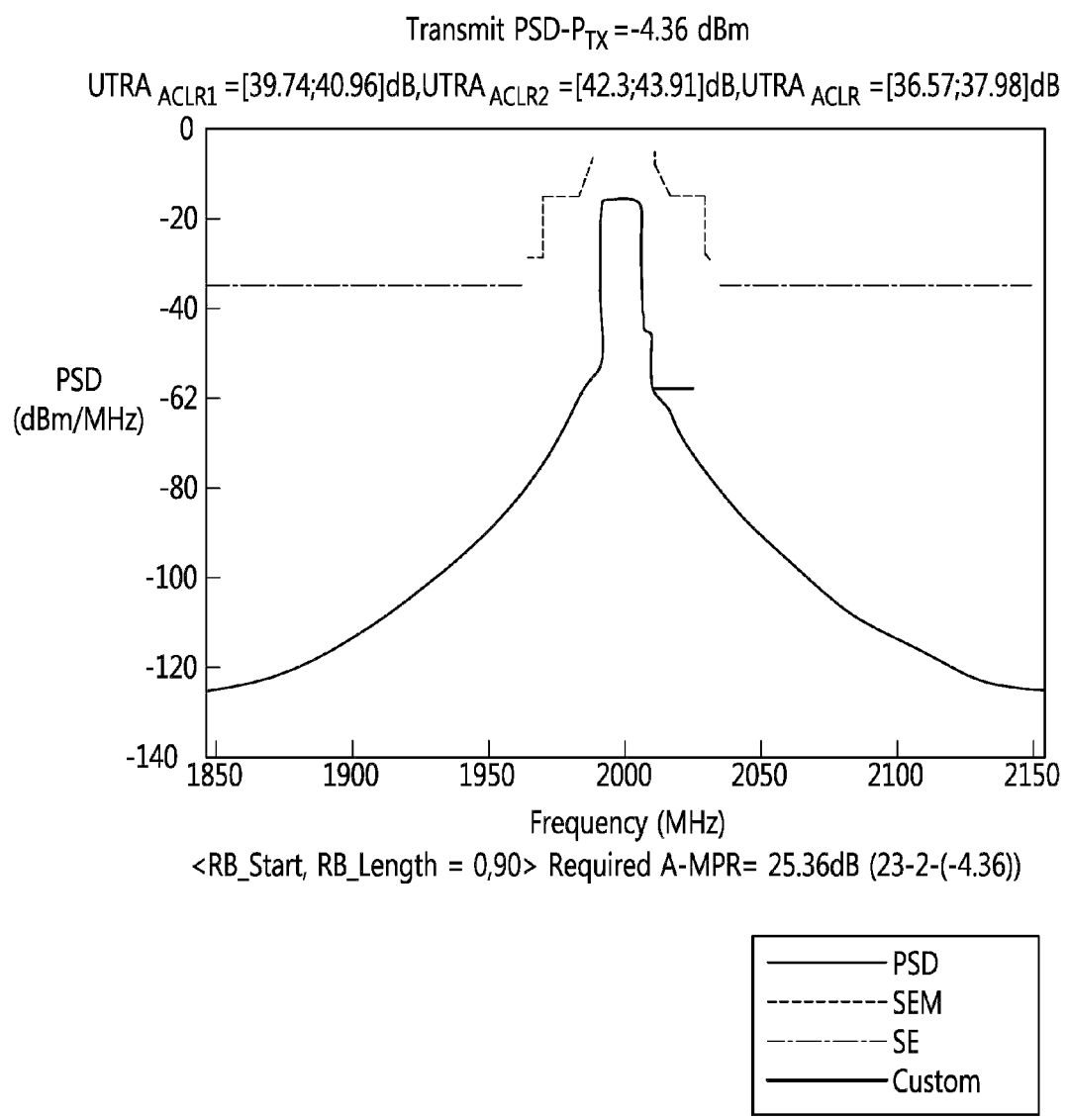
Figure 17K:
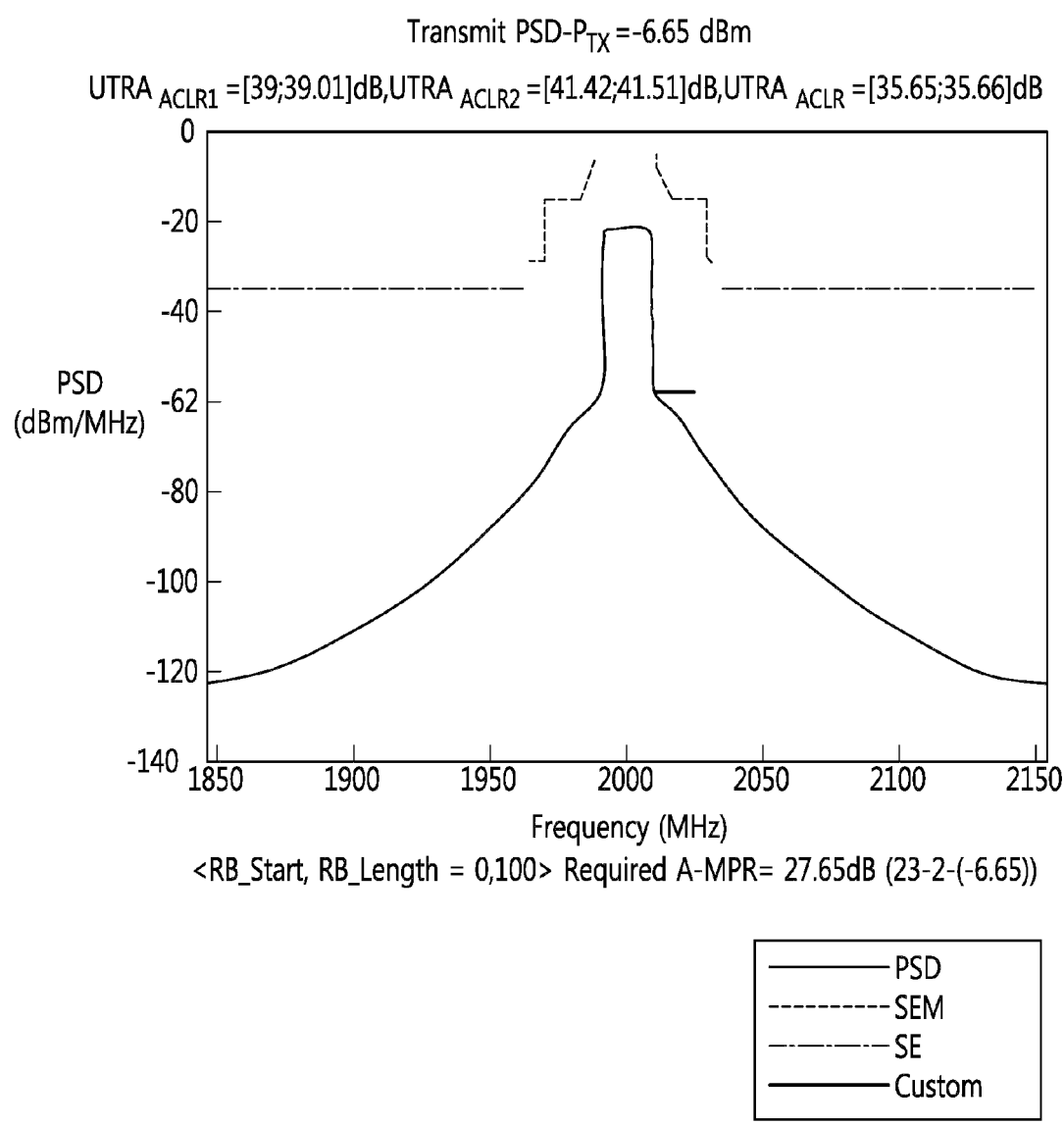
Figure 18A:
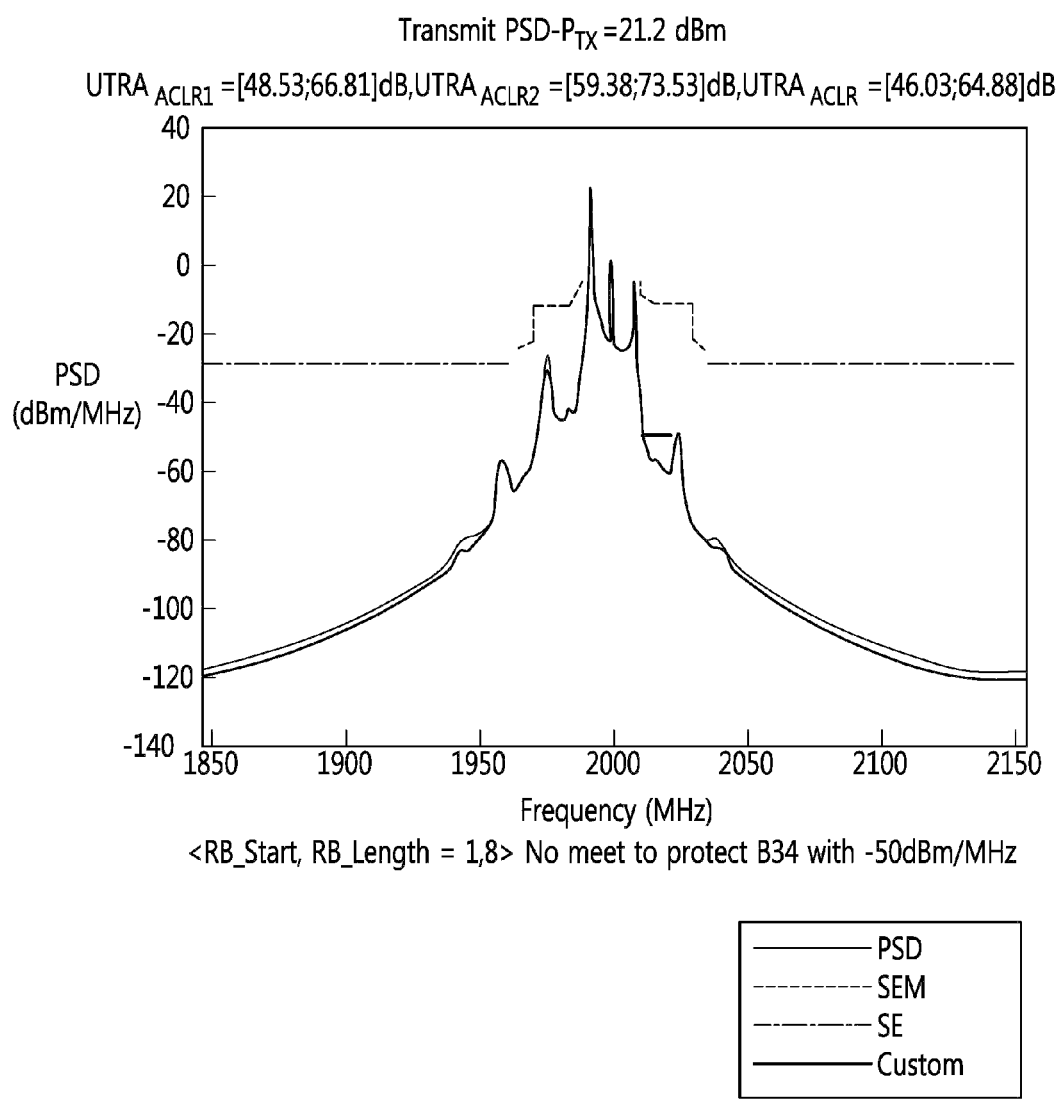
FIGS. 18a to 18q are graphs illustrating the simulation results in case that the starting position of the RB allocated to the UE that operates in the band S is non zero.

Referring to FIG. 17a, in case that the starting position of the RB is zero and there are 14 allocated RBs, it is represented that band 34 will not be protected by −50 dBm/MHz which is the existing coexistence requirement among UEs. Accordingly, as known from referring to FIG. 17b, in case that the starting position of the RB is zero and there are 14 allocated RBs, 15.87 dB (=23 dB−1 dB−6.13 dB) may be required as the A-MPR value. Next, as known from referring to FIG. 17c, in case that the starting position of the RB is zero and there are 17 allocated RBs, the required A-MPR value may be 16.64 dB (=23 dB−1 dB−5.36 dB). As known from referring to FIG. 17d, in case that the starting position of the RB is zero and there are 35 allocated RBs, the required A-MPR value may be 16.36 dB (=23 dB−2 dB−4.64 dB). As known from referring to FIG. 17e, in case that the starting position of the RB is zero and there are 40 allocated RBs, the required A-MPR value may be 17.13 dB (=23 dB−2 dB−3.87 dB). As known from referring to FIG. 17f, in case that the starting position of the RB is zero and there are 50 allocated RBs, the required A-MPR value may be 19.40 dB (=23 dB−2 dB−1.6 dB). As known from referring to FIG. 17g, in case that the starting position of the RB is zero and there are 60 allocated RBs, the required A-MPR value may be 21.63 dB (=23 dB−2 dB−(−0.63 dB)). As known from referring to FIG. 17h, in case that the starting position of the RB is zero and there are 70 allocated RBs, the required A-MPR value may be 23.88 dB (=23 dB−2 dB−(−2.88 dB)). As known from referring to FIG. 17i, in case that the starting position of the RB is zero and there are 80 allocated RBs, the required A-MPR value may be 24.62 dB (=23 dB−2 dB−(−3.62 dB)). As known from referring to FIG. 17j, in case that the starting position of the RB is zero and there are 90 allocated RBs, the required A-MPR value may be 25.36 dB (=23 dB−2 dB−(−4.36 dB)). As known from referring to FIG. 17k, in case that the starting position of the RB is zero and there are 100 allocated RBs, the required A-MPR value may be 27.65 dB (=23 dB−2 dB−(−6.65 dB)).

FIGS. 18a to 18q are graphs illustrating the simulation results in case that the starting position of the RB allocated to the UE that operates in the band S is non zero.

Figure 18B:
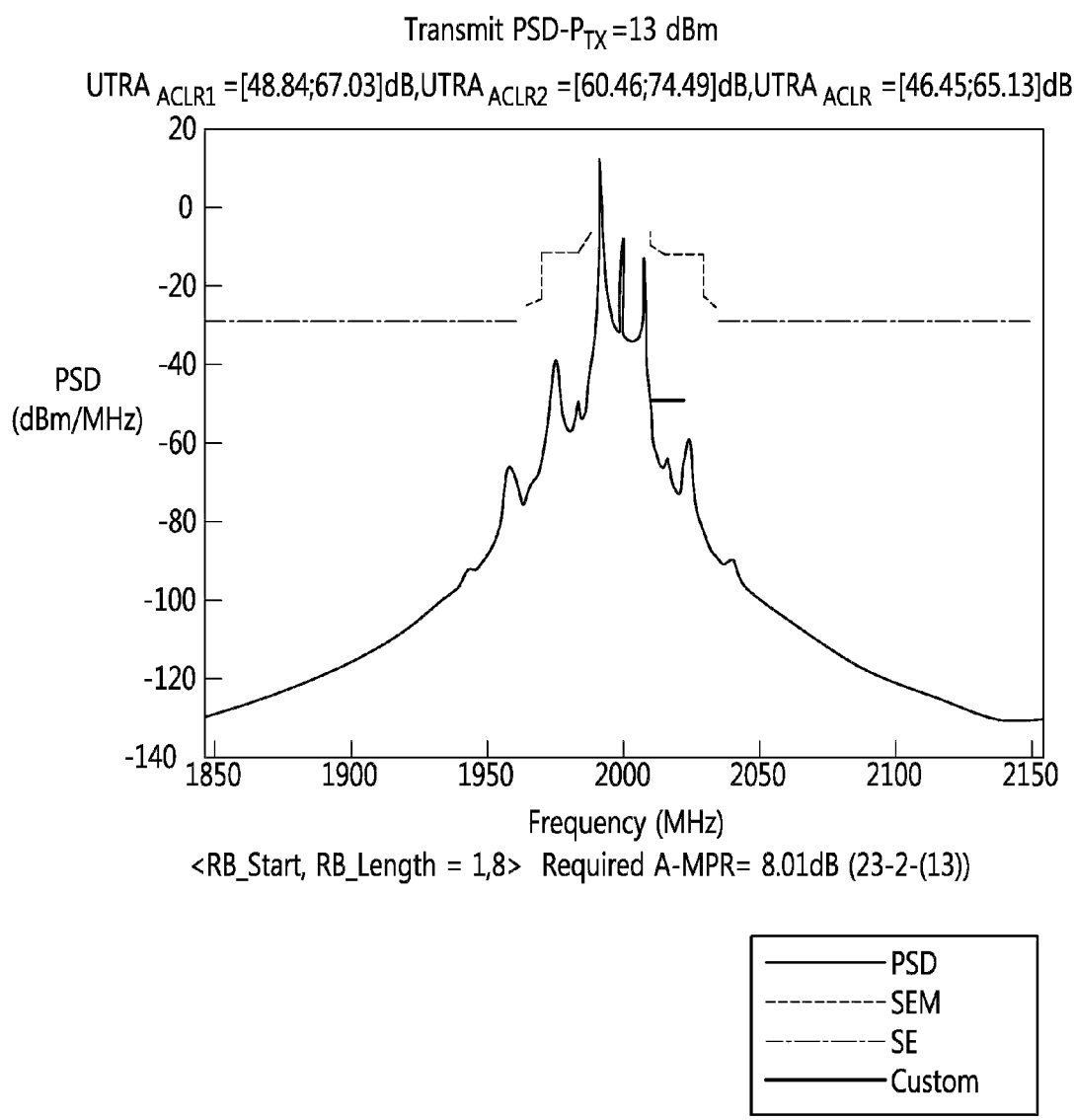
Figure 18C:
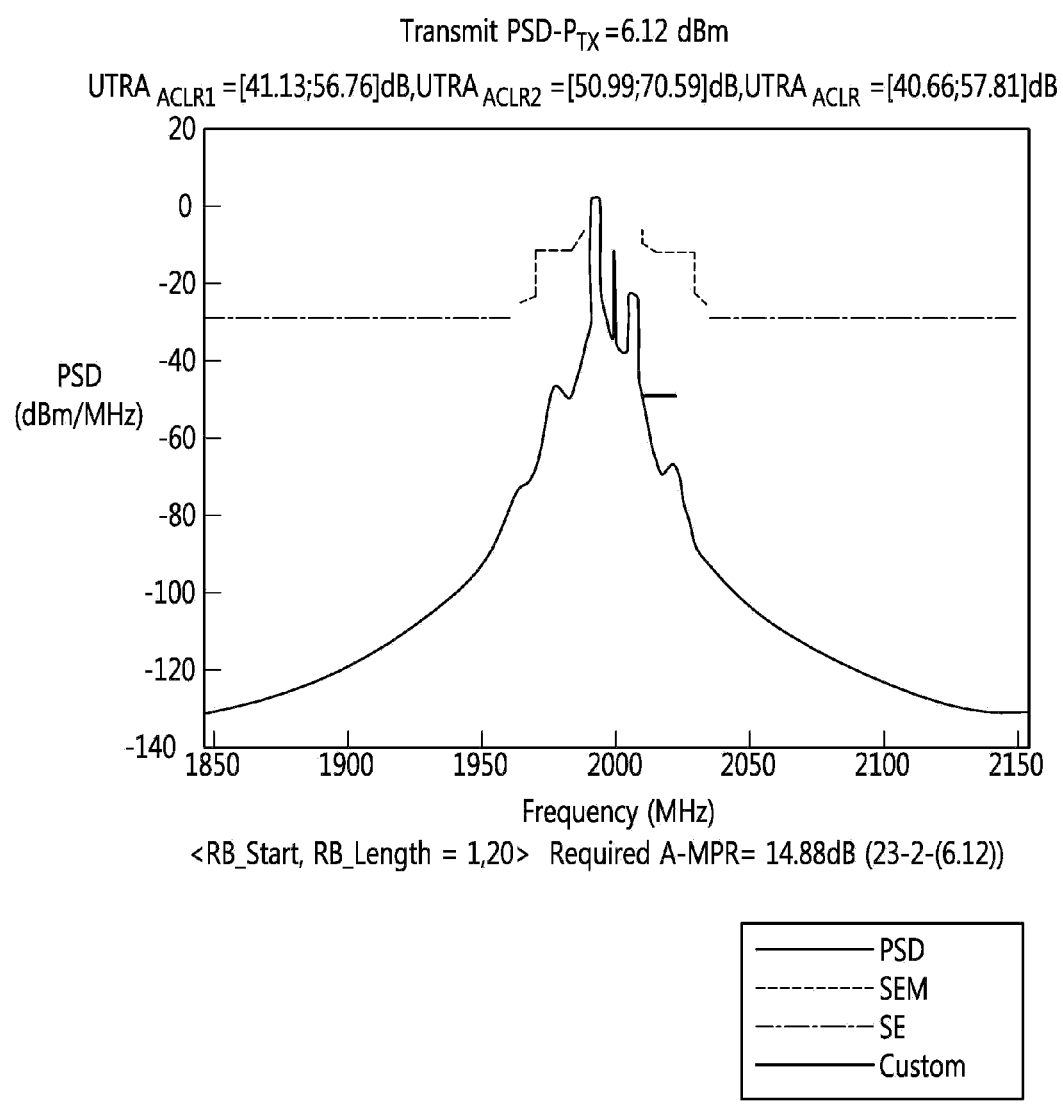
Figure 18D:
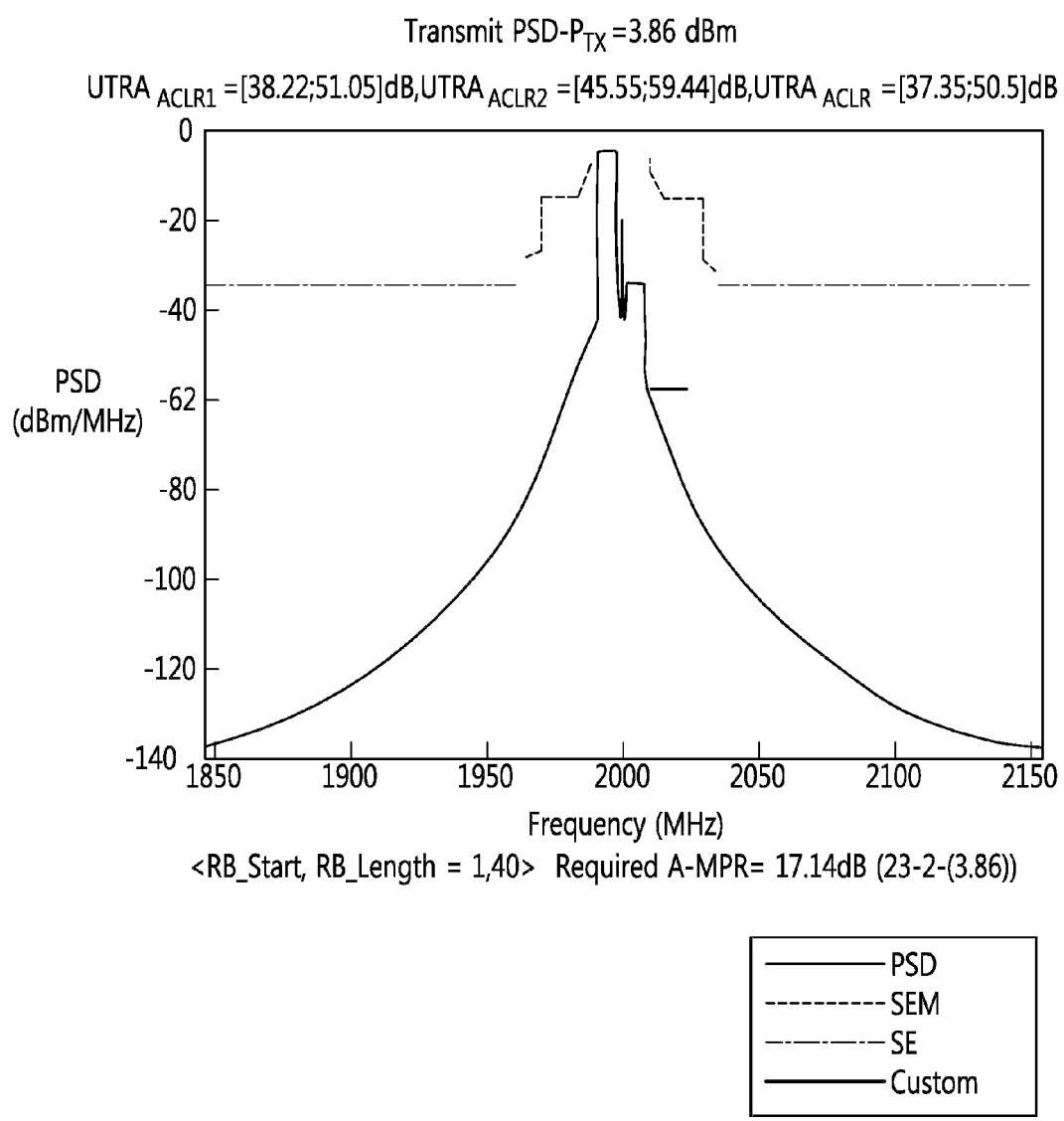

Referring to FIG. 18a, in case that the starting position of the RB is 1 and there are 8 allocated RBs, it is represented that band 34 will not be protected by −50 dBm/MHz which is the maximum limit of spurious emission as the existing coexistence requirement among UEs. Accordingly, as known from referring to FIG. 18b, in case that the starting position of the RB is 1 and there are 8 allocated RBs, 9.0 dB (=23 dB−1 dB−(13 dB)) may be required as the A-MPR value. Next, as known from referring to FIG. 18c, in case that the starting position of the RB is 1 and there are 20 allocated RBs, the required A-MPR value may be 14.88 dB (=23 dB−2 dB−(6.12 dB)). As known from referring to FIG. 18d, in case that the starting position of the RB is 1 and there are 40 allocated RBs, the required A-MPR value may be 17.14 dB (=23 dB−2 dB−(3.86 dB)).

Figure 18E:
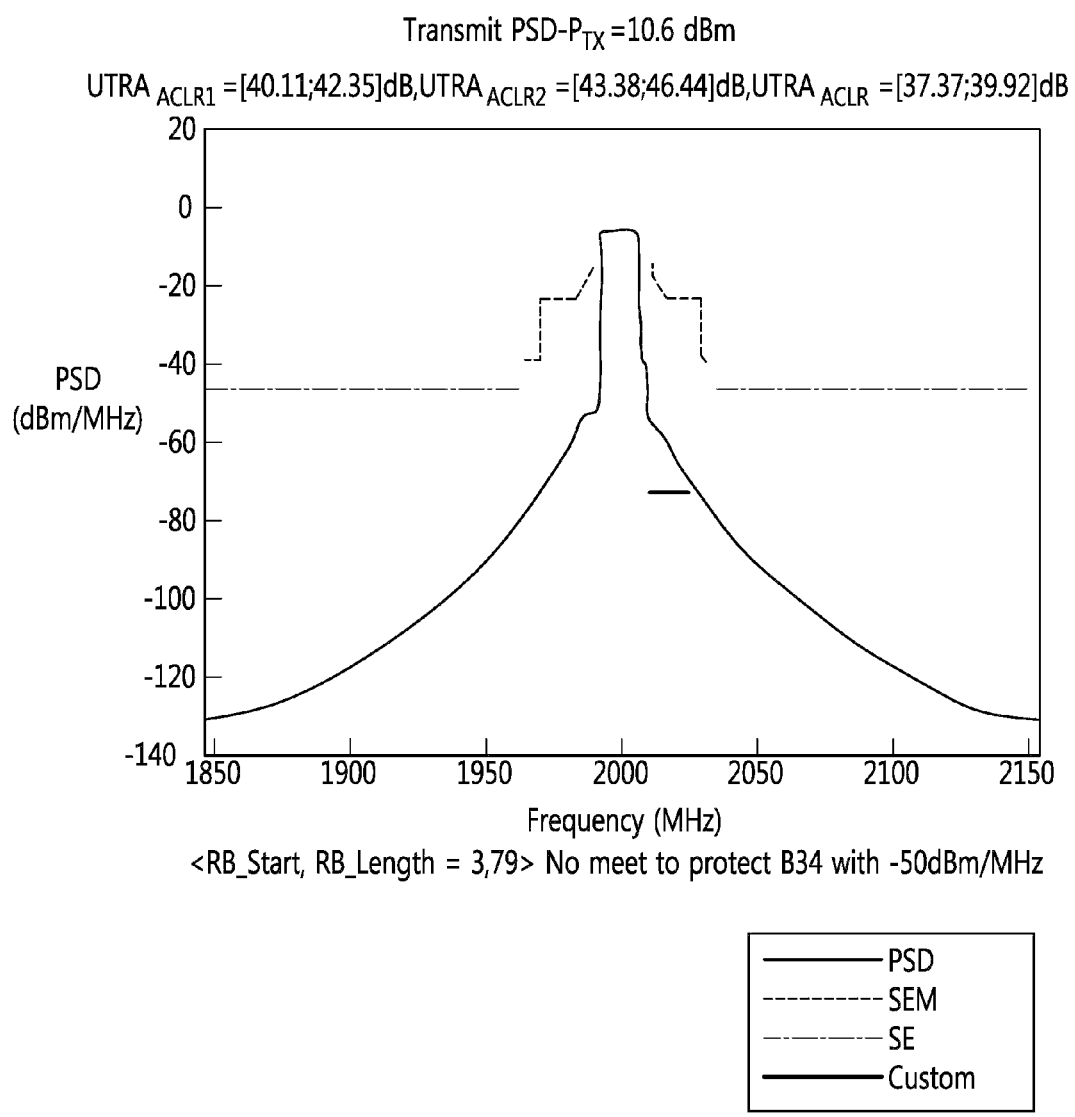
Figure 18F:
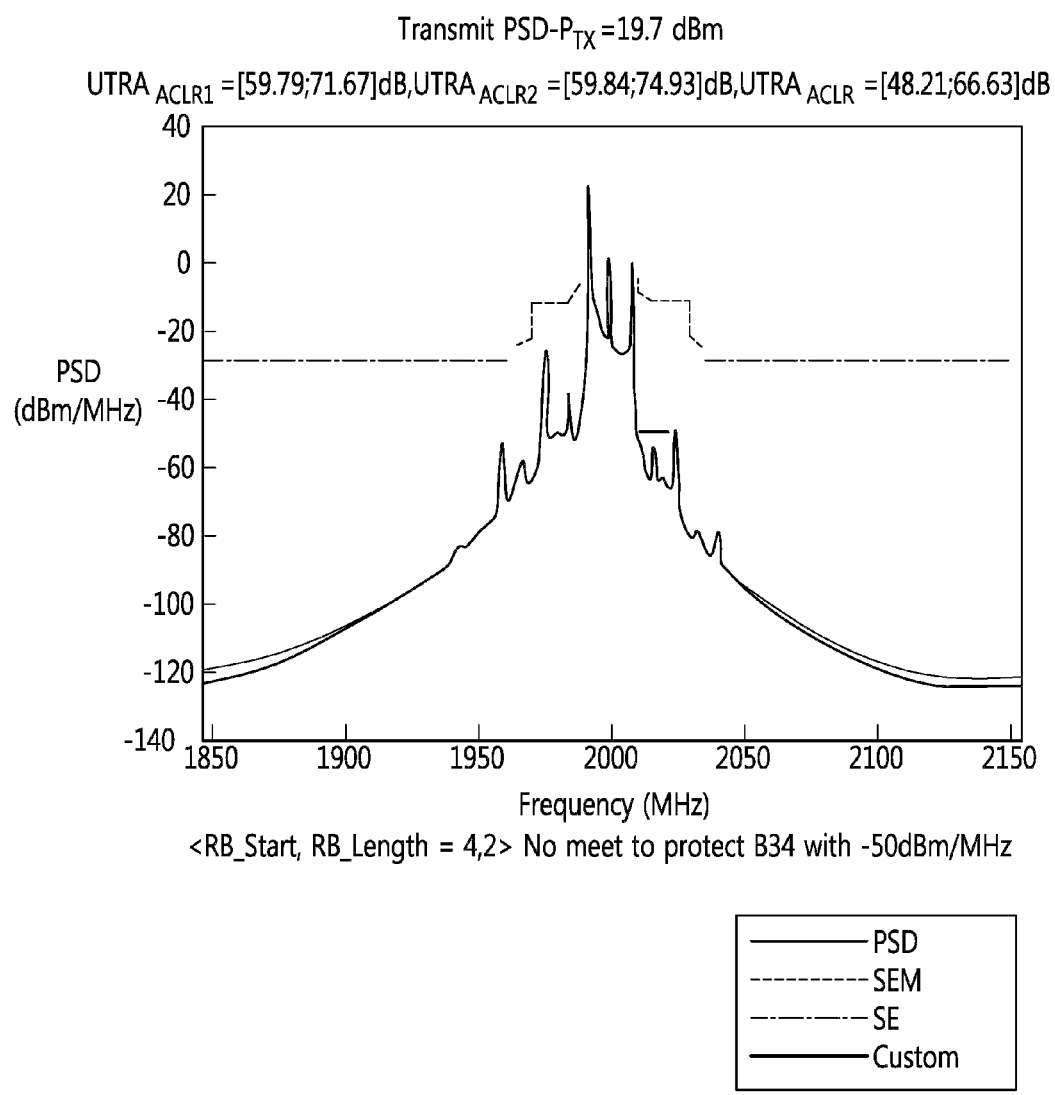

Meanwhile, as known from referring to FIG. 18e, in case that the starting position of the RB is 3 and there are 79 allocated RBs, it is represented that band 34 will not be protected by −50 dBm/MHz which is the maximum limit of spurious emission as the existing coexistence requirement among UEs. Likewise, as known from referring to FIG. 18f, even in case that the starting position of the RB is 4 and there are 2 allocated RBs, it is represented that band 34 will not be protected by −50 dBm/MHz which is the maximum limit of spurious emission as the existing coexistence requirement among UEs.

Figure 18G:
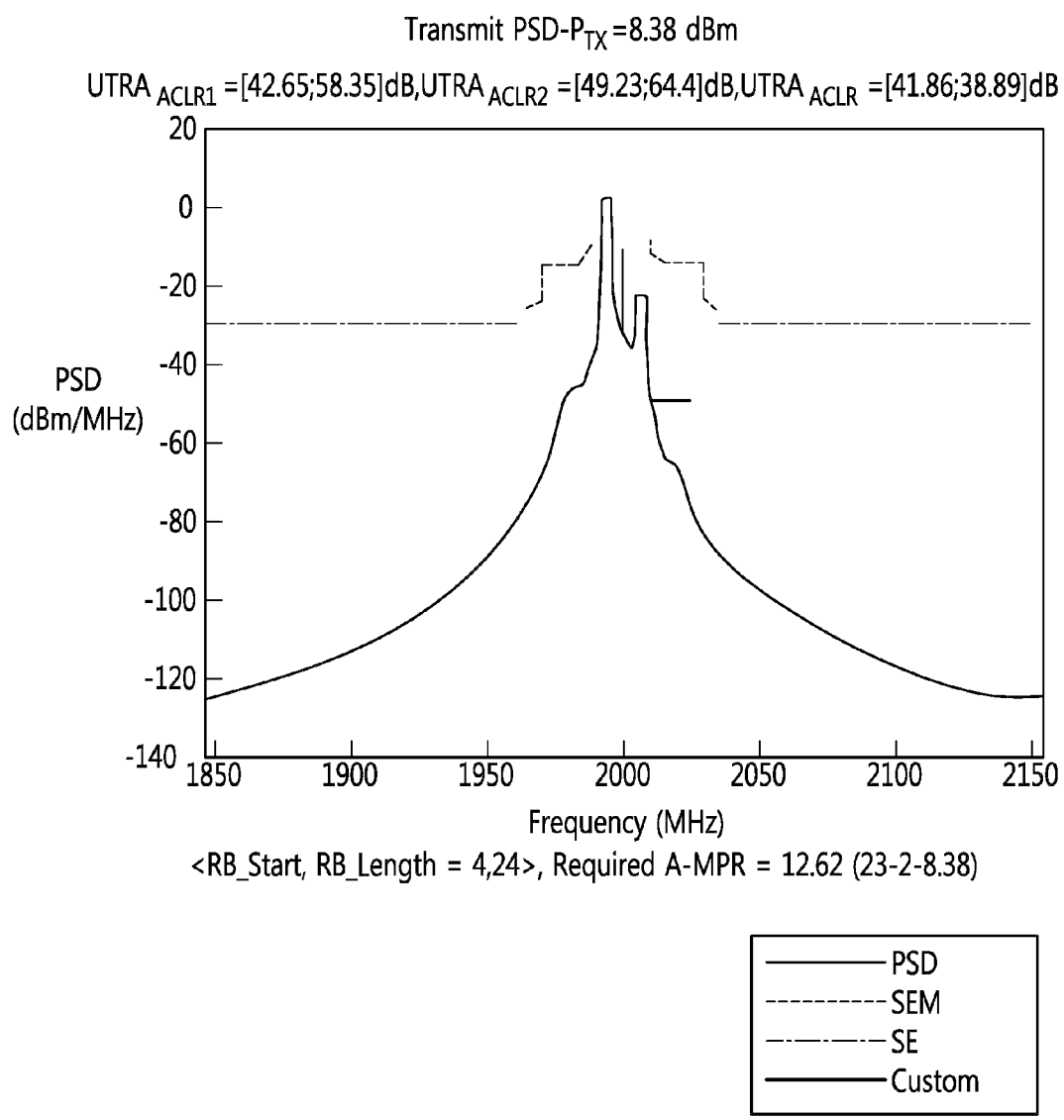
Figure 18H:
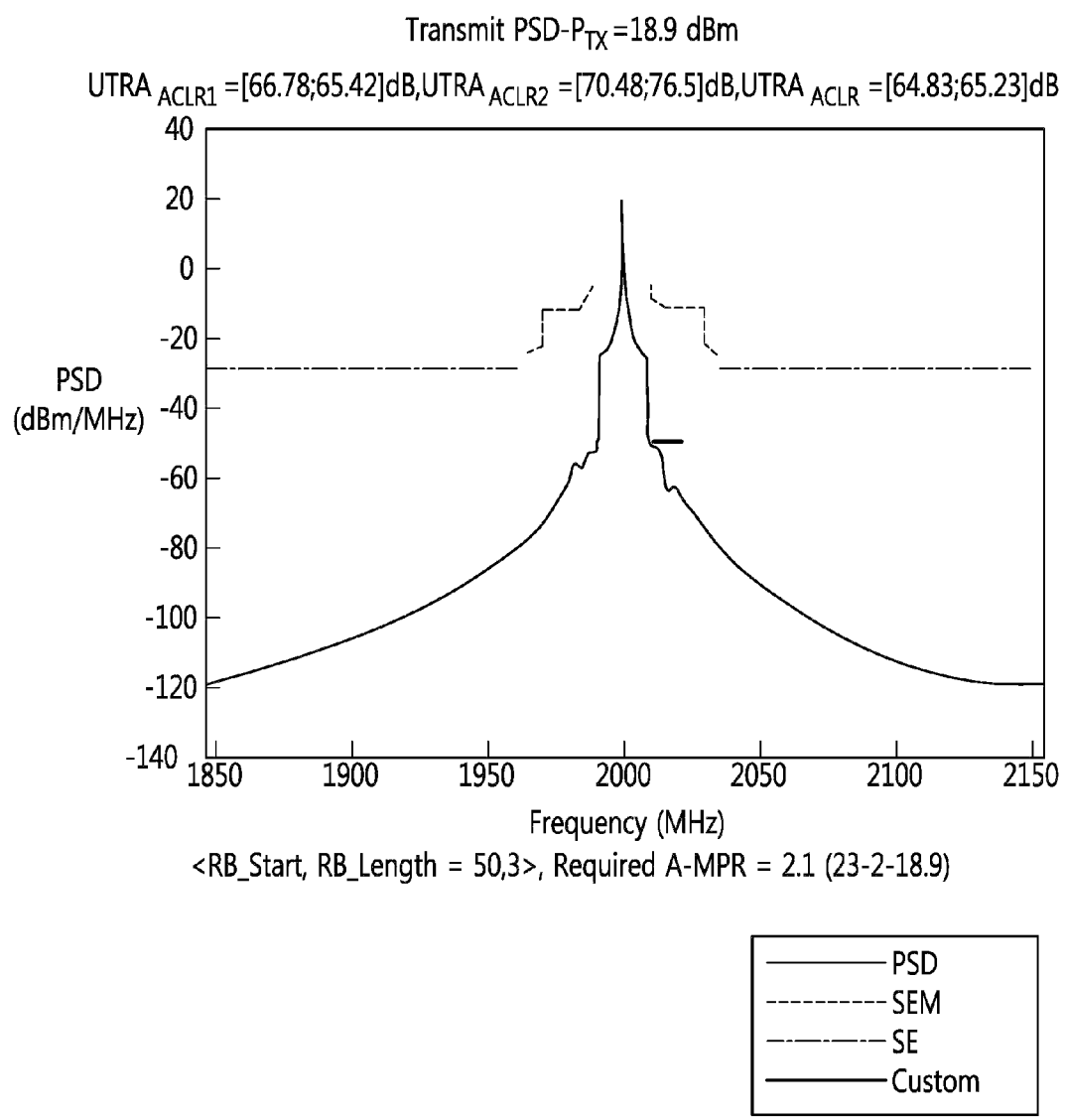
Figure 18I:
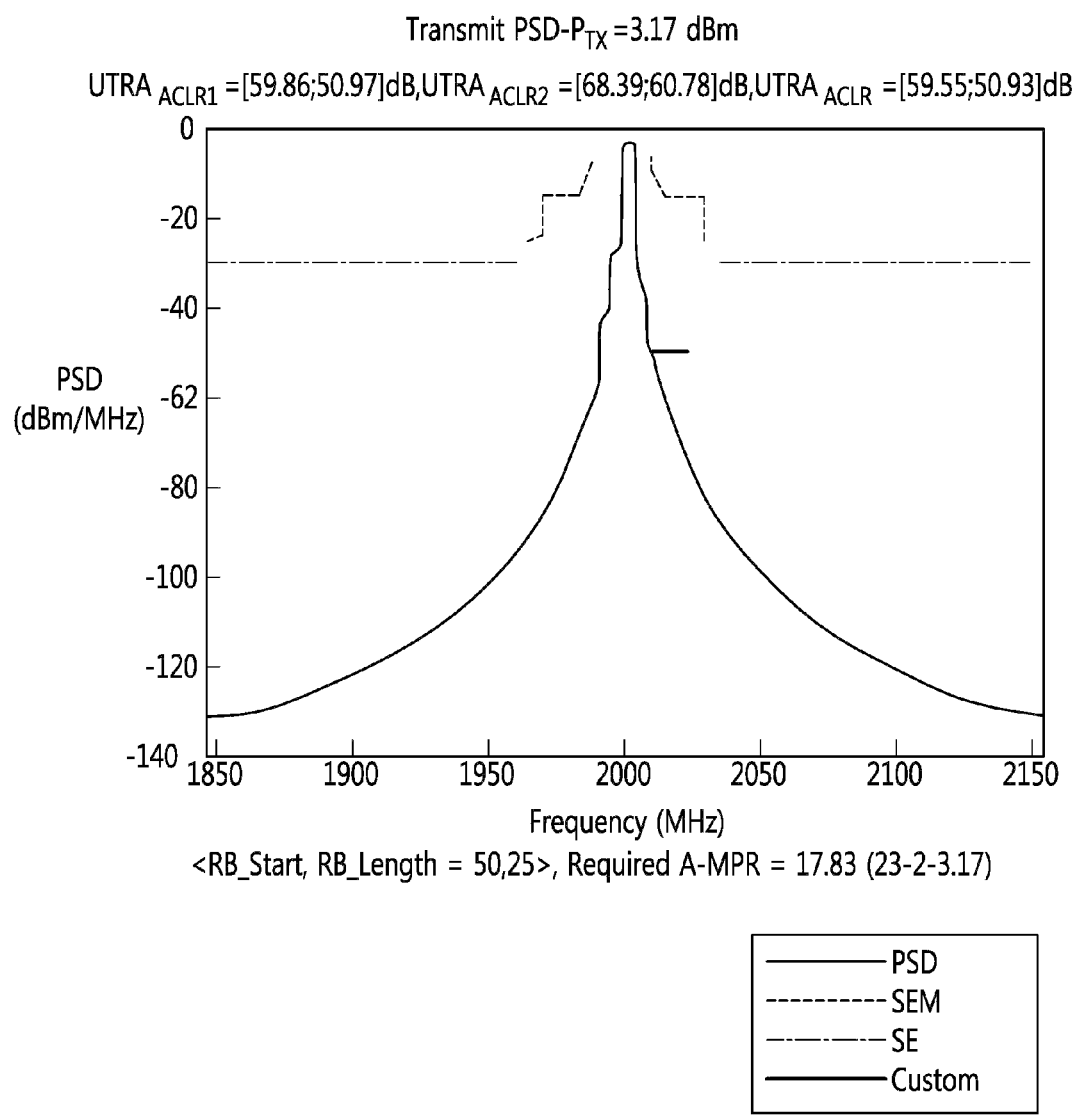
Figure 18J:
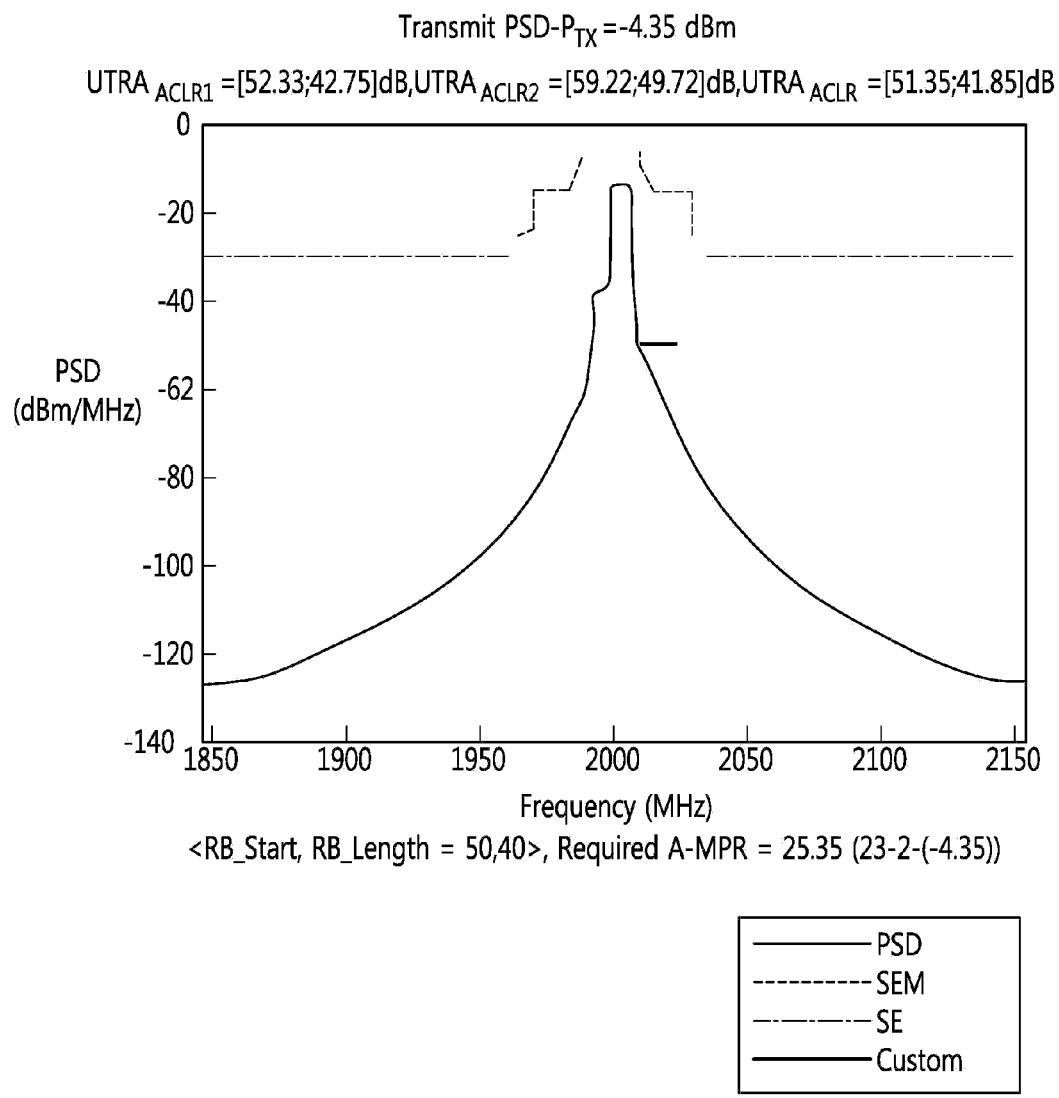

As known from referring to FIG. 18g, in case that the starting position of the RB is 4 and there are 24 allocated RBs, the required A-MPR value may be 12.62 dB (=23 dB−2 dB−8.38 dB). As known from referring to FIG. 18h, in case that the starting position of the RB is 50 and there are 3 allocated RBs, the required A-MPR value may be 3.1 dB (=23 dB−1 dB-18.9 dB). As known from referring to FIG. 18i, in case that the starting position of the RB is 50 and there are 25 allocated RBs, the required A-MPR value may be 17.83 dB (=23 dB−2 dB-3.17 dB). As known from referring to FIG. 18j, in case that the starting position of the RB is 50 and there are 40 allocated RBs, the required A-MPR value may be 25.35 dB (=23 dB−2 dB−(−4.35 dB)).

Figure 18K:
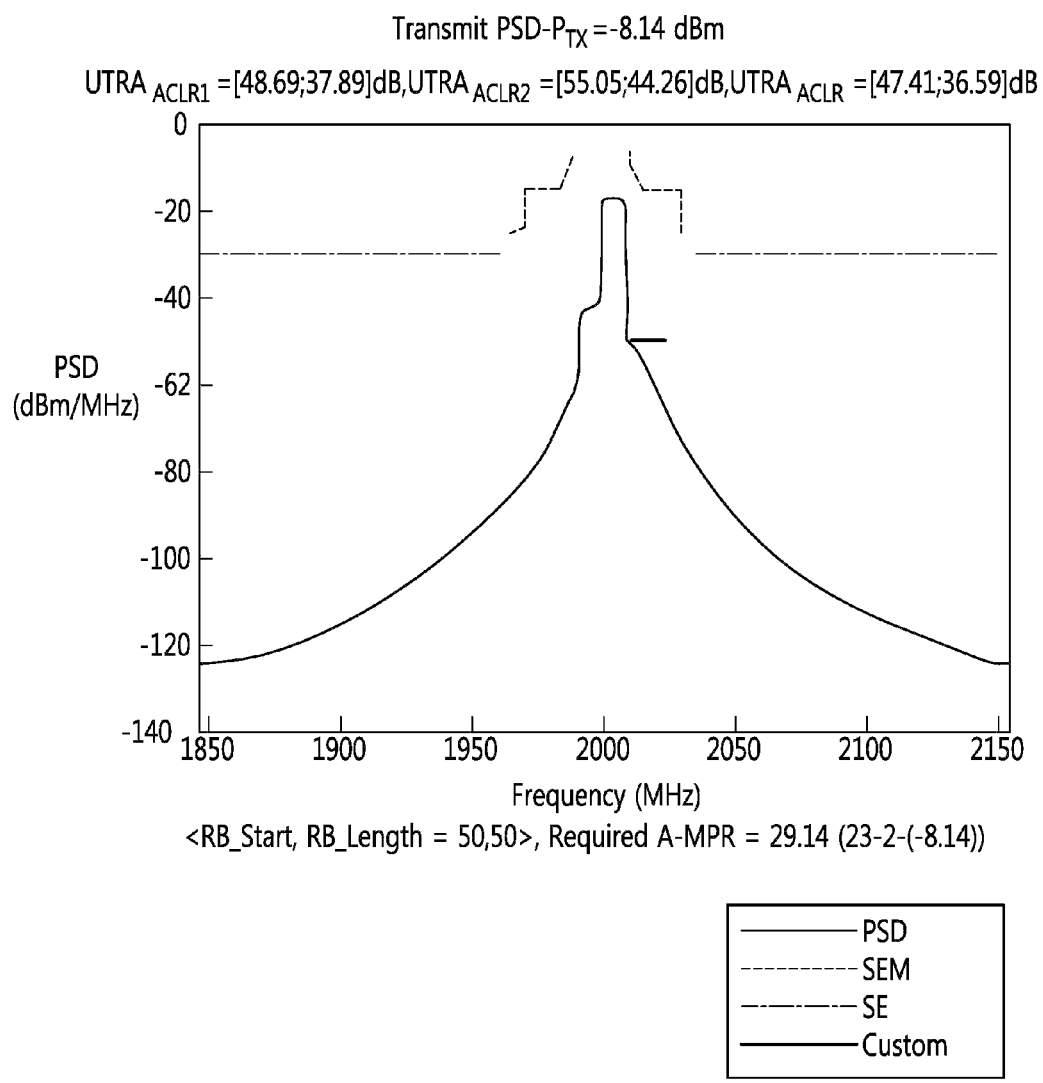
Figure 18L:
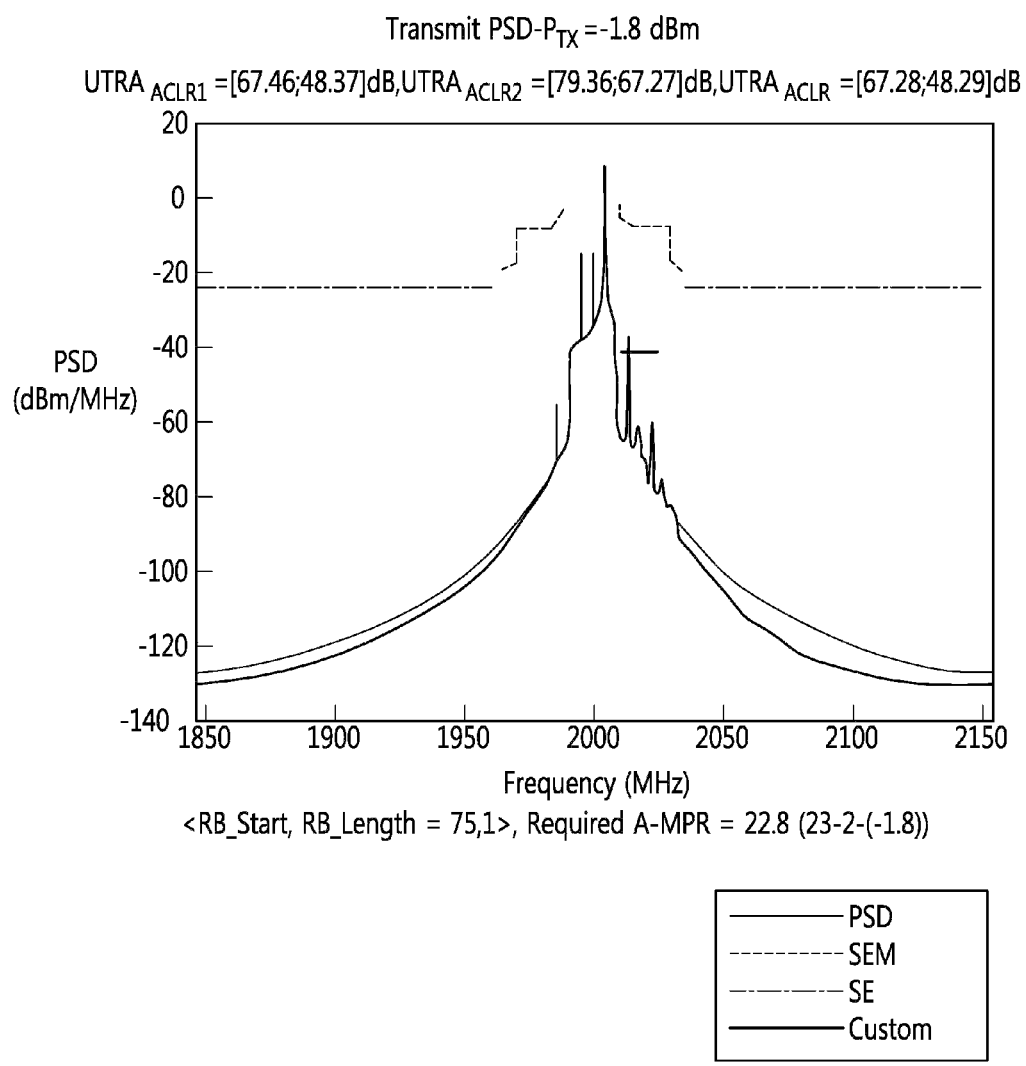
Figure 18M:
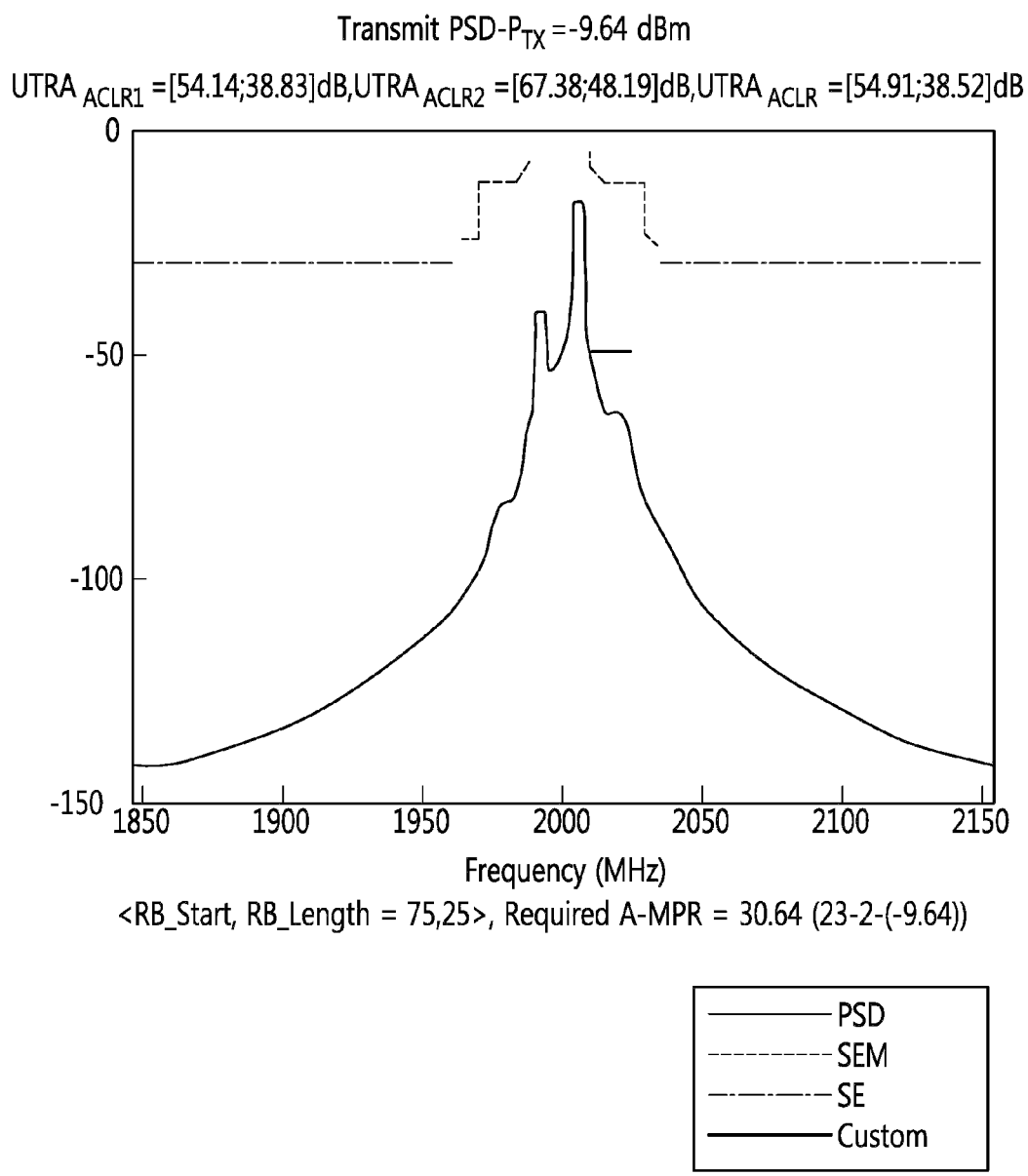

As known from referring to FIG. 18k, in case that the starting position of the RB is 50 and there are 50 allocated RBs, the required A-MPR value may be 29.14 dB (=23 dB−2 dB+8.14 dB)). As known from referring to FIG. 18l, in case that the starting position of the RB is 75 and there is 1 allocated RB, the required A-MPR value may be 23.8 dB (=23 dB−1 dB−(−1.8 dB)). As known from referring to FIG. 18m, in case that the starting position of the RB is 75 and there are 25 allocated RBs, the required A-MPR value may be 30.64 dB (=23 dB−2 dB−(−9.64 dB)).

Figure 18N:
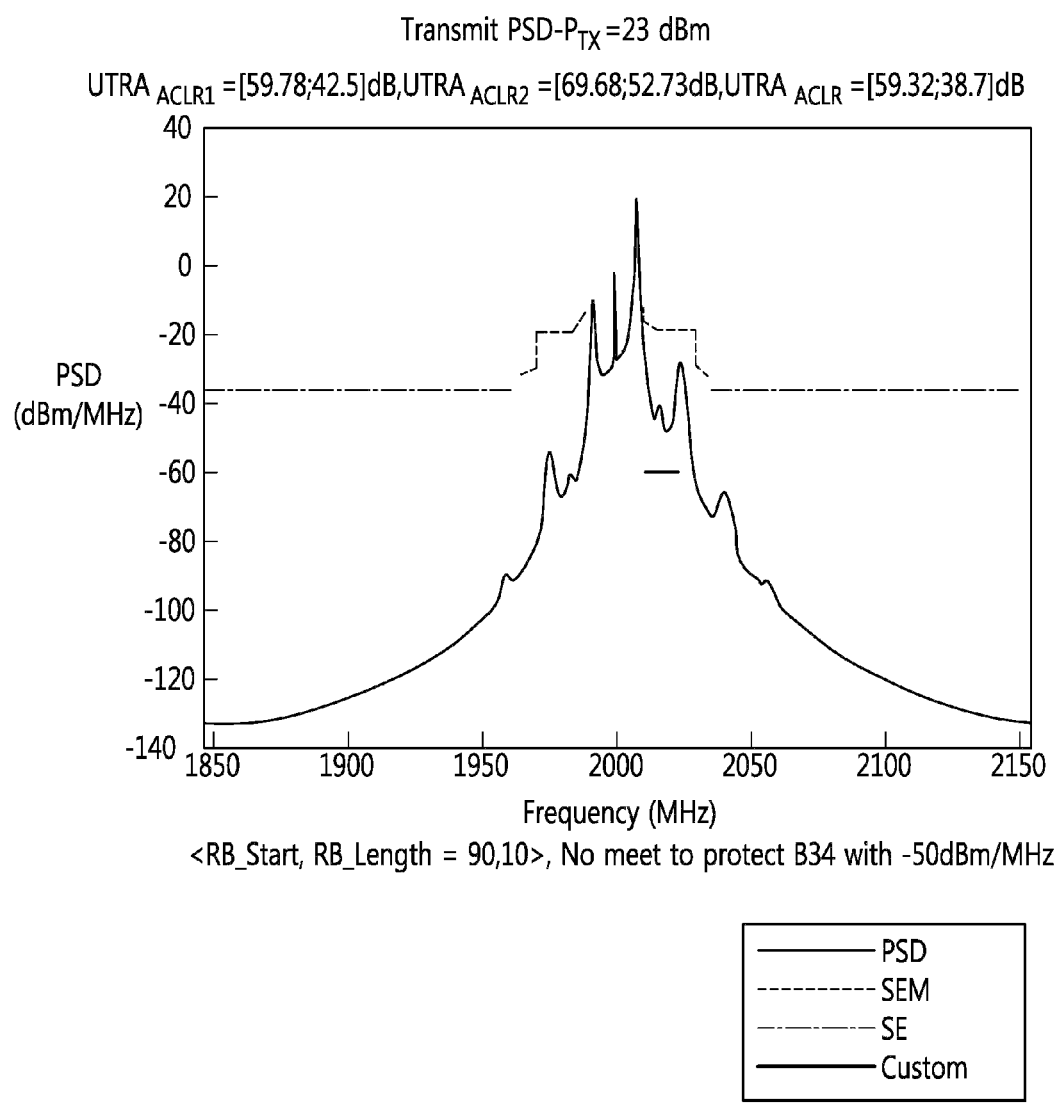
Figure 18O:
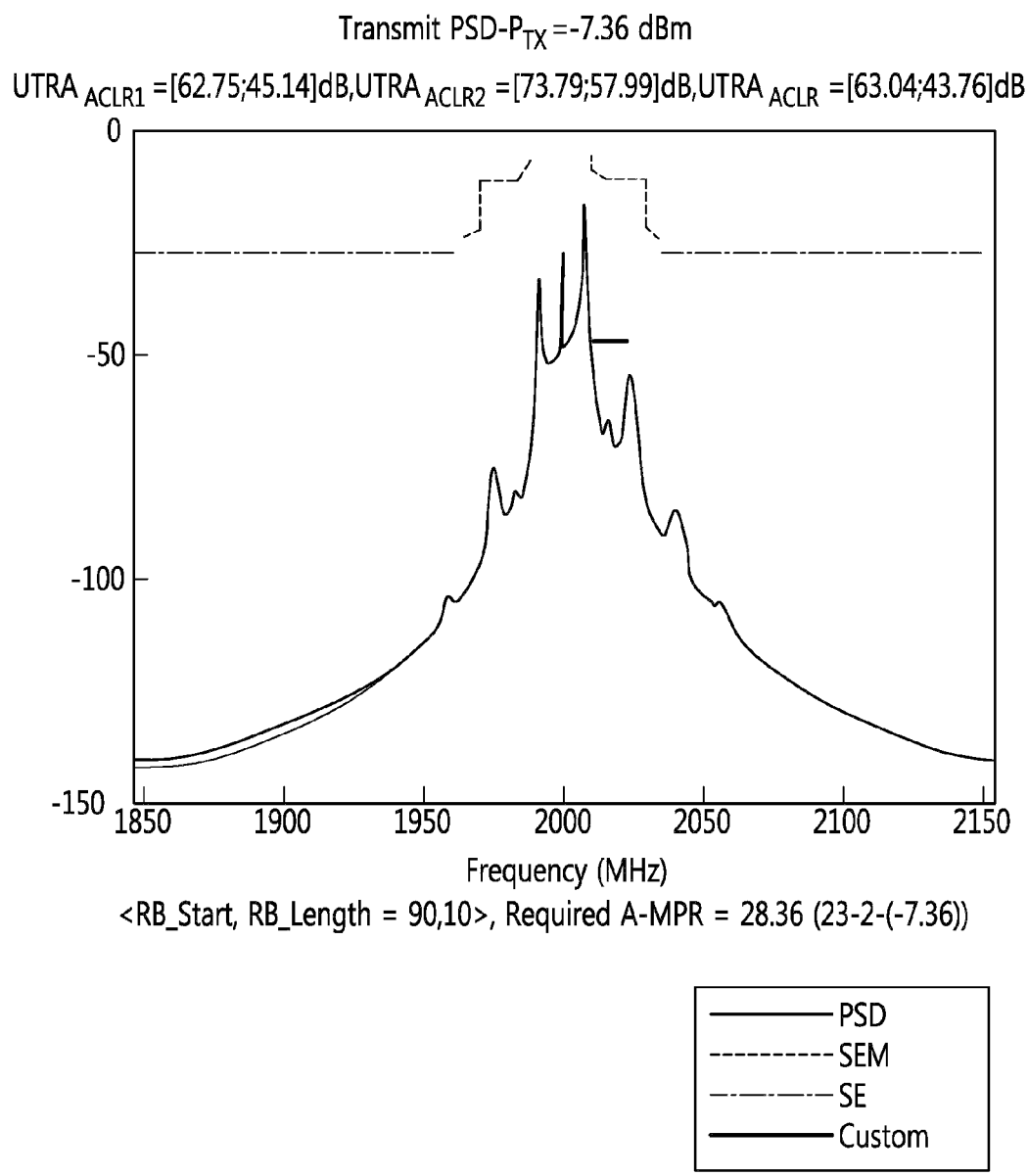

As known from referring to FIG. 18n, in case that the starting position of the RB is 90 and there are 10 allocated RBs, it is represented that band 34 will not be protected by −50 dBm/MHz which is the maximum limit of spurious emission as the existing coexistence requirement among UEs. Accordingly, as known from referring to FIG. 18o, in case that the starting position of the RB is 90 and there are 10 allocated RBs, the required A-MPR value may be 29.36 dB (=23 dB−1 dB−(−7.36 dB)).

Figure 18P:
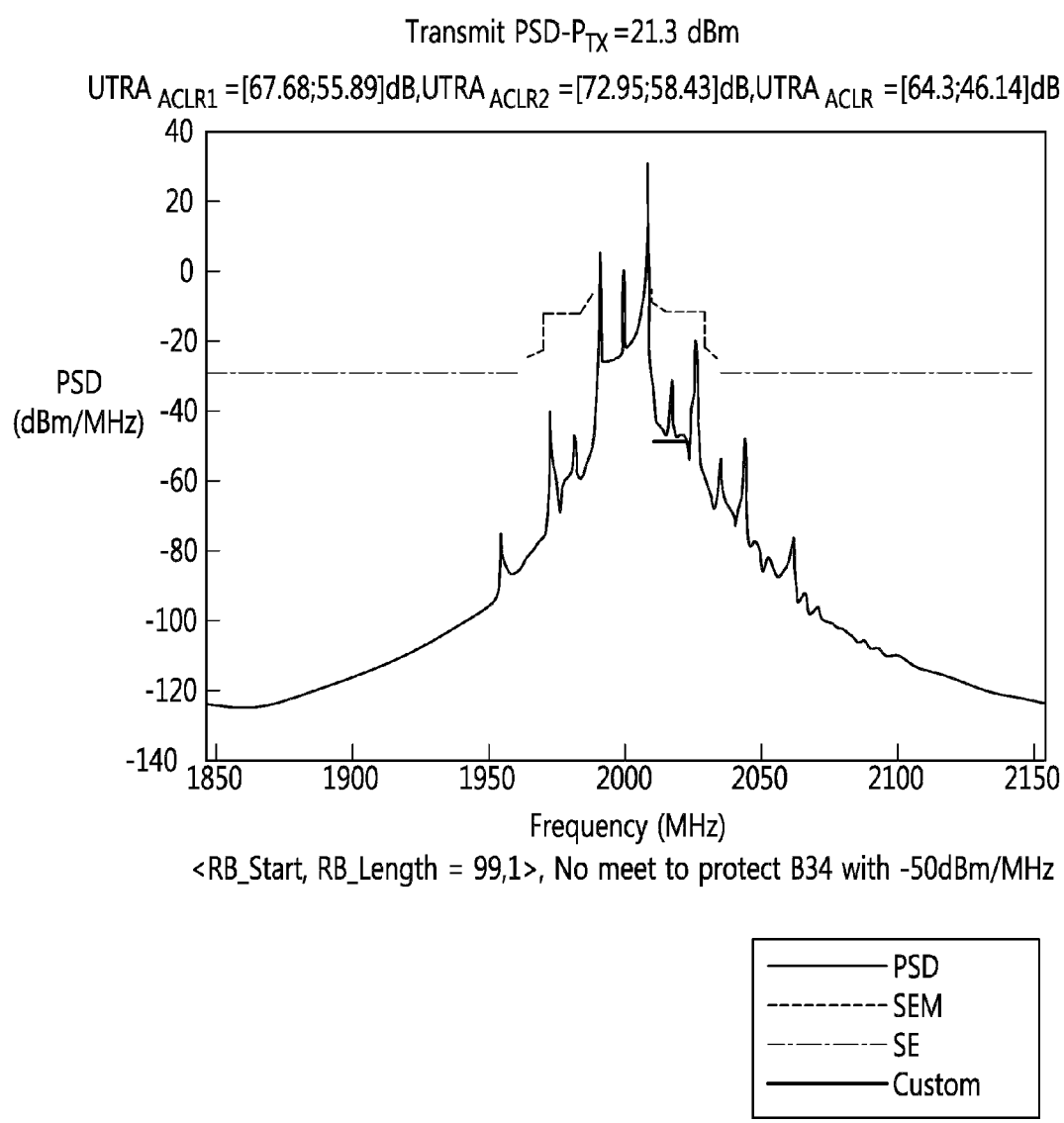
Figure 18Q:
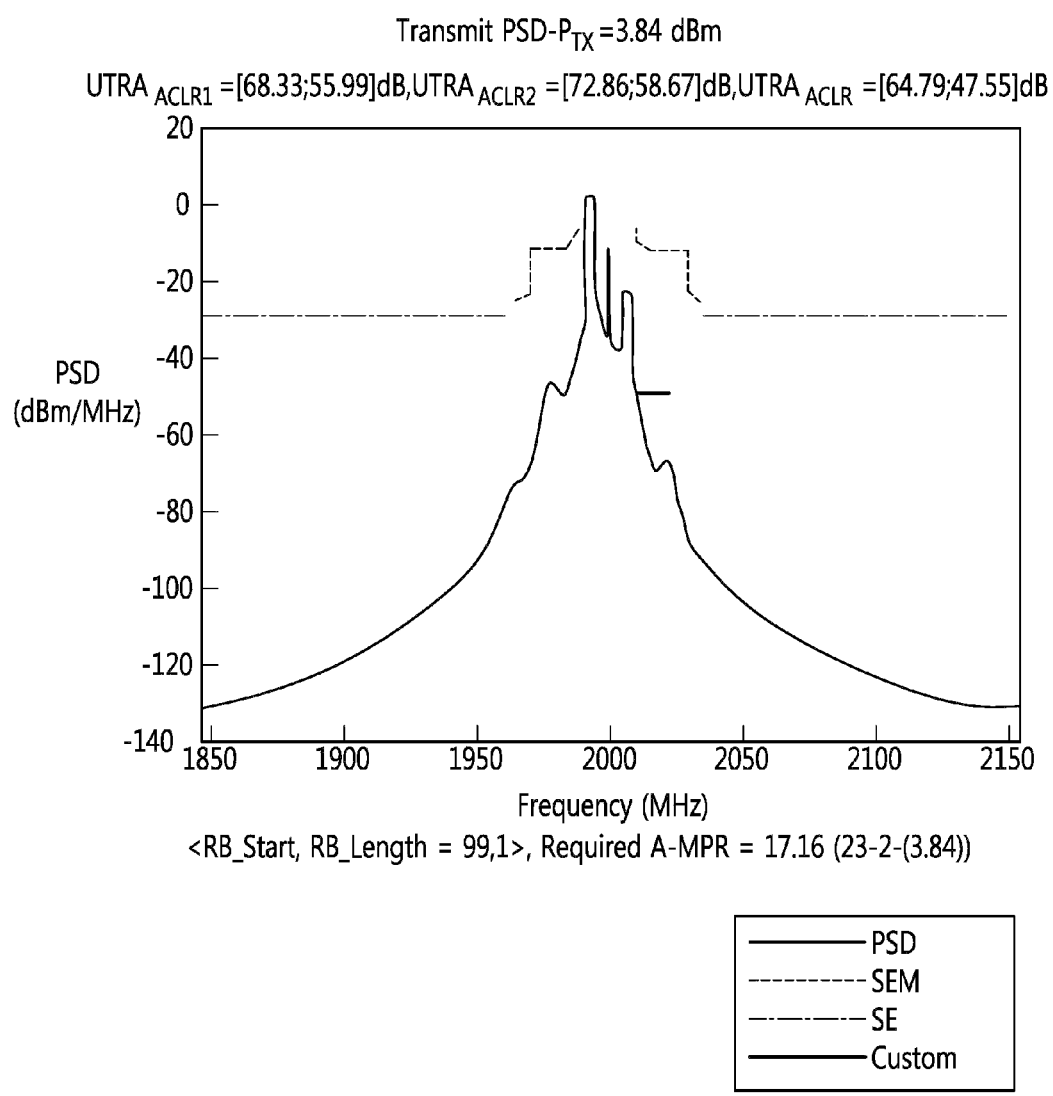

In addition, as known from referring to FIG. 18p, in case that the starting position of the RB is 99 and there is 1 allocated RB, it is represented that band 34 will not be protected by −50 dBm/MHz which is the maximum limit of spurious emission as the existing coexistence requirement among UEs. Accordingly, as known from referring to FIG. 18q, in case that the starting position of the RB is 99 and there is 1 allocated RB, the required A-MPR value may be 18.16 dB (=23 dB−1 dB−(3.84 dB)).

Accordingly, in the present invention, in order for the UE that operates in band 34 and the UE that operates in the band S to coexist in the same region, both of the method of providing the A-MPR to the UE that operates in the band S through network signaling and the existing coexistence requirement between the UE based on FDD and the UE based on TDD are suggested. The tables below represent the A-MPR values which are to be provided to UEs through the network signaling, for example, NS_XX, in case that the maximum limit of the spurious emission is defined by −50 dBm/MHz, −40 dBm/MHz, −30 dBm/MHz and −20 dBm/MHz for each case as the coexistence requirement. The starting position of RB allocation, the number of RB allocation and the A-MPR value suggested by the tables below may be varied within a little error ranges. In the tables below, $RB_{start}$ represents the least RB index among the allocated RBs. And $L_{CRB}$ represents the number of RBs which are continuously allocated. Here, the number of RBs may be converted as bandwidths (MHz) by referring to Table 5.

First of all, Table 22 below represents the A-MPR values which are required when applying the maximum limit of the spurious emission as −50 dBm/MHz, which is the coexistence requirement among UEs in case that the guard section between the band S and band 34 is 0 MHz.

TABLE 22

| | Parameter RB allocation region | | | | | | | | | |
|---|---|---|---|---|---|---|---|---|---|---|
| $RB_{start}$ | 0-20 | | | 21-50 | | | 51-67 | | 68-99 | |
| $L_{CRB}$ [RBs] | ≥49 | 27~48 | <27 | ≥28 | 16~27 | <16 | ≥19 | 2~18 | 1 | ≥6 | <6 |
| A-MPR [dB] | ≤31 | ≤20 | ≤10 | ≤31 | ≤20 | ≤10 | ≤31 | ≤20 | ≤3 | ≤31 | ≤25 |

Next, Table 23 below represents the A-MPR values which are required when applying the maximum limit of the spurious emission as −40 dBm/MHz, which is the coexistence requirement among UEs.

TABLE 23

| | Parameter RB allocation region | | | | | | | | | |
|---|---|---|---|---|---|---|---|---|---|---|
| RBstart | 0-20 | | | 21-50 | | | 51-67 | | 68-96 | 97-99 |
| $L_{CRB}$ [RBs] | ≥63 | 43~62 | <43 | ≥41 | 23-40 | <23 | ≥22 | 3~21 | ≤2 | ≥1 | ≤3 |
| A-MPR [dB] | ≤21 | ≤12 | ≤8 | ≤21 | ≤15 | ≤6 | ≤21 | ≤12 | ≤4 | ≤21 | ≤10 |

It is notable in the table above that the A-MPR value is about 15 dB in case that the number of RBs are 23 to 40 (i.e., about 5 MHz if converted as frequency band according to Table 5).

Next, Table 24 below represents the A-MPR values which are required when applying the maximum limit of the spurious emission as −30 dBm/MHz, which is the coexistence requirement among UEs.

TABLE 24

| | Parameter RB allocation region | | | | | | | |
|---|---|---|---|---|---|---|---|---|
| $RB_{start}$ | 0-27 | | 28-50 | | 51-95 | | | 96-99 |
| $L_{CRB}$ [RBs] | ≥95 | 55 to 94 | ≥48 | 35~47 | ≥10 | 3~9 | ≤4 | |
| A-MPR [dB] | ≤7 | ≤5 | ≤11 | ≤6 | ≤11 | ≤6 | ≤5 | |

It is notable in the table above that the A-MPR value is about 11 dB in case that the number of RBs are about 48 (i.e., about 10 MHz if converted as frequency band according to Table 5).

Table 25 below represents the A-MPR values which are required when applying the maximum limit of the spurious emission as −20 dBm/MHz, which is the coexistence requirement among UEs.

TABLE 25

| Parameter | RB allocation region |
|---|---|
| $RB_{start}$ | 70-99 |
| $L_{CRB}$ [RBs] | ≤30 |
| A-MPR [dB] | ≤1 |

Additionally, the table below represents the coexistence requirement between the UE based on FDD and the UE based on TDD.

TABLE 26

| | | Spurious emission | | |
|---|---|---|---|---|
| E-UTRA band | Guard band | Frequency range (MHz) | Level (dBm) | Bandwidth (MHz) |
| XX | E-UTRA band 1, 3, 5, 8, 26, XX, 40 | $F_{DL\_low}$-$F_{DL\_high}$ | −50 | 1 |
| | Frequency range | 2010-2015 | +1.6 | 5 |
| | Frequency range | 2015-2025 | −15.5 | 5 |

On the other hand, hereinafter, in the state of placing 5 MHz or 10 MHz as guard bandwidth between the band S and band 34, in case of applying each of −50 dBm/MHz, −40 dBm/MHz and −30 dBm/MHz as the coexistence requirement among UEs, the required A-MPR values are represented the tables below. Tables 27 to 29 represent the A-MPR values extracted by performing simulations by applying −50 dBm/MHz, −40 dBm/MHz and −30 dBm/MHz as the coexistence requirement among UEs in case of assuming the guard bandwidth of 5 MHz.

First, Table 27 below represents the required A-MPR value in case that the guard bandwidth is 5 MHz and −50 dBm/MHz is applied as the coexistence requirement among UEs.

TABLE 27

| | Parameter RB allocation region | | | | | | | | | |
|---|---|---|---|---|---|---|---|---|---|---|
| $RB_{start}$ | 0-39 | | | | 40-60 | | | 61-78 | | 79-99 |
| $LC_{RB}$ [RBs] | ≥48 | 32~47 | 26~31 | <26 | ≥29 | 17~28 | <17 | ≥19 | <19 | ≥1 |
| A-MPR [dB] | ≤25 | ≤17 | ≤10 | ≤3 | ≤25 | ≤17 | ≤3 | ≤25 | ≤20 | ≤23 |

Table 28 below represents the required A-MPR value in case that the guard bandwidth is 5 MHz and −40 dBm/MHz is applied as the coexistence requirement among UEs.

TABLE 28

| | Parameter RB allocation region | | | | | | | |
|---|---|---|---|---|---|---|---|---|
| $RB_{start}$ | 0-39 | | 40-60 | | 61-78 | | | 79-99 | |
| $LC_{RB}$ [RBs] | ≥49 | <49 | ≥33 | <33 | ≥21 or <13 | 13 to 20 | ≥14 | 2 to 13 | 1 |
| A-MPR [dB] | ≤15 | ≤7 | ≤14 | ≤7 | ≤12 | ≤7 | ≤8 | ≤12 | ≤15 |

Table 29 below represents the required A-MPR value in case that the guard bandwidth is 5 MHz and −30 dBm/MHz is applied as the coexistence requirement among UEs.

TABLE 29

| Parameter | RB allocation region | | | | |
|---|---|---|---|---|---|
| $RB_{start}$ | | 0-20 | 21-69 | | 75-99 |
| $LC_{RB}$ [RBs] | ≥77 | 69~76 | ≥45 | <45 | <12 |
| A-MPR [dB] | ≤5 | ≤3 | ≤5 | ≤3 | ≤3 |

And lastly, in case that the guard bandwidth is 10 MHz and −50 dBm/MHz, −40 dBm/MHz and −30 dBm/MHz are applied as the maximum limit of spurious emission as the coexistence requirement, the required A-MPR values may be arranged by Tables 30 to 32.

First, Table 30 below represents the required A-MPR value in case that the guard bandwidth is 10 MHz and −50 dBm/MHz is applied as the coexistence requirement among UEs.

TABLE 30

| | Parameter RB allocation region | | | | | | | | |
|---|---|---|---|---|---|---|---|---|---|
| $RB_{start}$ | | 0-39 | | | 40-60 | | 61-85 | | 86-99 |
| $LC_{RB}$ [RBs] | ≥60 | 42-59 | 34-41 | <34 | ≥38 | 26-37 | <26 | ≥7 | <7 | ≥1 |
| A-MPR [dB] | ≤22 | ≤17 | ≤10 | ≤3 | ≤18 | ≤14 | ≤3 | ≤18 | ≤7 | ≤23.5 |

Table 31 below represents the required A-MPR value in case that the guard bandwidth is 10 MHz and −40 dBm/MHz is applied as the coexistence requirement among UEs.

TABLE 31

| | Parameter RB allocation region | | | | | | |
|---|---|---|---|---|---|---|---|
| $RB_{start}$ | | 0-39 | | | 40-78 | | 79-99 |
| $LC_{RB}$ [RBs] | ≥61 | 53-60 | <53 | ≥49 | 15-49 | <15 | ≥1 |
| A-MPR [dB] | ≤12 | ≤7 | ≤4 | ≤8 | ≤7 | ≤3 | ≤13 |

Table 32 below represents the required A-MPR value in case that the guard bandwidth is 10 MHz and −30 dBm/MHz is applied as the coexistence requirement among UEs.

TABLE 32

| Parameter | RB allocation region | | |
|---|---|---|---|
| $RB_{start}$ | 0-13 | 83-99 | |
| $LC_{RB}$ [RBs] | ≥82 | ≥5 | <5 |
| A-MPR [dB] | ≤2 | ≤1 | ≤3 |

Figure 19A:
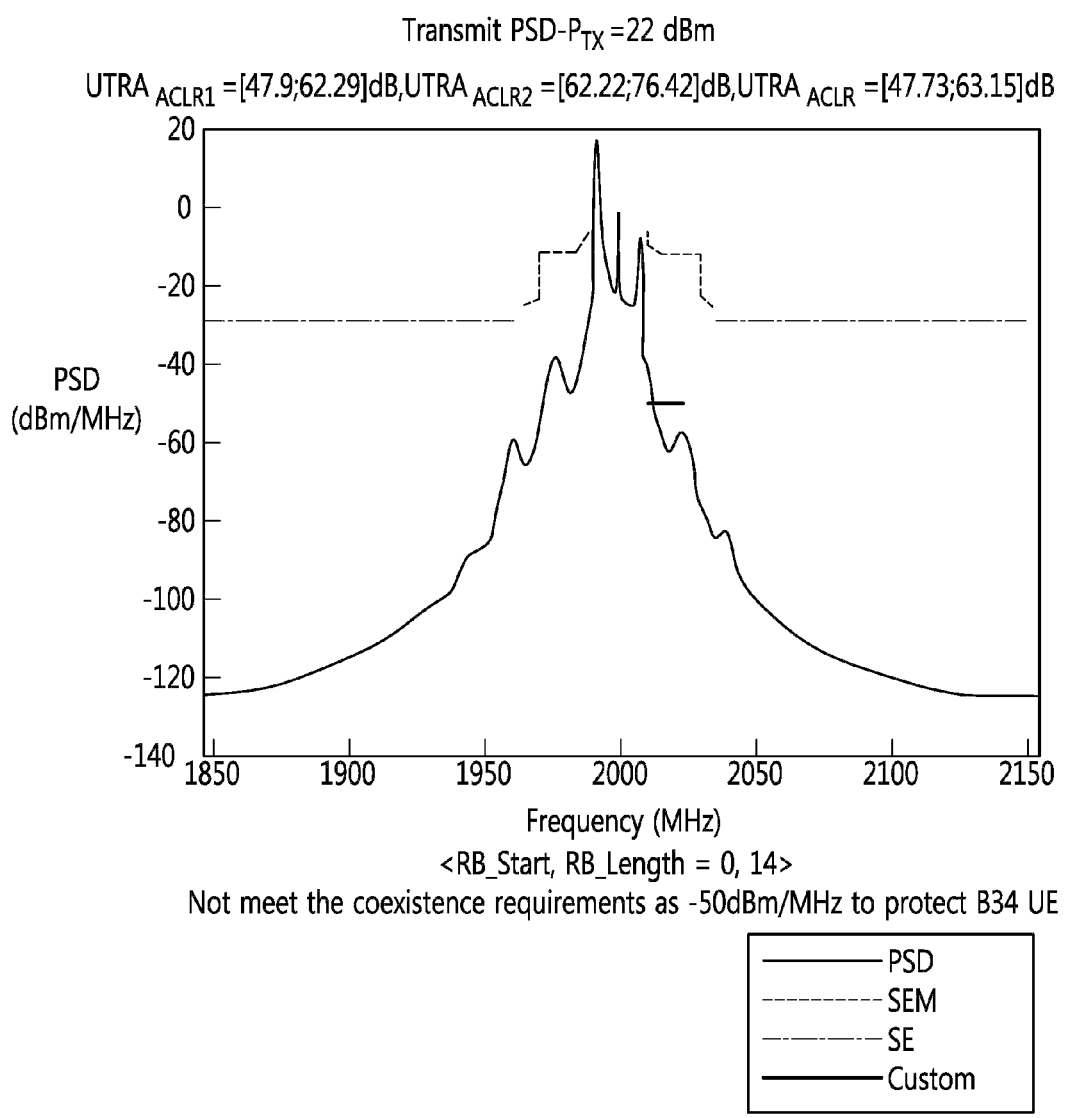
FIGS. 19a to 19q are graphs illustrating the required A-MPR values depending on the allocation position of the RB and the number of the RB allocation number as the similar ways as the simulations above in case of using the PA which has the linearity different from existing PA and is good in influence on the emission for adjacent band.
Figure 19B:
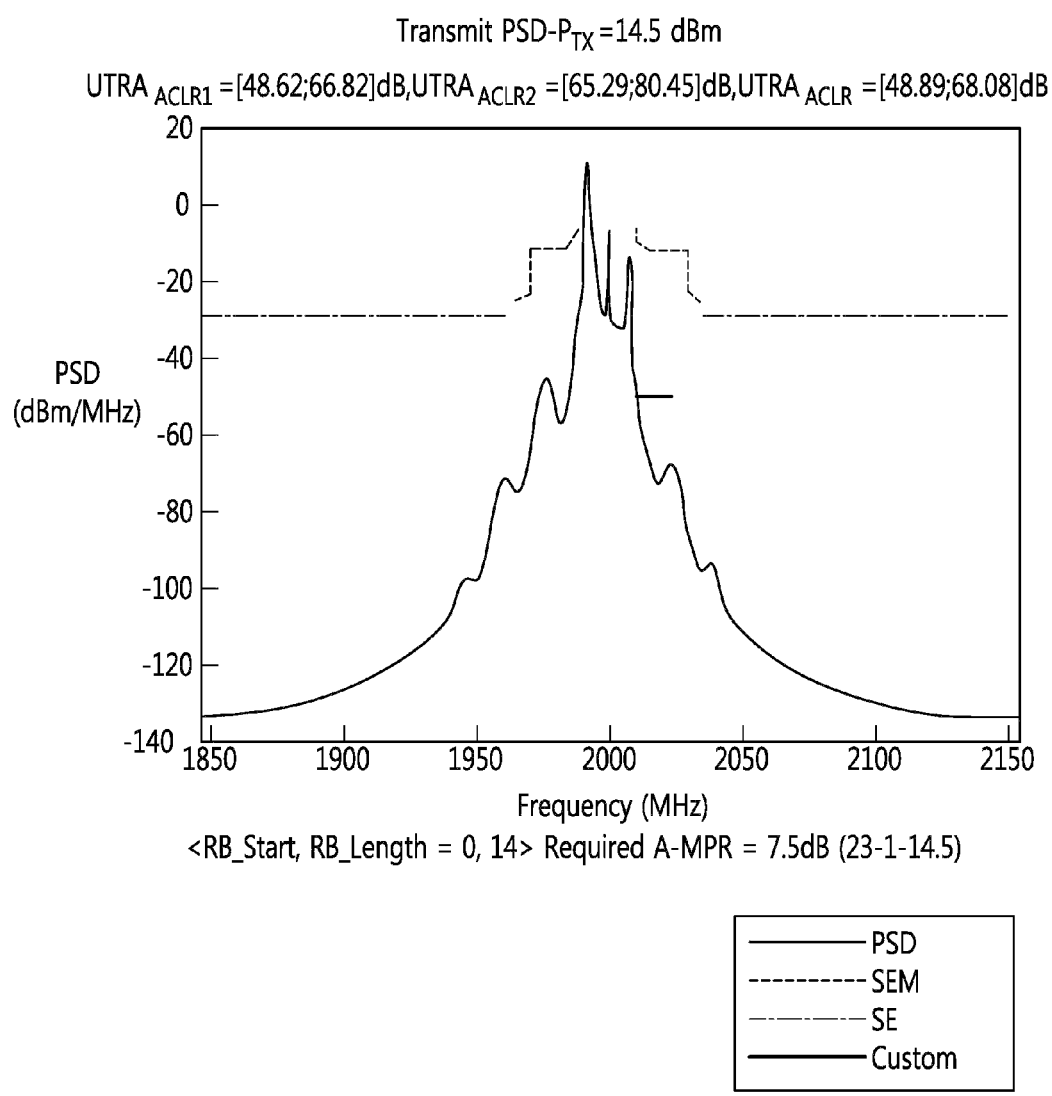
Figure 19C:
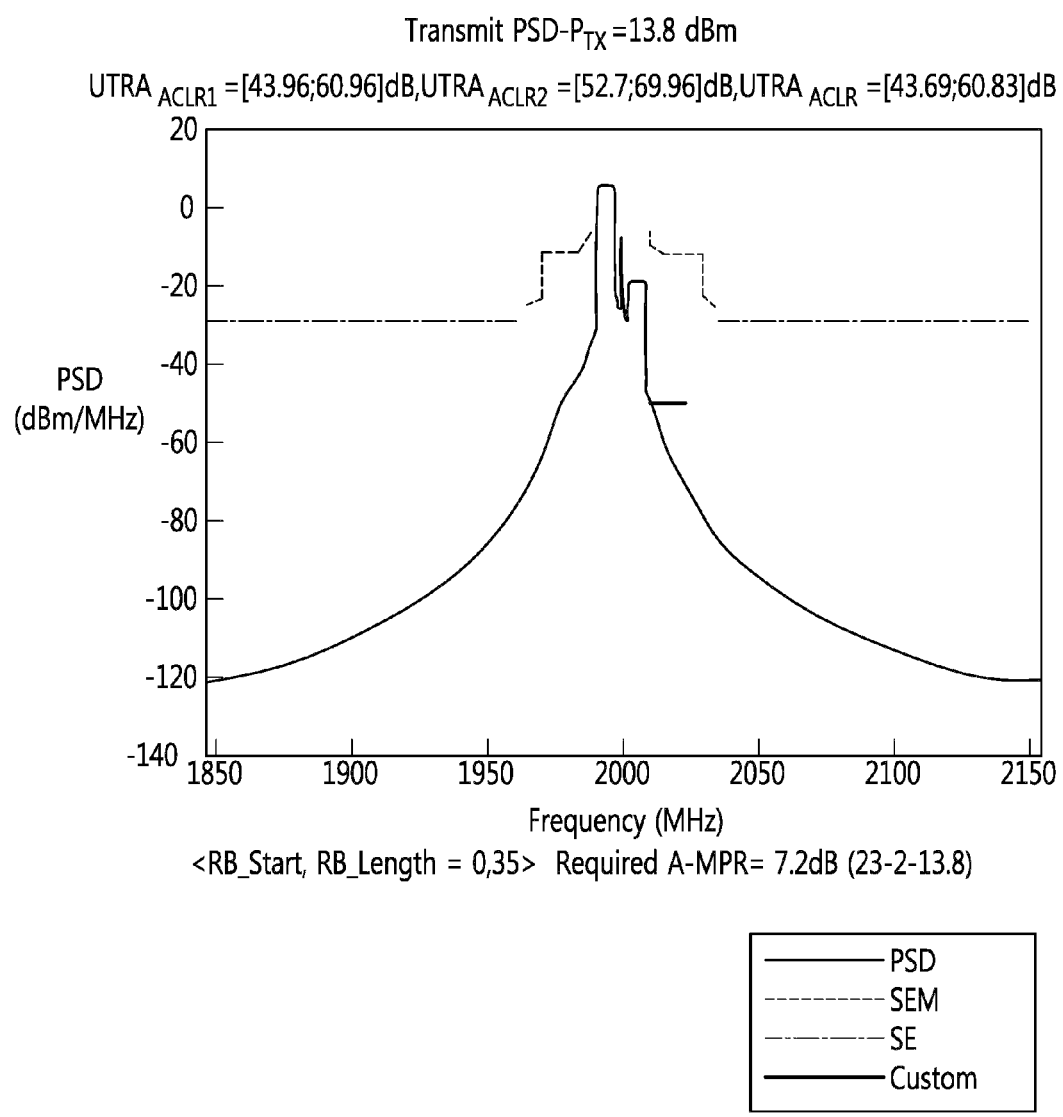
Figure 19D:
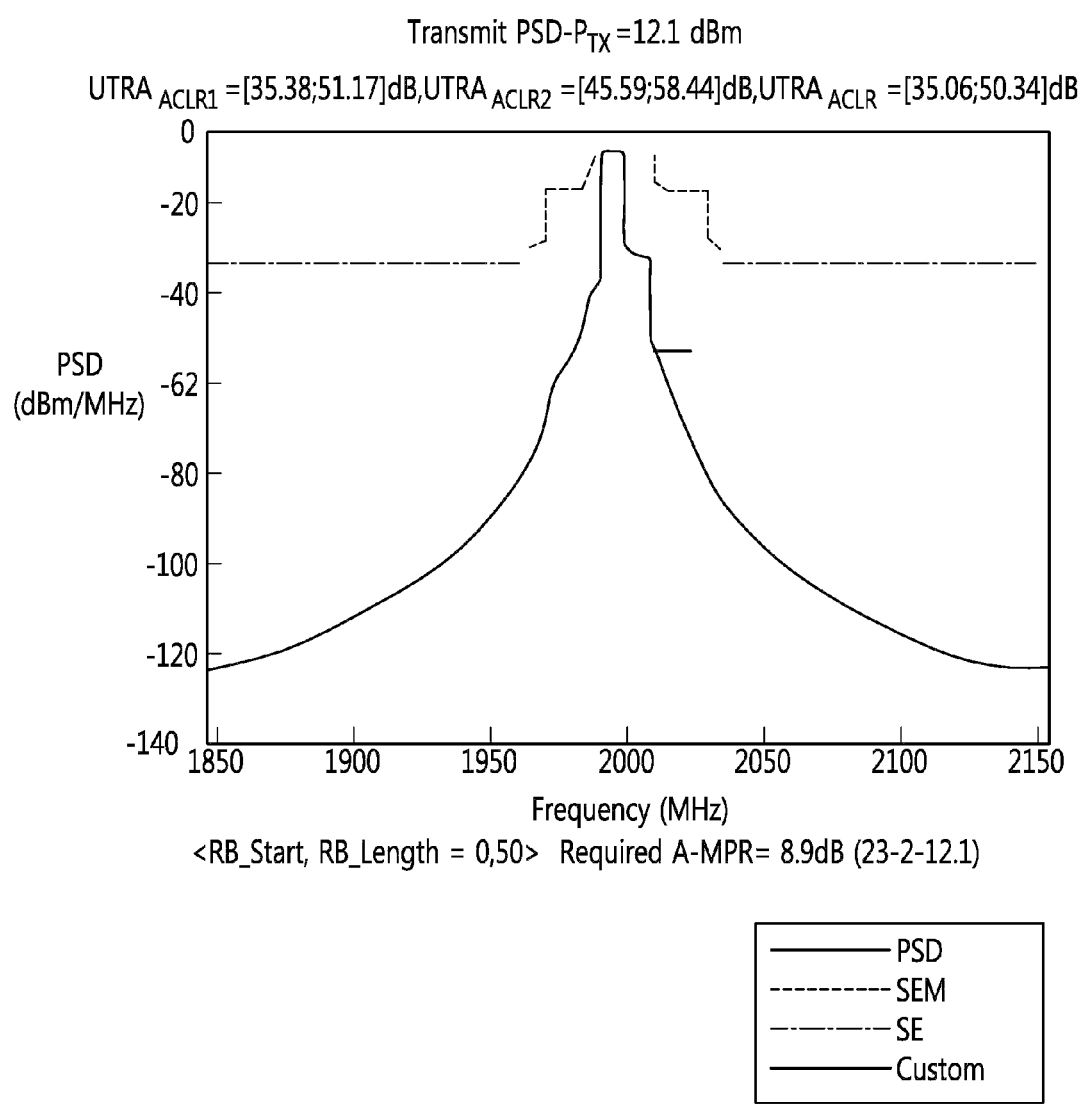
Figure 19E:
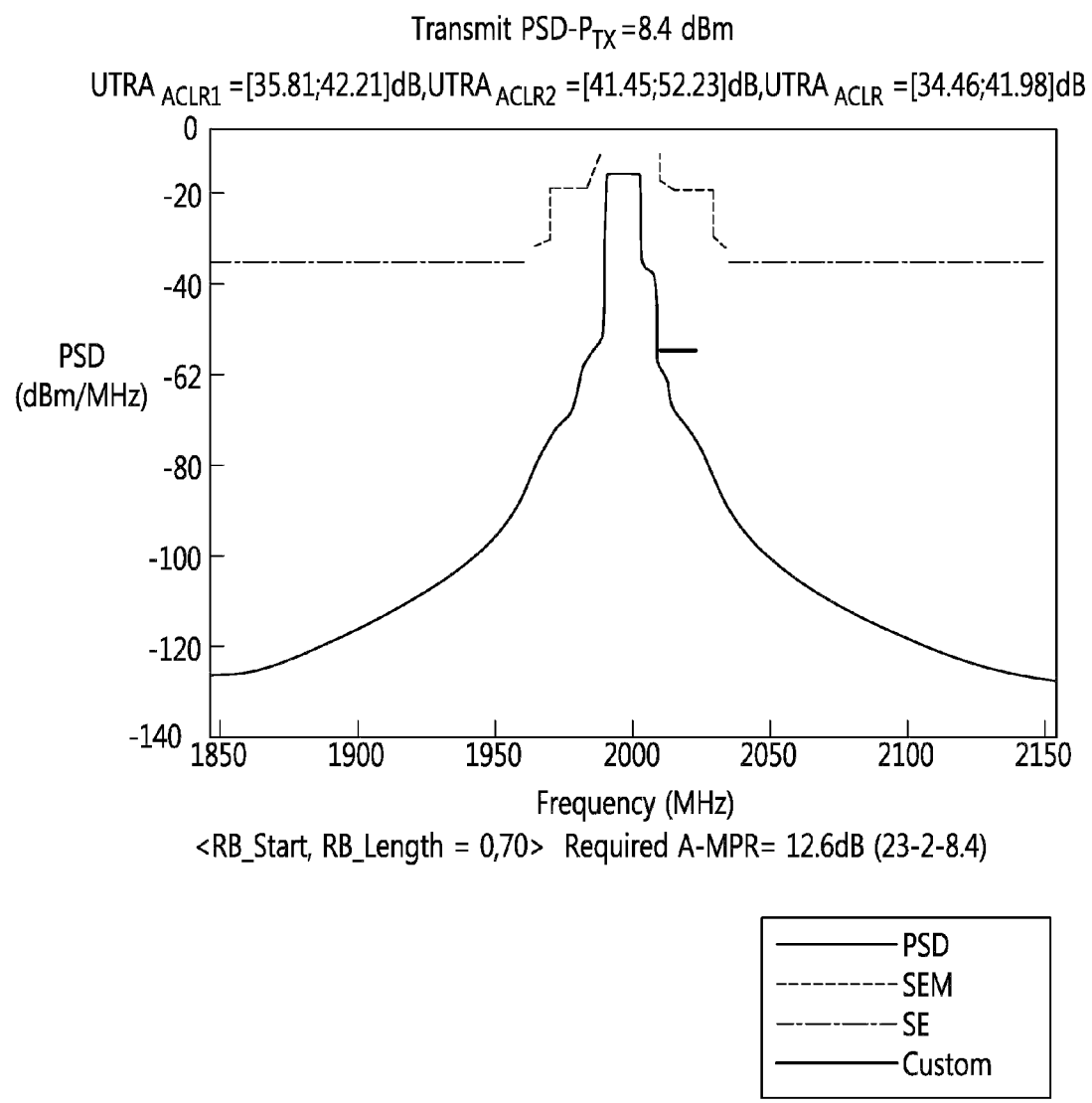
Figure 19F:
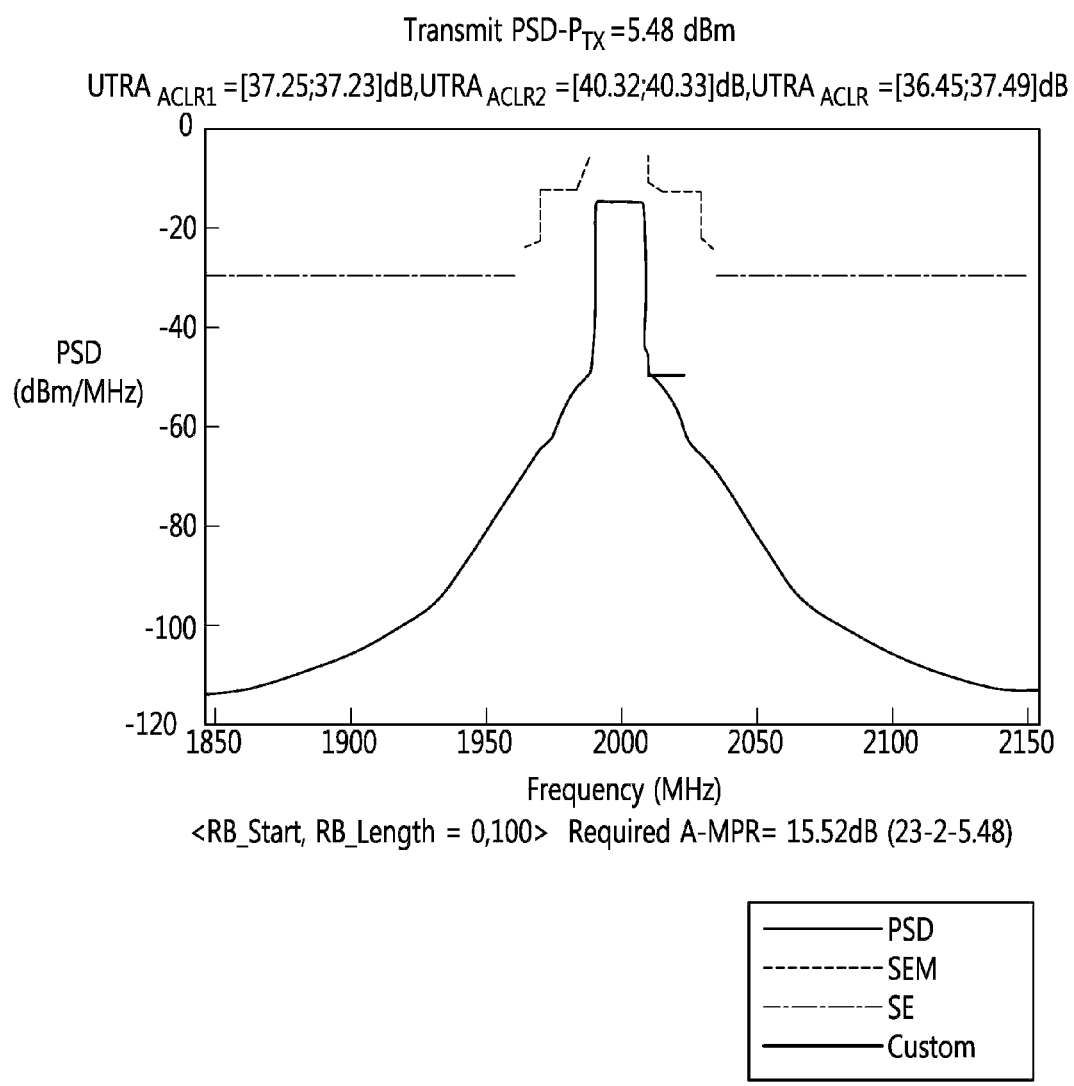
Figure 19G:
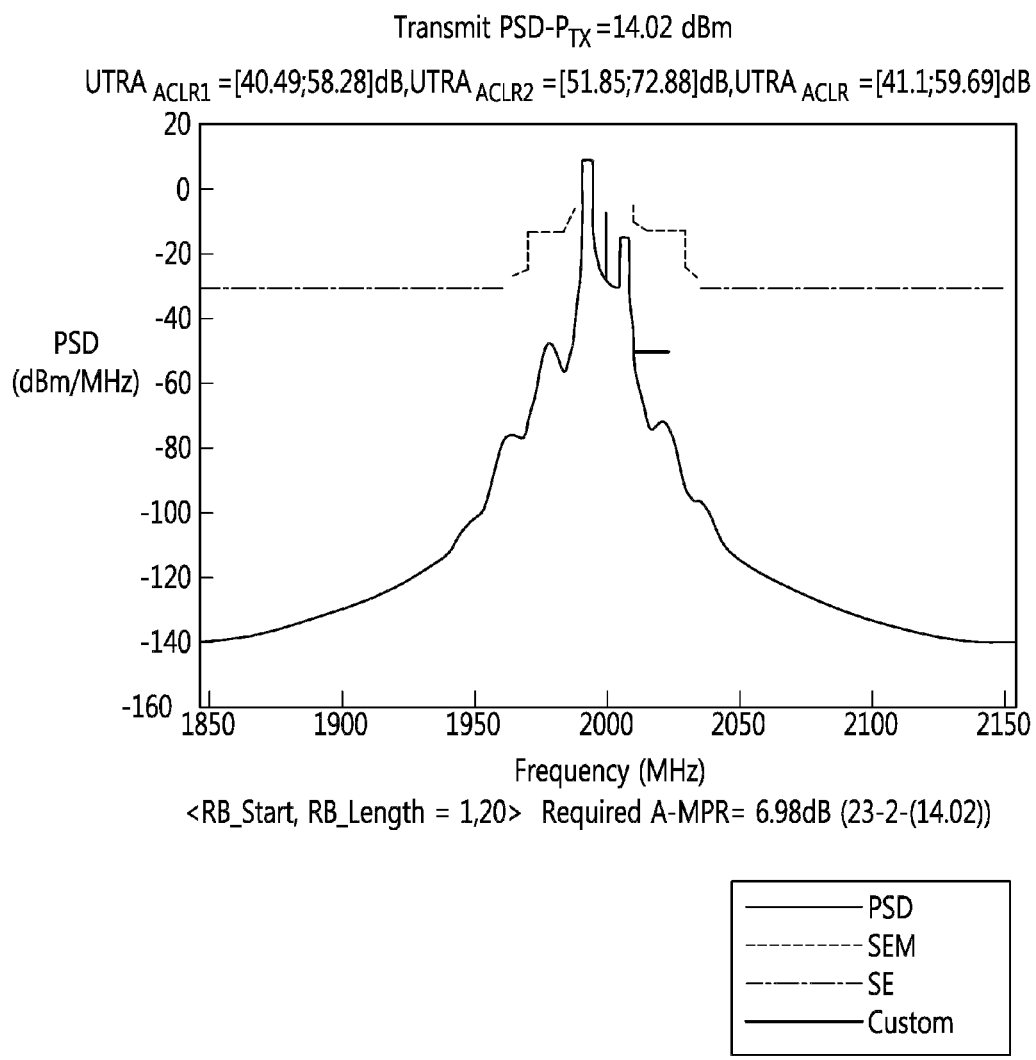
Figure 19H:
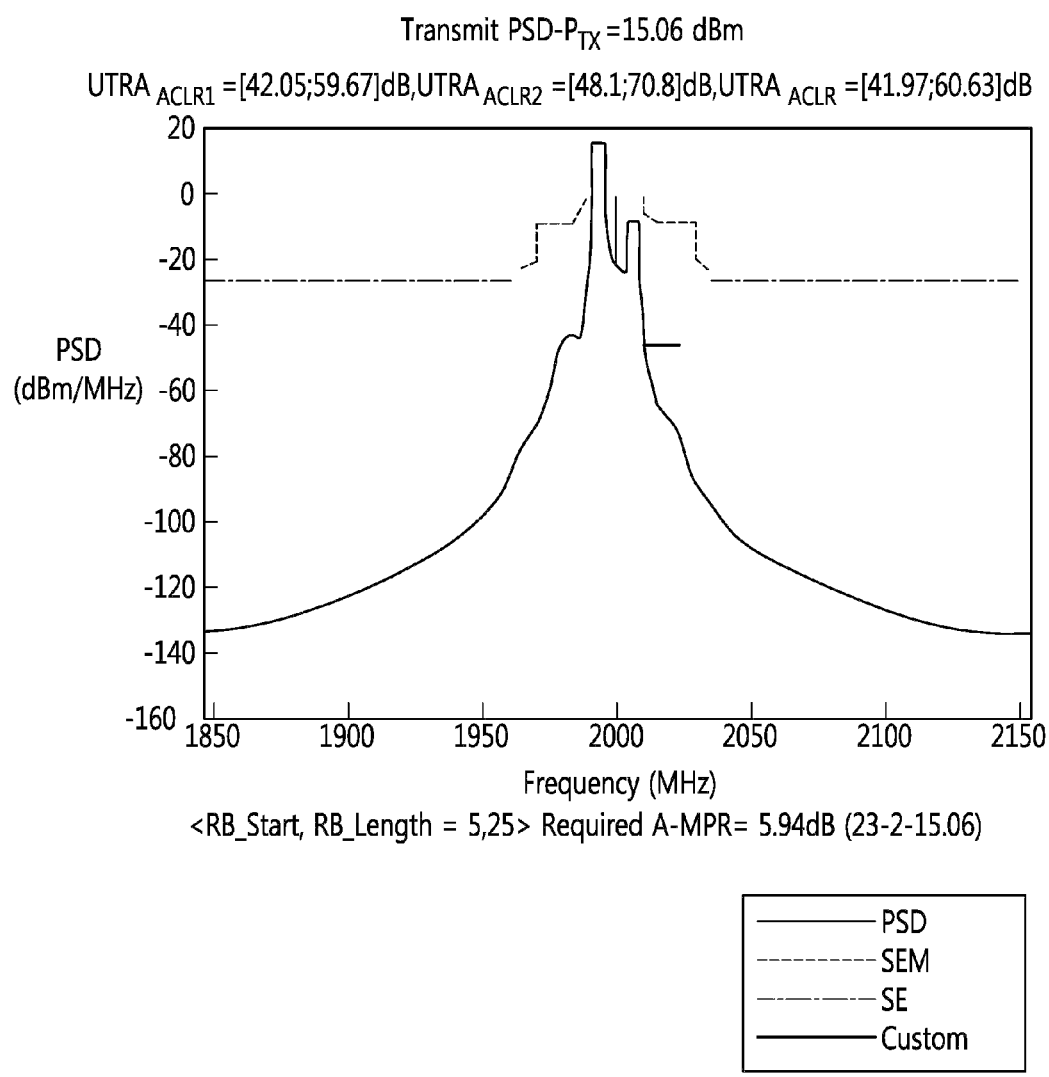
Figure 19I:
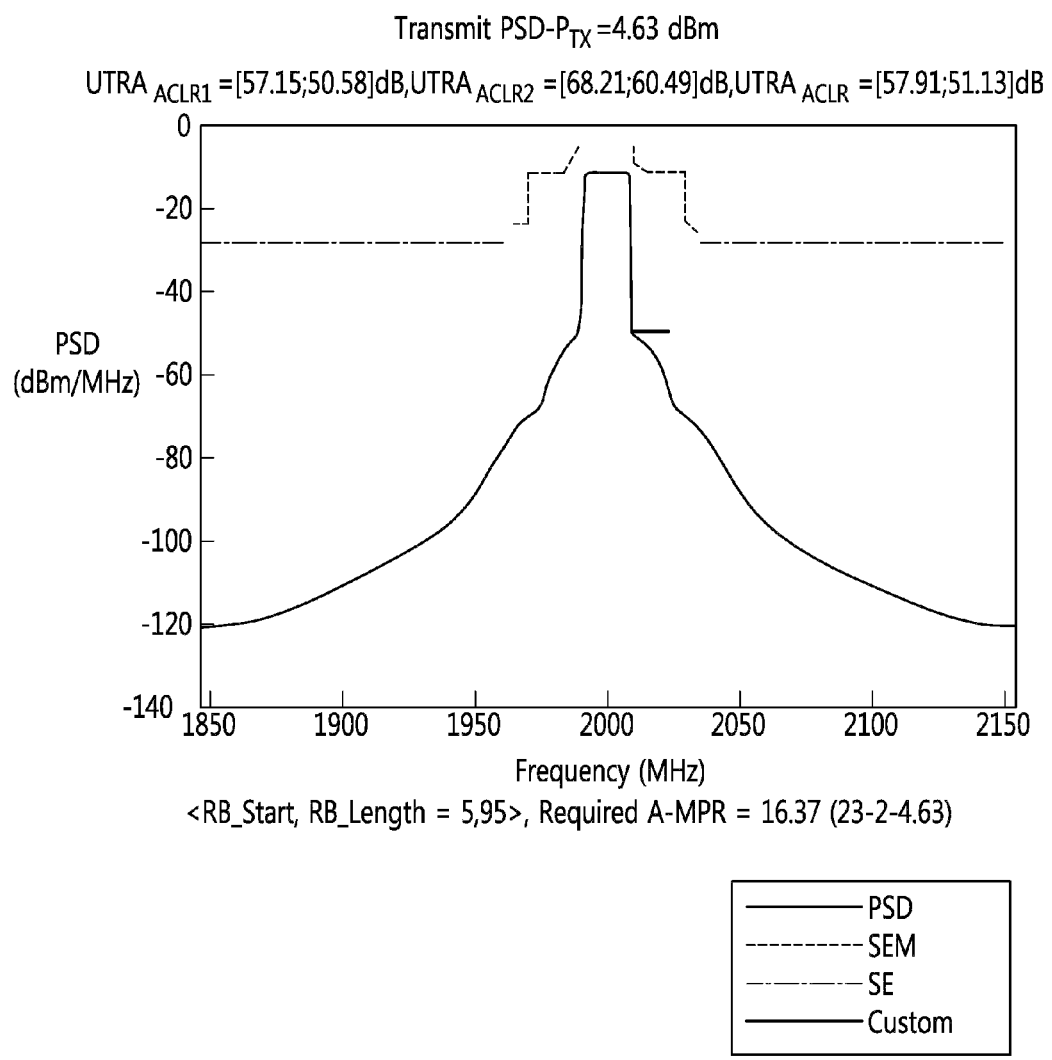
Figure 19J:
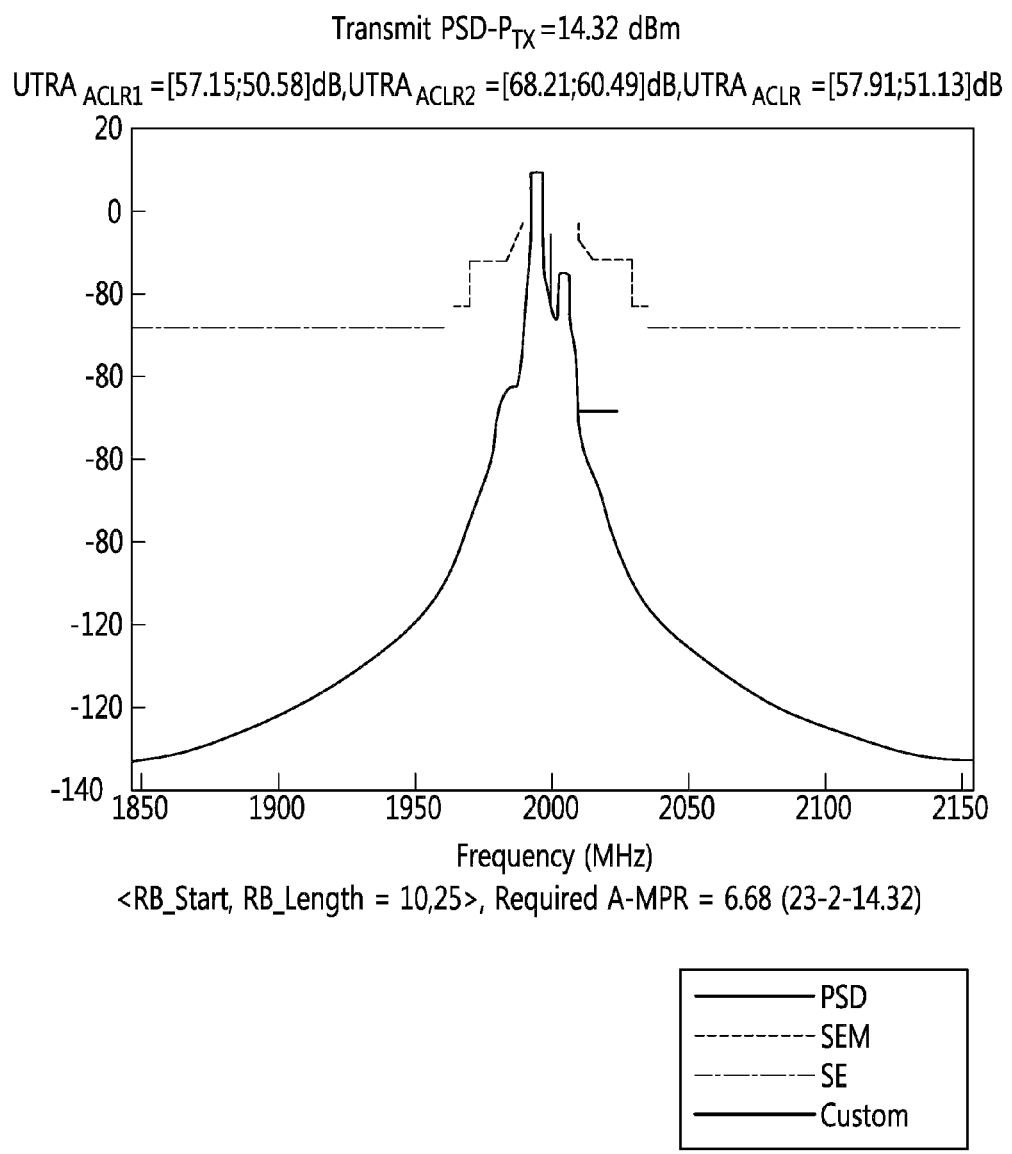
Figure 19K:
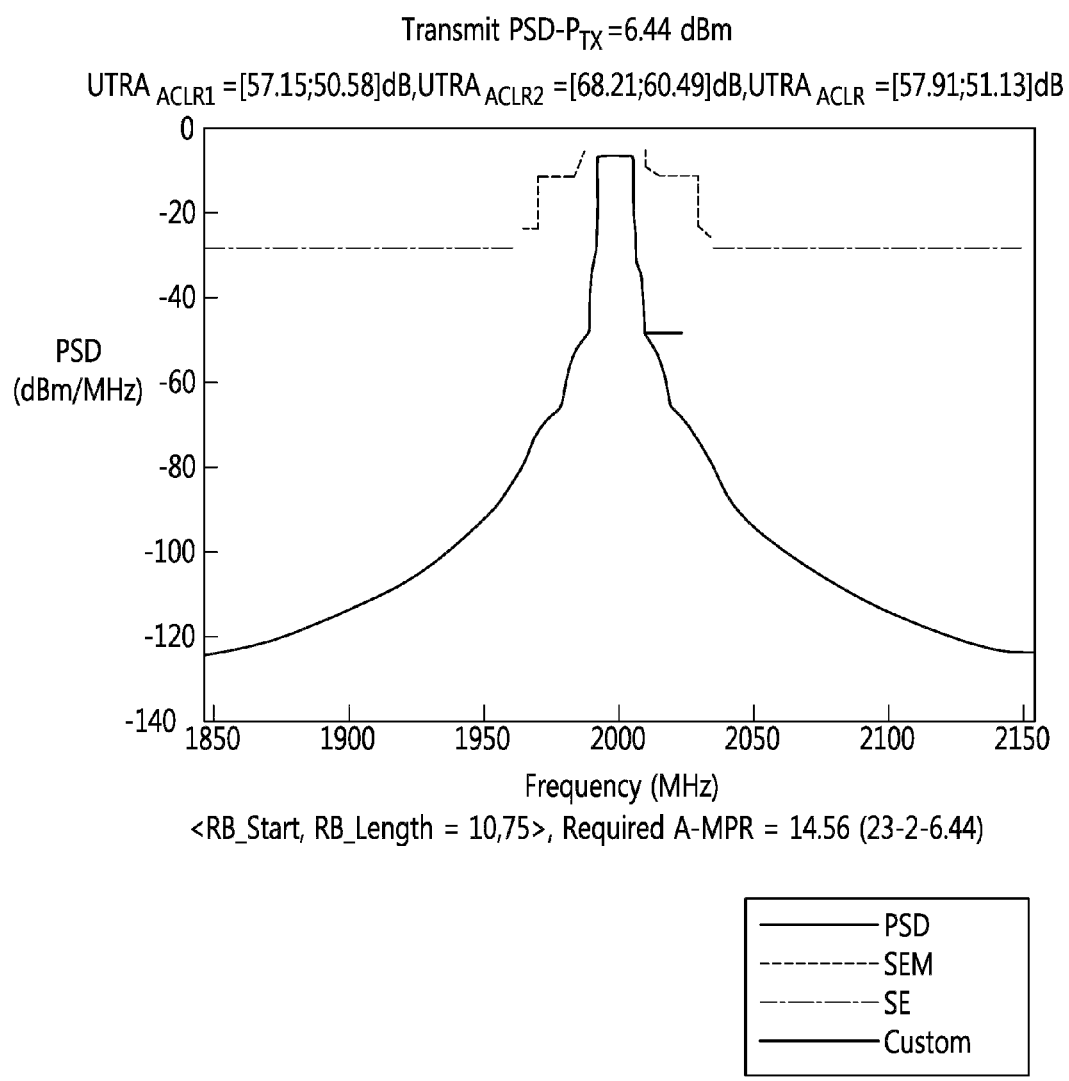
Figure 19L:
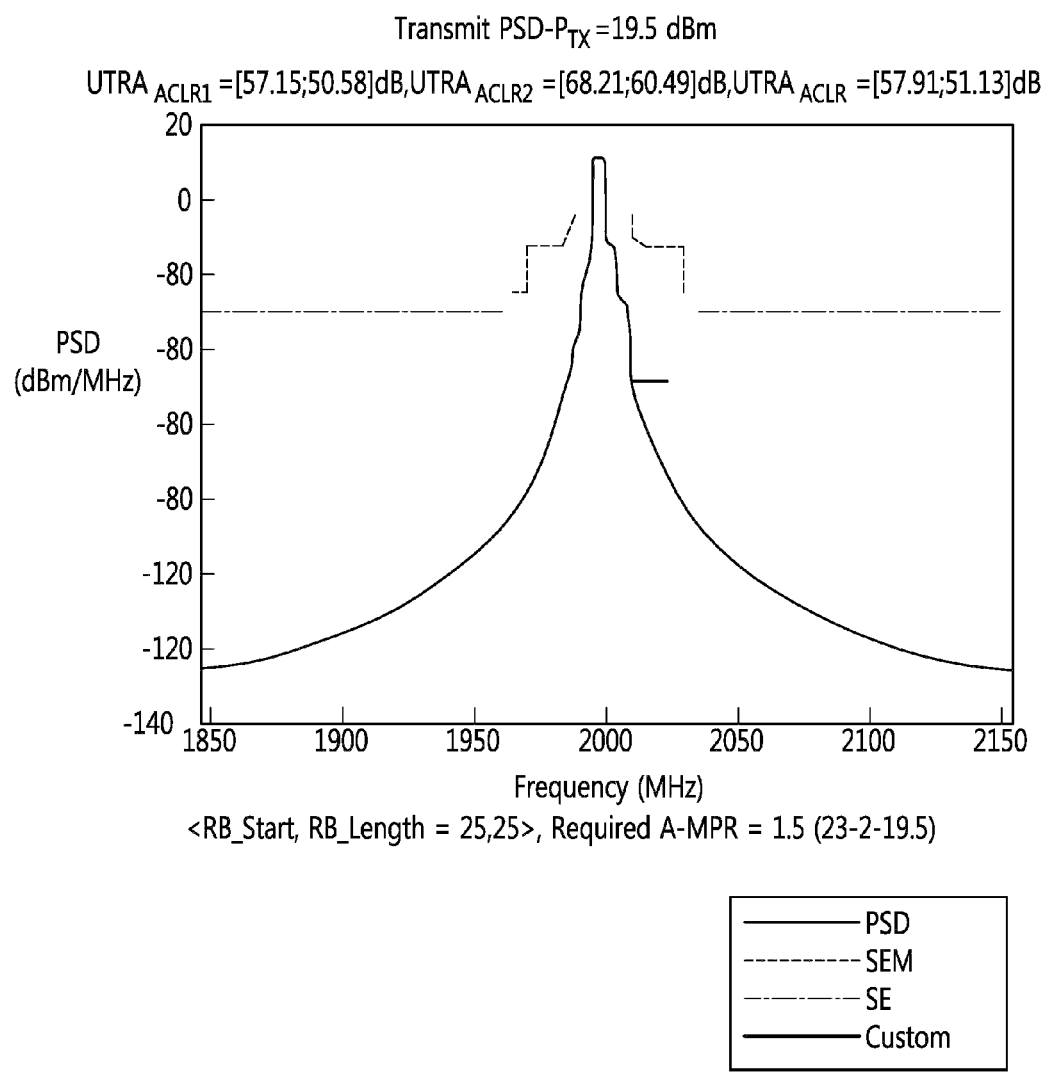
Figure 19M:
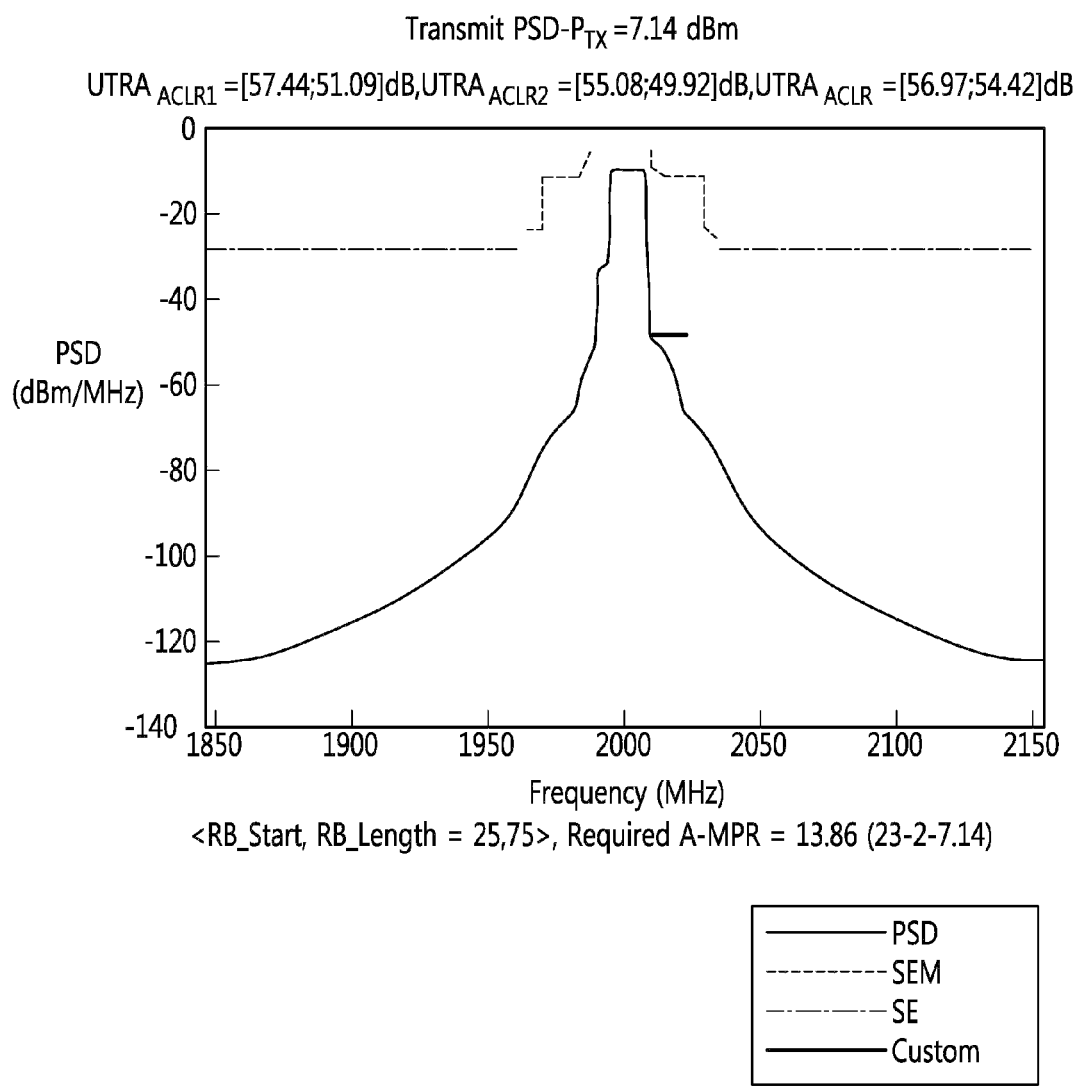
Figure 19N:
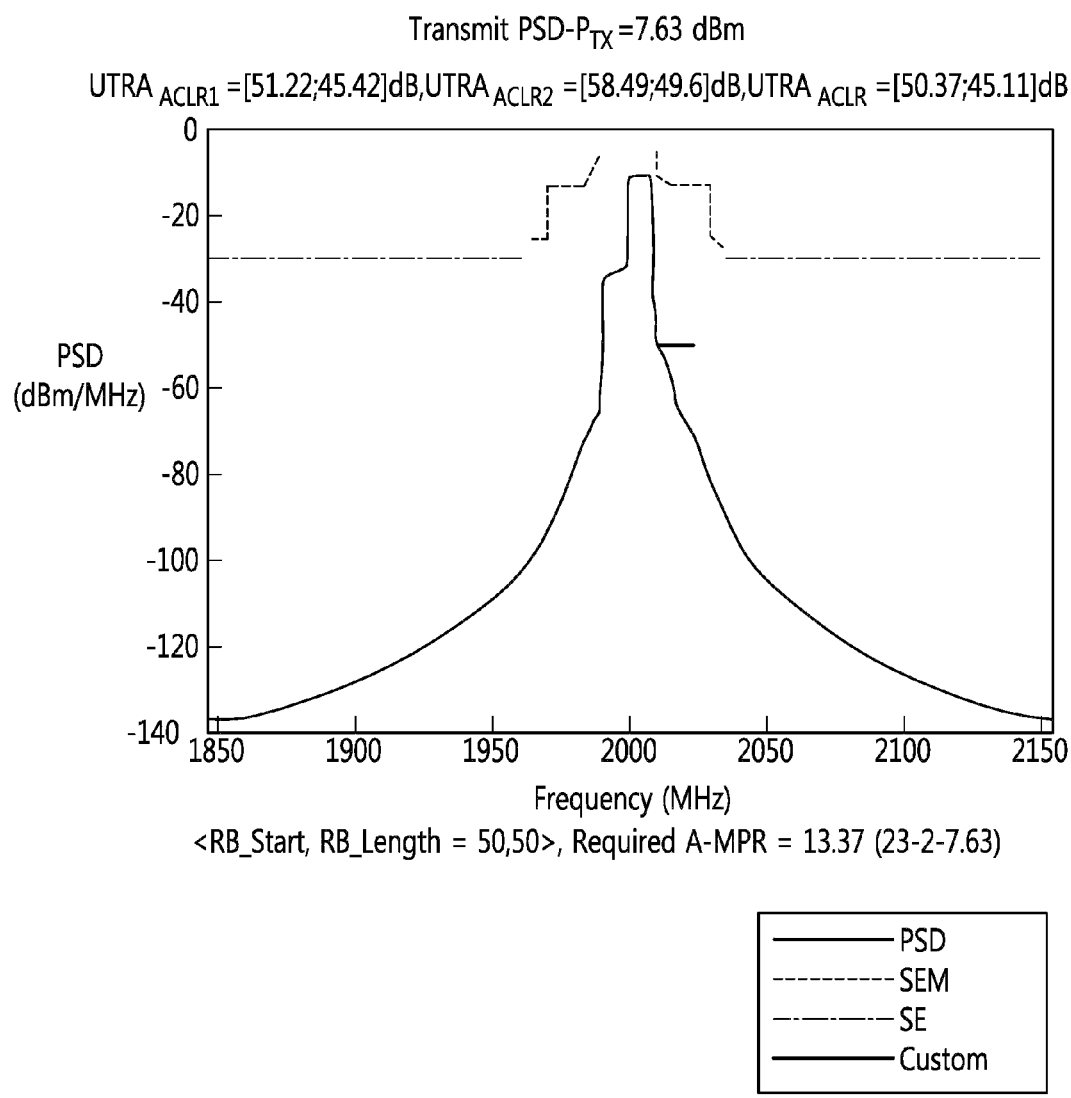
Figure 19O:
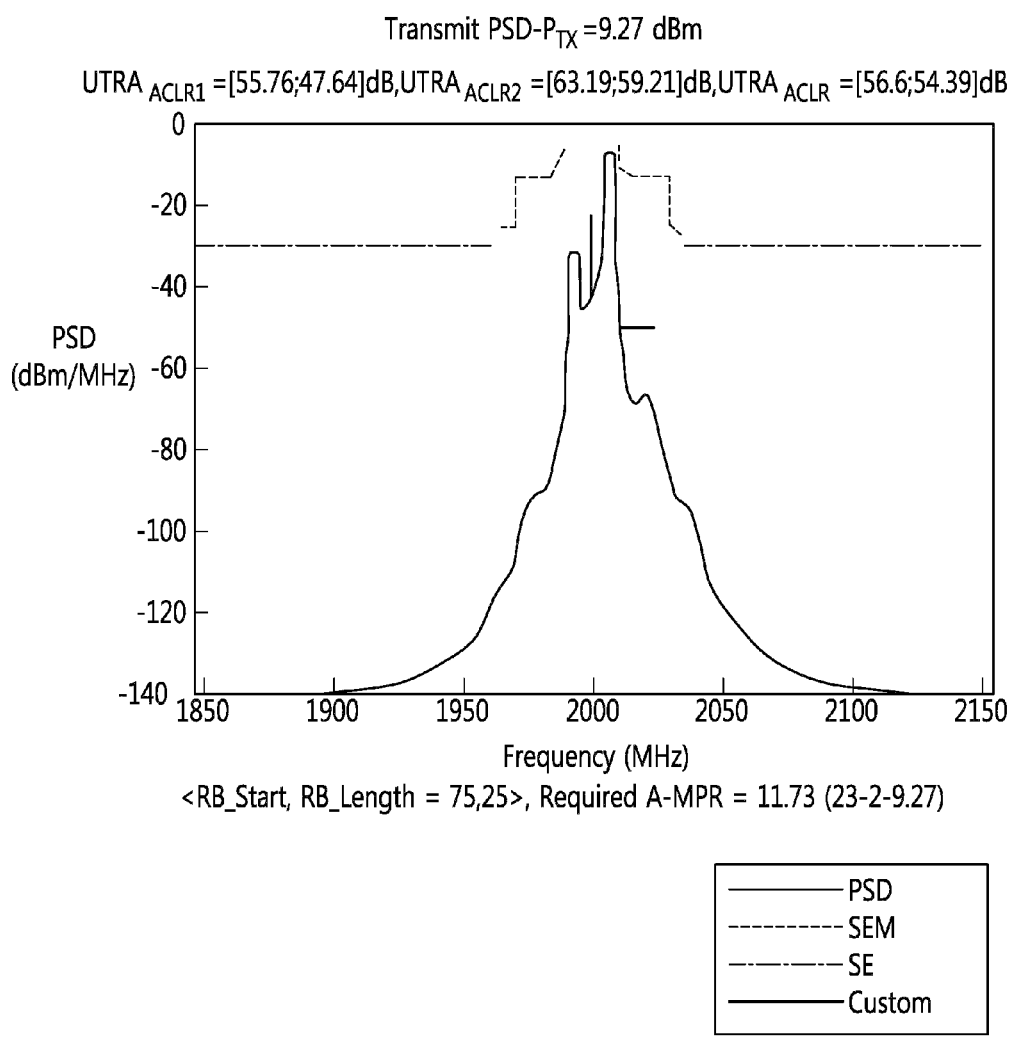
Figure 19P:
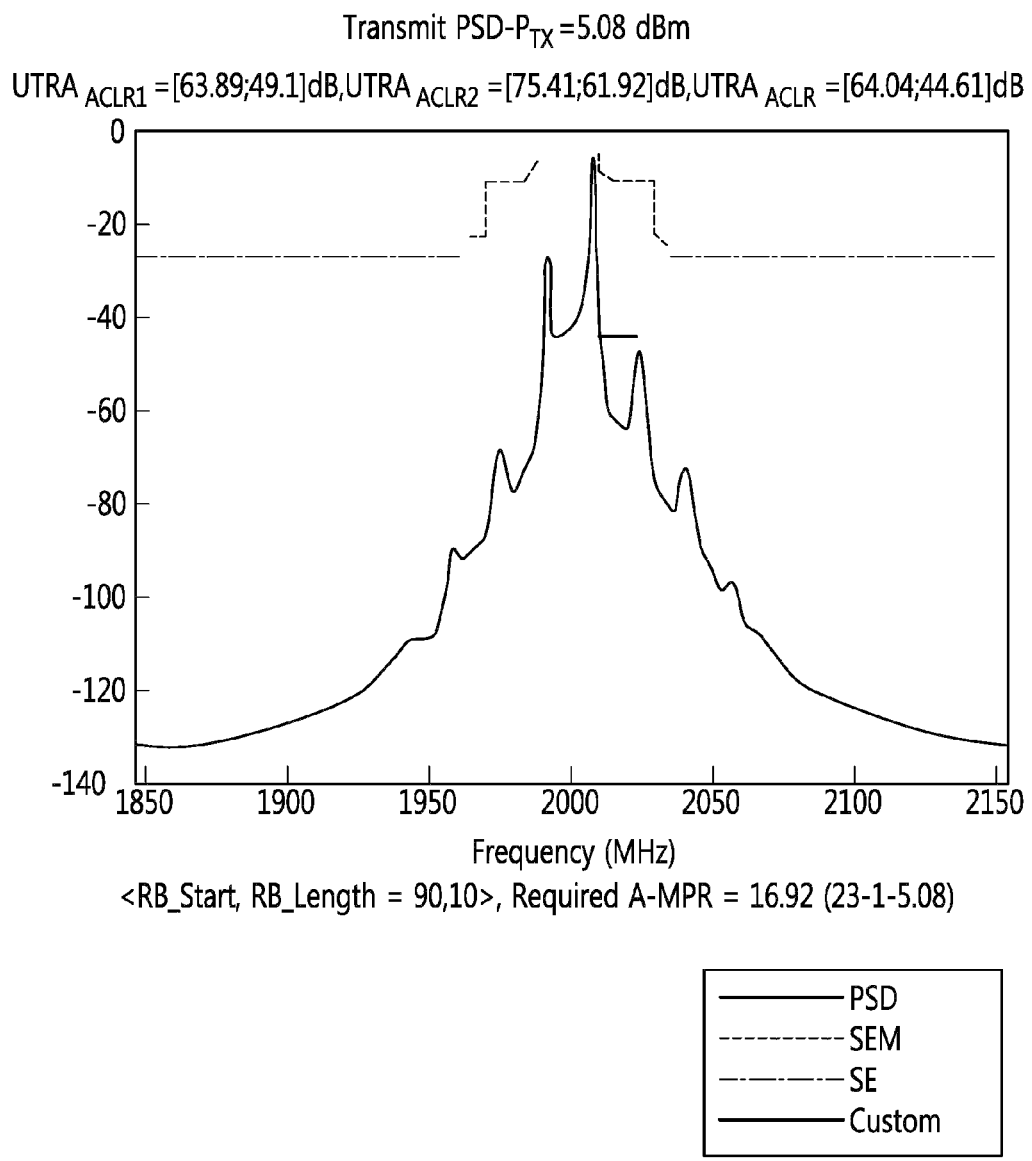
Figure 19Q:
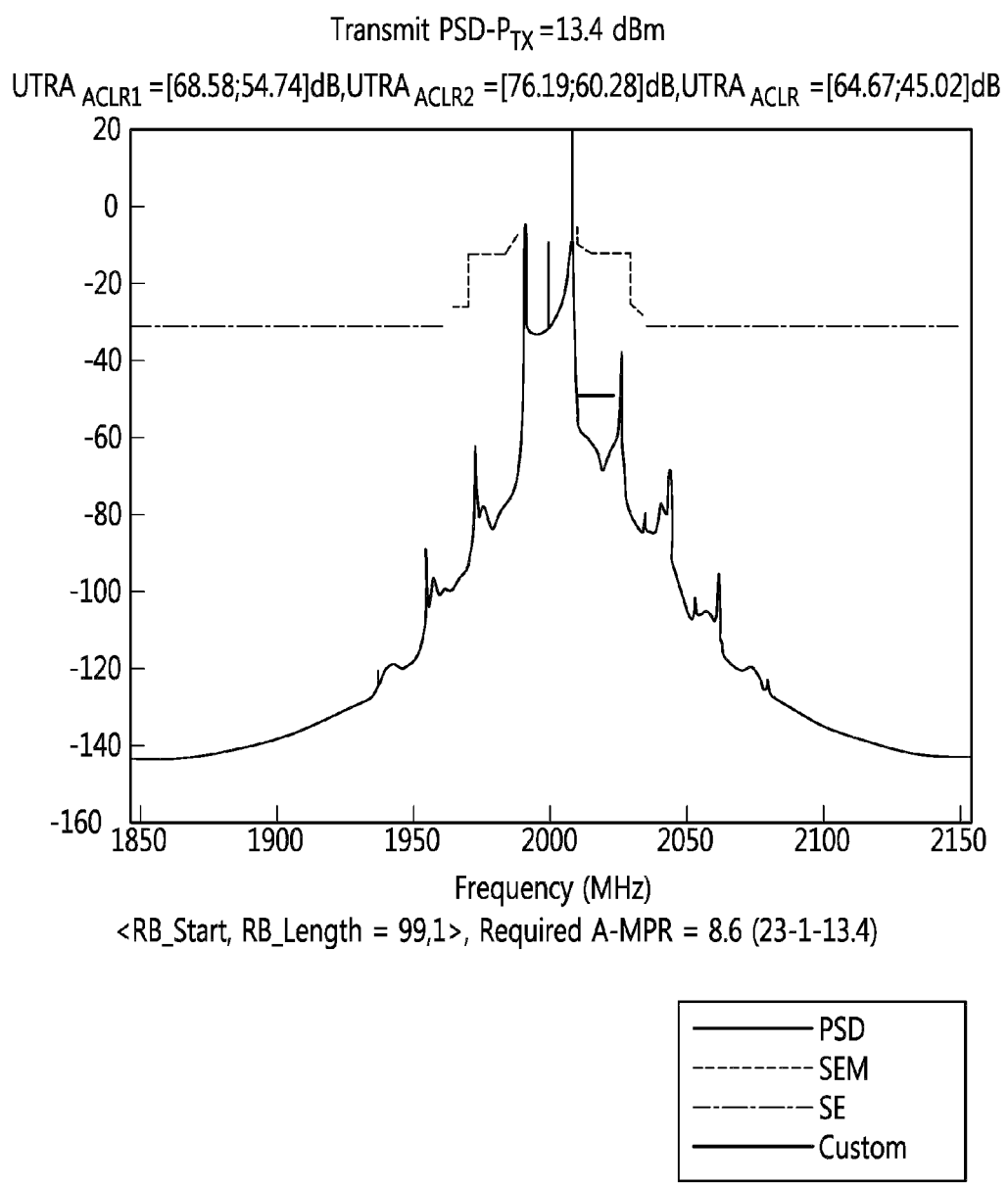

FIGS. 19a to 19q are graphs illustrating the required A-MPR values depending on the allocation position of the RB and the number of the RB allocation number as the similar ways as the simulations above in case of using the PA which has the linearity different from existing PA and is good in influence on the emission for adjacent band.

Referring to FIGS. 19a to 19q, the A-MPR values which are lower than those of FIGS. 17 and 18 are required. This may be decided by the PA characteristics of UE, and the required A-MPR value may be different according to the linearity characteristics of such a PA.

First, FIG. 19a shows the case that the UE operating in the band S is to find the A-MPR value required to protect the adjacent UE when applying −50 dBm/MHz which is the maximum limit of spurious emission as the existing coexistence requirements among UEs to protect the UE operating in band 34. Referring to FIG. 19a, in case that the starting position of the UE operating in the band S is zero and there are 14 continuously allocated RBs, the emission limit emitted by the UE does not satisfy −50 dBm/MHz which is the coexistence requirement among UEs. Accordingly, in this case, the A-MPR value of 7.5 dB is required as the case of FIG. 19b.

Referring to FIG. 19c, in case that the starting position of the RB is zero and there are 35 continuously allocated RBs, 7.2 dB (=23 dB−2 dB−(13.8 dB)) may be required as the A-MPR value. Next, as known from referring to FIG. 19d, in case that the starting position of the RB is zero and there are 50 continuously allocated RBs, the required A-MPR value may be 8.9 dB (=23 dB−2 dB−(12.1 dB)). In FIG. 19e, in case that the starting position of the RB is zero and there are 70 continuously allocated RBs, the required A-MPR value may be 12.6 dB (=23 dB−2 dB−(8.4 dB)).

Meanwhile, as known from referring to FIG. 19f, in case that the starting position of the RB is zero and there are 100 continuously allocated RBs, the required A-MPR value may be 15.52 dB (=23 dB−2 dB−(5.48 dB)). As such the required A-MPR value becomes greater gradually as the number of continuously allocated RB gradually increases and close to the band to protect.

Referring to FIG. 19g, in case that the starting position of the RB is 1 and there are 20 continuously allocated RBs, and next, as known from referring to FIG. 19h, in case that the starting position of the RB is 5 and there are 25 continuously allocated RBs, the required A-MPR value may be 5.94 dB (=23 dB−2 dB−(15.06 dB)). In FIG. 19i, in case that the starting position of the RB is 5 and there are 95 continuously allocated RBs, the required A-MPR value may be 16.37 dB (=23 dB−2 dB−(4.63 dB)).

Meanwhile, as known from referring to FIG. 19j, in case that the starting position of the RB is 10 and there are 25 continuously allocated RBs, the required A-MPR value may be 6.68 dB (=23 dB−2 dB−(14.32 dB)). In addition, as known from referring to FIG. 19k, in case that the starting position of the RB is 10 and there are 75 continuously allocated RBs, the required A-MPR value may be 14.56 dB (=23 dB−2 dB−(6.44 dB)).

In FIG. 19l, in case that the starting position of the RB is 25 and there are 25 continuously allocated RBs, the required A-MPR value may be 1.5 dB (=23 dB−2 dB−(19.5 dB)). Also, as seen from FIG. 19m, in case that the starting position of the RB is 25 and there are 75 continuously allocated RBs, the required A-MPR value may be increased to 13.86 dB (=23 dB−2 dB−(7.14 dB)).

In FIG. 19n, in case that the starting position of the RB is 50 and there are 50 continuously allocated RBs, the required A-MPR value may be 13.37 dB (=23 dB−2 dB−(7.63 dB)), and in FIG. 19o, in case that the starting position of the RB is 75 and there are 25 continuously allocated RBs, the required A-MPR value may be 11.73 dB (=23 dB−2 dB−(9.27 dB)). FIG. 19p is the case of requiring the greatest value among the suggested A-MPR values, which is the case that the counter IM3 component falls into corresponding band 34. In FIG. 19p, in case that the starting position of the RB is 90 and there are 10 continuously allocated RBs, the required A-MPR value may be 16.92 dB (=23 dB−1 dB−(5.08 dB)), and FIG. 19q is the case that 1 PB is located on the upper edge part of the band S, in this case, the required A-MPR value is about 8.6 dB.

As such, the guard bandwidth is 0 MHz, the most important factor to decide the A-MPR is the requirement for coexistence among UEs, than the requirements such as Adjacent Channel Leakage Ratio (ACLR), spurious emission (SE), Spectrum emission mask (SEM), and the like. As seen from the simulation results, the required A-MPR value becomes greater gradually as the number of continuously allocated RB in the same starting position gradually increases and close to the band to protect.

In the present invention, by using various UE coexistence requirement values as the methods above, the required A-MPR values are extracted. That is, the A-MPR values required based on the requirement of −50 dBm/MHz, −40 dBm/MHz, −30 dBm/MHz, −15.5 dBm/5 MHz is defined in the GAP of 0 MHz, and also, in case that the guard region between the band S which will be newly defined and band 34 is 0 MHz and 5 MHz as the same as the present, and lastly, the A-MPR value required also in case of 10 MHz is extracted. This is represented as Table 33.

TABLE 33

| Case | E-UTRA Channel Bandwidth (MHz) | Separation between E-UTRA carrier edge and protected range (MHz) | Spurious emissions protection level | A-MPR (dB) |
|---|---|---|---|---|
| 1 | 5/10/15/20 | 0 | −50 dBm/MHz | 17/17/17/17 |
|   |            |   | −40 dBm/MHz | 15/14/14/13 |
|   |            |   | −30 dBm/MHz | 12/11/11/11 |
|   |            |   | −15.5 dBm/5 MHz | 5/4/4/3 |
| 2 | 5/10/15/20 | 5 | −50 dBm/MHz | 10/15/15/15 |
|   |            |   | −40 dBm/MHz | 5/8/9/9 |
|   |            |   | −30 dBm/MHz | 2/5/6/6 |
|   |            |   | −15.5 dBm/5 MHz | 0/0/0/0 |
| 3 | 5/10/15/20 | 10 | −50 dBm/MHz | 2/10/15/14 |
|   |            |    | −40 dBm/MHz | 0/4/8/9 |
|   |            |    | −30 dBm/MHz | 0/0/5/5 |
|   |            |    | −15.5 dBm/5 MHz | 0/0/0/0 |

According to the results mentioned above and the suggested tables, the maximum limit of spurious emission, which is the most effective coexistence requirements among UEs, may be 40 dBm/MHz in case of assuming the guard bandwidth of 5 MHz. In this case, while the cell coverage is decreased to the value similar to the A-MPR value which is required in the existing band 13 and other specific band, the UE operating in band 34 and the UE operating in the band S become to coexist in the same region, thereby the efficiency of frequency may be increased. In addition, by assuming the guard region to be 5 MHz, not as great as 10 MHz, the frequency waste can be minimized.

Embodiment of the present invention may be implemented through various means. For example, the embodiments of the present invention may be implemented by hardware, firmware, software, or a combination thereof.

According to hardware implementation, the method according to the embodiments of the present invention may be implemented using Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors.

According to firmware or software implementation, the method according to the embodiments of the present invention may be implemented in the form of a module, a procedure or a function to perform the above functions or operation. A software code is stored in a memory unit so that the software code may be driven by a processor. The memory unit may be located inside or outside the processor to exchange data with the processor by various know means. The wireless communication system according to an embodiment of the present invention will be described with reference to FIG. 20.

Figure 20:
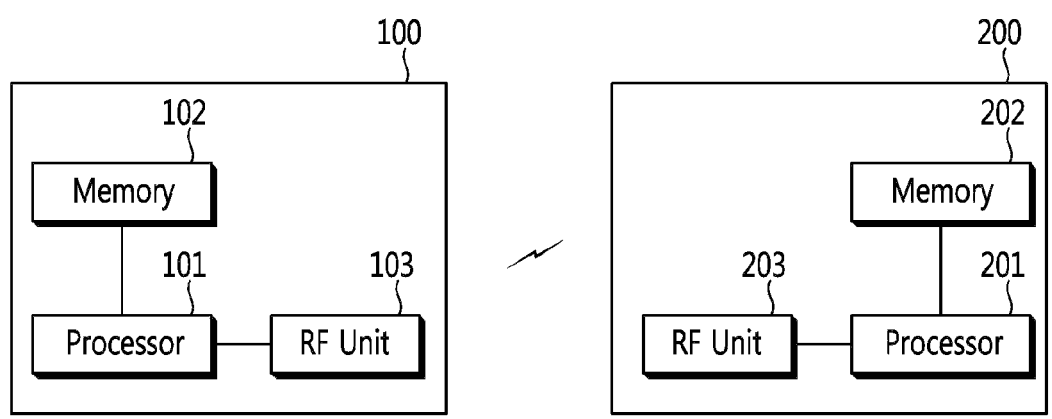
FIG. 20 is a block diagram illustrating a wireless communication system according to an embodiment of the present invention.

FIG. 20 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A wireless device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 201.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

INDUSTRIAL APPLICABILITY

The present invention may be used in a terminal, a base station, and other device of a wireless mobile communication system.

What is claimed is:

1. A method for determining uplink transmission power, the method performed by a first user equipment (UE) and comprising:
configuring a radio frequency (RF) unit of the first UE to use for an uplink transmission a frequency range of 1980 MHz through 2010 MHz or 1920 MHz through 2010 MHz;
receiving, by the RF unit of the first UE from a serving base station (BS), a value of an additional maximum power reduction (A-MPR),
wherein the serving BS is adjacent to a neighboring BS for serving a second UE using for an uplink transmission a frequency range of 2010 MHz through 2025 MHz; and
transmitting, from the RF unit of the first UE to the serving BS, an uplink signal at an uplink transmission power calculated by using the value of the A-MPR,
wherein the value of the A-MPR is 11 dB or 15 dB.

2. The method of claim 1, wherein
if the first UE is applied with −40 dBm/MHz as a maximum limit of spurious emission for a coexistence requirement with the second UE, and if a transmission bandwidth allocated for the uplink transmission of the first UE is 5 MHz, the value of the A-MPR is 15 dB.

3. The method of claim 1, wherein
if the first UE is applied with −30 dBm/MHz as a maximum limit of spurious emission for the coexistence requirement with the second UE, and if a transmission bandwidth allocated for the uplink transmission of the first UE is 10 MHz, the value of the A-MPR is 11 dB.

4. The method of claim 1, wherein the value of the A-MPR is applied if a guard band does not exist between the frequency range of 1980 MHz through 2010 MHz or 1920 MHz through 2010 MHz for the uplink transmission.

5. The method of claim 1, wherein the frequency range of 1980 MHz to 2010 MHz is a band that is available to be used for a long tem evolution (LTE) or an advanced LTE (LTE-A) system as well as satellite communication.

6. The method of claim 1, wherein the frequency range of 2010 MHz through 2025 MHz that the second UE uses is evolved universal mobile telecommunications system (UMTS) terrestrial radio access (E-UTRA) band 34 based on a Third Generation Partnership Project (3GPP) standard.

7. A method for limiting uplink transmission power of a first user equipment (UE), the method performed by a serving base station (BS) and comprising:
allocating, by the serving BS to the first UE, an uplink resource in a frequency range of 1980 MHz through 2010 MHz or 1920 MHz through 2010 MHz to the first UE,
wherein the serving BS is adjacent to a neighboring BS for serving a second UE using for an uplink transmission frequency range of 2010 MHz through 2025 MHz; and
transmitting, from the serving BS to the first UE, a value of an additional maximum power reduction (A-MPR) to protect the second UE,
wherein the value of the A-MPR is 11 dB or 15 dB.

8. The method of claim 7, wherein
if the first UE is applied with −40 dBm/MHz as a maximum limit of spurious emission for a coexistence requirement with the second UE, and if a transmission bandwidth allocated for the uplink transmission of the first UE is 5 MHz, the value of the A-MPR is 15 dB.

9. The method of claim 7, wherein
if the first UE is applied with −30 dBm/MHz as a maximum limit of spurious emission for a coexistence requirement with the second UE, and if a transmission bandwidth allocated for the uplink transmission of the first UE is 10 MHz, the value of the A-MPR is 11 dB.

10. The method of claim 7, wherein the value of the A-MPR is applied if a guard band does not exist between the frequency range of 1980 MHz through 2010 MHz or 1920 MHz through 2010 MHz for the uplink transmission.

11. The method of claim 7, wherein the frequency range of 1980 MHz through 2010 MHz is a band that is available to be used for a long term evolution (LTE) or an advanced LTE (LTE-A) system as well as satellite communication.

12. The method of claim 7, wherein the frequency range of 2010 MHz through 2025 MHz that the second UE uses is evolved universal mobile telecommunications system (UMTS) terrestrial radio access (E-UTRA) band 34 based on a Third Generation Partnership Project (3GPP) standard.

13. A first user equipment (UE) for transmitting uplink signals in a wireless communication system, the first UE comprising:
a radio frequency (RF) unit; and
a processor operatively connected to the RF unit and configured to:
configure the RF unit to use for an uplink transmission a frequency range of 1980 MHz through 2010 MHz or 1920 MHz through 2010 MHz,
receive, via the RF unit from a serving base station (BS), a value of an additional maximum power reduction (A-MPR),
wherein the serving BS is adjacent to a neighboring BS for serving a second UE using for an uplink transmission a frequency range of 2010 MHz through 2025 MHz; and
transmit, via the RF unit to the serving BS, an uplink signal at an uplink transmission power calculated by using the value of the A-MPR,
wherein the value of the A-MPR is 11 dB or 15 dB.

14. The first UE of claim 13, wherein
if the first UE is applied with −40 dBm/MHz as a maximum limit of spurious emission for coexistence requirement with the second UE, and if a transmission bandwidth allocated for the uplink transmission of the first UE is 5 MHz, the value of the A-MPR is 15 dB.

15. The first UE of claim 13, wherein
if the first UE is applied with −30 dBm/MHz as a maximum limit of spurious emission for a coexistence requirement with the second UE, and if a transmission bandwidth allocated for the uplink transmission of the first UE is 10 MHz, the value of the A-MPR is 11 dB.

16. The first UE of claim 13, wherein the value of the A-MPR is applied if a guard band does not exist between the frequency range of 1980 MHz through 2010 MHz or 1920 MHz through 2010 MHz for the uplink transmission.

17. The first UE of claim 13, wherein the frequency range of 1980 MHz through 2010 MHz is a band that is available to be used for a long term evolution (LTE) or an advanced LTE (LTE-A) system as well as satellite communication.

18. The first UE of claim 13, wherein the frequency range of 2010 MHz through 2025 MHz that the second UE uses is evolved universal mobile telecommunications system (UMTS) terrestrial radio access (E-UTRA) band 34 based on a Third Generation Partnership Project (3GPP) standard.

* * * * *